US010546295B2

(12) United States Patent
Davis et al.

(10) Patent No.: US 10,546,295 B2
(45) Date of Patent: *Jan. 28, 2020

(54) COMPUTATIONAL SYSTEMS AND METHODS FOR REGULATING INFORMATION FLOW DURING INTERACTIONS

(75) Inventors: Marc E. Davis, San Francisco, CA (US); Matthew G. Dyor, Bellevue, WA (US); William Gates, Redmond, WA (US); Xuedong Huang, Bellevue, WA (US); Roderick A. Hyde, Redmond, WA (US); Edward K. Y. Jung, Las Vegas, NV (US); Jordin T. Kare, Seattle, WA (US); Royce A. Levien, Lexington, MA (US); Richard T. Lord, Tacoma, WA (US); Robert W. Lord, Seattle, WA (US); Qi Lu, Bellevue, WA (US); Mark A. Malamud, Seattle, WA (US); Nathan P. Myhrvold, Bellevue, WA (US); Satya Nadella, Clyde Hill, WA (US); Daniel Reed, Redmond, WA (US); Harry Shum, Medina, WA (US); Clarence T. Tegreene, Bellevue, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/374,530

(22) Filed: Dec. 29, 2011

(65) Prior Publication Data
US 2013/0060619 A1    Mar. 7, 2013

Related U.S. Application Data

(63) Continuation-in-part of application No. 13/374,535, filed on Dec. 29, 2011, and a continuation of
(Continued)

(51) Int. Cl.
G06Q 30/02    (2012.01)
G06Q 20/40    (2012.01)
(Continued)

(52) U.S. Cl.
CPC ....... *G06Q 20/4014* (2013.01); *G06Q 20/102* (2013.01); *G06Q 20/401* (2013.01);
(Continued)

(58) Field of Classification Search
CPC .... G06Q 20/10; G06Q 20/0453; G06Q 20/12; G06Q 20/382; G06Q 20/3821;
(Continued)

(56) References Cited

U.S. PATENT DOCUMENTS 5,870,473 A    2/1999    Boesch et al.
5,878,141 A    3/1999    Daly et al.
(Continued)

FOREIGN PATENT DOCUMENTS

WO    WO 2011/021924 A1    2/2011

OTHER PUBLICATIONS

Weisbaum, "When are social security numbers required?", Apr. 17, 2006, http://www.nbcnews.com/id/12359845/ns/business-consumer_news/t/when-are-social-security-numbers-required/#.XFs1F_IKjqY, all pages.*

(Continued)

Primary Examiner — Chirag R Patel

(57) ABSTRACT

Methods, apparatuses, computer program products, devices and systems are described that carry out accepting at least one request for personal information from a party to a transaction; evaluating the transaction; and negotiating presentation of at least one persona to the party to the transaction at least partly based on an evaluation of the transaction.

21 Claims, 42 Drawing Sheets

Related U.S. Application Data application No. 13/374,534, filed on Dec. 29, 2011, now Pat. No. 10,198,729, and a continuation-in-part of application No. 13/374,532, filed on Dec. 29, 2011, and a continuation-in-part of application No. 13/374,429, filed on Dec. 27, 2011, now Pat. No. 9,159,055, and a continuation-in-part of application No. 13/374,428, filed on Dec. 27, 2011, and a continuation-in-part of application No. 13/374,247, filed on Dec. 16, 2011, now Pat. No. 10,263,936, and a continuation-in-part of application No. 13/374,246, filed on Dec. 16, 2011, and a continuation-in-part of application No. 13/373,871, filed on Dec. 2, 2011, now Pat. No. 9,167,099, and a continuation-in-part of application No. 13/373,872, filed on Dec. 2, 2011, now Pat. No. 9,473,647, and a continuation-in-part of application No. 13/373,572, filed on Nov. 17, 2011, now Pat. No. 9,690,853, and a continuation-in-part of application No. 13/373,542, filed on Nov. 16, 2011, now Pat. No. 9,928,485, and a continuation-in-part of application No. 13/200,810, filed on Sep. 30, 2011, now Pat. No. 9,141,977, and a continuation-in-part of application No. 13/200,806, filed on Sep. 30, 2011, now Pat. No. 10,074,113, and a continuation-in-part of application No. 13/199,829, filed on Sep. 9, 2011, now Pat. No. 9,183,520, and a continuation-in-part of application No. 13/199,832, filed on Sep. 7, 2011, now Pat. No. 9,747,561.

(51) Int. Cl.
*H04L 29/06* (2006.01)
*G06Q 30/00* (2012.01)
*G06Q 40/08* (2012.01)
*G06Q 20/10* (2012.01)

(52) U.S. Cl.
CPC ....... *G06Q 20/405* (2013.01); *G06Q 20/4016* (2013.01); *G06Q 30/00* (2013.01); *G06Q 30/0185* (2013.01); *G06Q 30/02* (2013.01); *G06Q 40/08* (2013.01); *H04L 63/08* (2013.01); *H04L 63/0861* (2013.01); *H04L 63/0876* (2013.01)

(58) Field of Classification Search
CPC .. G06Q 20/40; G06Q 20/401; G06Q 20/4014; G06Q 30/0207; G06Q 40/08; G06Q 20/102; G06Q 30/00; G06Q 30/06; G06Q 50/00; G06Q 30/0601; G06Q 30/0609; G06Q 20/383; G06Q 20/405; G06Q 30/0242; G06Q 50/188; G06F 21/6245; H04L 2463/102; H04L 63/04
USPC ......... 705/14.23; 713/150; 706/14; 709/224; 726/21
See application file for complete search history.

(56) References Cited

U.S. PATENT DOCUMENTS

| | | | |
|---|---|---|---|
| 5,944,787 A | 8/1999 | Zoken | |
| 5,978,373 A | 11/1999 | Hoff et al. | |
| 5,987,440 A | 11/1999 | O'Neil et al. | |
| 5,988,497 A | 11/1999 | Wallace | |
| 6,018,761 A | 1/2000 | Uomini | |
| 6,092,053 A * | 7/2000 | Boesch | G06Q 10/103 705/26.8 |
| 6,141,010 A | 10/2000 | Hoyle | |
| 6,526,436 B1 | 2/2003 | Shiraishi et al. | |
| 6,763,020 B1 | 7/2004 | Hon | |
| 7,016,866 B1 | 3/2006 | Chin et al. | |
| 7,246,315 B1 | 7/2007 | Andrieu et al. | |
| 7,318,049 B2 * | 1/2008 | Iannacci | 705/39 |
| 7,334,184 B1 | 2/2008 | Simons | |
| 7,340,048 B2 | 3/2008 | Stern et al. | |
| 7,376,714 B1 | 5/2008 | Gerken | |
| 7,562,048 B1 | 7/2009 | Sunde et al. | |
| 7,636,853 B2 | 12/2009 | Cluts et al. | |
| 7,761,591 B2 | 7/2010 | Graham | |
| 7,831,684 B1 | 11/2010 | Lawler et al. | |
| 7,853,472 B2 | 12/2010 | Al-Abdulqader et al. | |
| 7,895,177 B2 | 2/2011 | Wu | |
| 7,925,708 B2 | 4/2011 | Davis et al. | |
| 8,024,399 B2 | 9/2011 | Reisman | |
| 8,131,594 B1 | 3/2012 | Yehoshua et al. | |
| 8,135,800 B1 | 3/2012 | Walsh et al. | |
| 8,244,556 B1 | 8/2012 | Ringold | |
| 8,256,013 B1 | 8/2012 | Hernacki et al. | |
| 8,296,179 B1 | 10/2012 | Rennison | |
| 8,332,517 B2 | 12/2012 | Russell | |
| 8,365,257 B1 | 1/2013 | Causey et al. | |
| 8,375,331 B1 | 2/2013 | Mayers | |
| 8,386,353 B2 | 2/2013 | Hirson et al. | |
| 8,549,412 B2 | 10/2013 | Brezina et al. | |
| 8,595,069 B2 | 11/2013 | Shkedi et al. | |
| 8,600,343 B2 | 12/2013 | Brezina et al. | |
| 8,650,103 B2 | 2/2014 | Wilf et al. | |
| 8,655,721 B2 * | 2/2014 | McAuliffe | G06Q 30/02 705/14.23 |
| 8,713,027 B2 | 4/2014 | Forutanpour et al. | |
| 8,768,838 B1 | 7/2014 | Hoffman | |
| 8,863,256 B1 | 10/2014 | Addepalli et al. | |
| 8,930,402 B1 | 1/2015 | Singh | |
| 9,159,055 B2 | 10/2015 | Davis et al. | |
| 9,183,520 B2 | 11/2015 | Davis et al. | |
| 9,239,999 B2 | 1/2016 | Hawkins | |
| 9,253,137 B1 | 2/2016 | Jackson et al. | |
| 9,262,754 B1 * | 2/2016 | Jawharkar | G06Q 30/02 |
| 9,264,867 B1 | 2/2016 | Kotab | |
| 9,307,380 B1 | 4/2016 | Smith et al. | |
| 9,432,502 B2 | 8/2016 | Papakipos et al. | |
| 9,465,993 B2 | 10/2016 | Krupka et al. | |
| 2001/0020231 A1 | 9/2001 | Perri, III et al. | |
| 2001/0027413 A1 | 10/2001 | Bhutta | |
| 2001/0032316 A1 | 10/2001 | Lu et al. | |
| 2001/0049620 A1 | 12/2001 | Blasko | |
| 2002/0016769 A1 | 2/2002 | Barbara et al. | |
| 2002/0026382 A1 | 2/2002 | Nakajima | |
| 2002/0032785 A1 | 3/2002 | Britt, Jr. | |
| 2002/0046084 A1 | 4/2002 | Steele et al. | |
| 2002/0046109 A1 * | 4/2002 | Leonard | G06Q 30/02 705/14.23 |
| 2002/0049708 A1 * | 4/2002 | Moneymaker | G06Q 30/06 |
| 2002/0049907 A1 | 4/2002 | Woods et al. | |
| 2002/0055884 A1 * | 5/2002 | Tokuma | 705/26 |
| 2002/0062438 A1 | 5/2002 | Asay et al. | |
| 2002/0062451 A1 | 5/2002 | Scheidt et al. | |
| 2002/0073041 A1 | 6/2002 | Kumhyr | |
| 2002/0085511 A1 | 7/2002 | Koponen et al. | |
| 2002/0107027 A1 | 8/2002 | O'Neil | |
| 2002/0120714 A1 | 8/2002 | Agapiev | |
| 2002/0120873 A1 | 8/2002 | Salmivalli | |
| 2002/0147658 A1 | 10/2002 | Kwan | |
| 2002/0174363 A1 | 11/2002 | Chefalas et al. | |
| 2003/0004898 A1 * | 1/2003 | McAuliffe | G06Q 30/02 705/80 |
| 2003/0009418 A1 * | 1/2003 | Green et al. | 705/38 |
| 2003/0061170 A1 | 3/2003 | Uzo | |
| 2003/0069874 A1 * | 4/2003 | Hertzog | G06Q 10/109 |
| 2003/0107606 A1 | 6/2003 | Capps et al. | |
| 2003/0126079 A1 | 7/2003 | Roberson et al. | |
| 2003/0126092 A1 * | 7/2003 | Chihara | G06Q 20/3674 705/67 |
| 2003/0126094 A1 * | 7/2003 | Fisher et al. | 705/75 |
| 2003/0130919 A1 | 7/2003 | Templeton et al. | |
| 2003/0131260 A1 | 7/2003 | Hanson et al. | |
| 2003/0135401 A1 | 7/2003 | Parr | |
| 2003/0149781 A1 | 8/2003 | Yared et al. | |
| 2003/0154171 A1 * | 8/2003 | Karp et al. | 705/78 |

(56) References Cited

U.S. PATENT DOCUMENTS

| | | | |
|---|---|---|---|
| 2003/0163425 A1* | 8/2003 | Cannon, Jr. | G06Q 20/04 705/42 |
| 2003/0177361 A1* | 9/2003 | Wheeler | G06F 21/32 713/176 |
| 2003/0177363 A1 | 9/2003 | Yokota et al. | |
| 2003/0195846 A1 | 10/2003 | Felger | |
| 2003/0204445 A1* | 10/2003 | Vishik | G06Q 20/10 705/26.42 |
| 2004/0030637 A1* | 2/2004 | Robison | G06Q 20/04 705/38 |
| 2004/0070566 A1 | 4/2004 | Ashton | |
| 2004/0097217 A1* | 5/2004 | McClain | H04L 63/083 455/411 |
| 2004/0117302 A1 | 6/2004 | Weichert et al. | |
| 2004/0153405 A1 | 8/2004 | Millary et al. | |
| 2004/0199592 A1 | 10/2004 | Gould et al. | |
| 2004/0236942 A1 | 11/2004 | Kim et al. | |
| 2004/0260658 A1 | 12/2004 | Dettinger et al. | |
| 2005/0021448 A1 | 1/2005 | Shibusawa et al. | |
| 2005/0060532 A1 | 3/2005 | Dorenbosch et al. | |
| 2005/0091072 A1 | 4/2005 | Dunn et al. | |
| 2005/0108232 A1 | 5/2005 | Rockey | |
| 2005/0149854 A1 | 7/2005 | Pennell et al. | |
| 2005/0171954 A1 | 8/2005 | Hull et al. | |
| 2005/0199709 A1 | 9/2005 | Linlor | |
| 2005/0216953 A1 | 9/2005 | Ellingson | |
| 2005/0256766 A1 | 11/2005 | Garcia et al. | |
| 2006/0005020 A1 | 1/2006 | Hardt | |
| 2006/0020821 A1 | 1/2006 | Waltermann et al. | |
| 2006/0029228 A1 | 2/2006 | Lagrange et al. | |
| 2006/0036951 A1 | 2/2006 | Marion et al. | |
| 2006/0046709 A1 | 3/2006 | Krumm et al. | |
| 2006/0064326 A1 | 3/2006 | Tucker | |
| 2006/0079284 A1 | 4/2006 | Lu et al. | |
| 2006/0085408 A1 | 4/2006 | Morsa | |
| 2006/0136561 A1 | 6/2006 | Lee | |
| 2006/0161501 A1 | 7/2006 | Waserstein et al. | |
| 2006/0178986 A1 | 8/2006 | Giordano et al. | |
| 2006/0179114 A1 | 8/2006 | Deeds | |
| 2006/0195364 A1 | 8/2006 | Shroff et al. | |
| 2006/0198351 A1 | 9/2006 | Baek | |
| 2006/0206413 A1* | 9/2006 | Van Luchene | G06Q 20/10 705/37 |
| 2006/0212407 A1 | 9/2006 | Lyon | |
| 2006/0212713 A1* | 9/2006 | Hatakeda | H04L 63/10 713/182 |
| 2006/0218111 A1 | 9/2006 | Cohen | |
| 2006/0242245 A1 | 10/2006 | Christensen | |
| 2006/0251008 A1 | 11/2006 | Wu et al. | |
| 2006/0265347 A1 | 11/2006 | Caballero-McCann et al. | |
| 2006/0270419 A1 | 11/2006 | Crowley et al. | |
| 2006/0288394 A1 | 12/2006 | Thomas et al. | |
| 2007/0042755 A1 | 2/2007 | Singhal | |
| 2007/0047717 A1 | 3/2007 | Ho et al. | |
| 2007/0061301 A1 | 3/2007 | Ramer et al. | |
| 2007/0067448 A1 | 3/2007 | Giroux et al. | |
| 2007/0086592 A1 | 4/2007 | Ellison et al. | |
| 2007/0087822 A1 | 4/2007 | Van Luchene | |
| 2007/0094042 A1 | 4/2007 | Ramer et al. | |
| 2007/0121856 A1 | 5/2007 | Alperin et al. | |
| 2007/0150603 A1 | 6/2007 | Crull et al. | |
| 2007/0156664 A1 | 7/2007 | Norton et al. | |
| 2007/0192179 A1 | 8/2007 | Van Luchene | |
| 2007/0192245 A1 | 8/2007 | Fisher et al. | |
| 2007/0198410 A1 | 8/2007 | Labgold et al. | |
| 2007/0202484 A1 | 8/2007 | Toombs et al. | |
| 2007/0214180 A1 | 9/2007 | Crawford | |
| 2007/0226303 A1 | 9/2007 | Provo | |
| 2007/0250585 A1 | 10/2007 | Ly et al. | |
| 2007/0276926 A1 | 11/2007 | LaJoie et al. | |
| 2007/0288320 A1 | 12/2007 | Cooper et al. | |
| 2007/0299918 A1 | 12/2007 | Roberts | |
| 2008/0005793 A1 | 1/2008 | Wenig et al. | |
| 2008/0015987 A1* | 1/2008 | Ramavarjula | G06Q 20/10 705/44 |
| 2008/0021829 A1* | 1/2008 | Kranzley | G06Q 20/04 705/44 |
| 2008/0021958 A1 | 1/2008 | Foote | |
| 2008/0052182 A1 | 2/2008 | Marshall | |
| 2008/0071808 A1* | 3/2008 | Hardt | G06F 17/243 |
| 2008/0083826 A1 | 4/2008 | Henry et al. | |
| 2008/0097849 A1 | 4/2008 | Ramsaier et al. | |
| 2008/0109473 A1 | 5/2008 | Dixon et al. | |
| 2008/0114776 A1* | 5/2008 | Sun et al. | 707/10 |
| 2008/0125085 A1 | 5/2008 | Ullah | |
| 2008/0127331 A1 | 5/2008 | Seidman et al. | |
| 2008/0140650 A1 | 6/2008 | Stackpole | |
| 2008/0168099 A1 | 7/2008 | Skaf | |
| 2008/0183832 A1 | 7/2008 | Kirkland et al. | |
| 2008/0207327 A1* | 8/2008 | Van Luchene et al. | 463/42 |
| 2008/0208760 A1 | 8/2008 | Keithley | |
| 2008/0214148 A1 | 9/2008 | Ramer et al. | |
| 2008/0242283 A1 | 10/2008 | Ruckart | |
| 2008/0243873 A1 | 10/2008 | Shah et al. | |
| 2008/0275779 A1 | 11/2008 | Lakshminarayanan | |
| 2008/0275785 A1 | 11/2008 | Altberg et al. | |
| 2008/0275865 A1 | 11/2008 | Kretz et al. | |
| 2008/0288395 A1* | 11/2008 | Srinivasan | G06Q 20/10 705/39 |
| 2008/0301112 A1 | 12/2008 | Wu | |
| 2008/0308624 A1 | 12/2008 | Gardner | |
| 2008/0319849 A1 | 12/2008 | Rapoport | |
| 2009/0006614 A1 | 1/2009 | Le et al. | |
| 2009/0006628 A1 | 1/2009 | Webb et al. | |
| 2009/0006940 A1 | 1/2009 | Hardt | |
| 2009/0012878 A1* | 1/2009 | Tedesco | G06Q 30/06 705/26.41 |
| 2009/0029674 A1 | 1/2009 | Brezina et al. | |
| 2009/0031232 A1 | 1/2009 | Brezina et al. | |
| 2009/0043502 A1 | 2/2009 | Shaffer et al. | |
| 2009/0047924 A1 | 2/2009 | Ray et al. | |
| 2009/0061406 A1 | 3/2009 | Clayton et al. | |
| 2009/0082038 A1 | 3/2009 | McKiou et al. | |
| 2009/0089176 A1 | 4/2009 | McCabe | |
| 2009/0099924 A1 | 4/2009 | Lensch et al. | |
| 2009/0100047 A1 | 4/2009 | Jones et al. | |
| 2009/0102712 A1 | 4/2009 | Heffez | |
| 2009/0106149 A1* | 4/2009 | Bennett | G06Q 20/10 705/42 |
| 2009/0106365 A1 | 4/2009 | Drory et al. | |
| 2009/0106415 A1 | 4/2009 | Brezina et al. | |
| 2009/0111487 A1 | 4/2009 | Scheibe | |
| 2009/0119222 A1 | 5/2009 | O'Neil et al. | |
| 2009/0125435 A1* | 5/2009 | Cohen | G06Q 30/06 705/37 |
| 2009/0125440 A1 | 5/2009 | Maeng | |
| 2009/0131012 A1 | 5/2009 | Ashley, Jr. et al. | |
| 2009/0141876 A1 | 6/2009 | Carter et al. | |
| 2009/0144211 A1 | 6/2009 | O'Sullivan et al. | |
| 2009/0149166 A1 | 6/2009 | Habib et al. | |
| 2009/0150262 A1 | 6/2009 | Mizhen | |
| 2009/0157560 A1 | 6/2009 | Carter et al. | |
| 2009/0158030 A1 | 6/2009 | Rasti | |
| 2009/0171690 A1 | 7/2009 | Lubarski et al. | |
| 2009/0181653 A1 | 7/2009 | Alharayeri | |
| 2009/0203361 A1 | 8/2009 | Huang et al. | |
| 2009/0225967 A1 | 9/2009 | Koch | |
| 2009/0227290 A1 | 9/2009 | Chien | |
| 2009/0234760 A1 | 9/2009 | Walter | |
| 2009/0234814 A1 | 9/2009 | Boerries et al. | |
| 2009/0240564 A1 | 9/2009 | Boerries et al. | |
| 2009/0248680 A1 | 10/2009 | Kalavade | |
| 2009/0254824 A1 | 10/2009 | Singh | |
| 2009/0259560 A1 | 10/2009 | Bachenheimer | |
| 2009/0260064 A1 | 10/2009 | McDowell et al. | |
| 2009/0271764 A1 | 10/2009 | Gonzales, II | |
| 2009/0275363 A1 | 11/2009 | McGregor et al. | |
| 2009/0282187 A1 | 11/2009 | Ito et al. | |
| 2009/0282345 A1 | 11/2009 | Smith et al. | |
| 2009/0288012 A1 | 11/2009 | Hertel et al. | |
| 2009/0292640 A1 | 11/2009 | Heatherly | |
| 2009/0292814 A1 | 11/2009 | Ting et al. | |

(56) References Cited

U.S. PATENT DOCUMENTS

| | | |
|---|---|---|
| 2009/0299957 A1 | 12/2009 | Ledlie |
| 2009/0307205 A1 | 12/2009 | Churchill et al. |
| 2009/0319387 A1 | 12/2009 | Keithley et al. |
| 2009/0324022 A1 | 12/2009 | Sangberg et al. |
| 2009/0327296 A1 | 12/2009 | Francis et al. |
| 2009/0328173 A1 | 12/2009 | Jakobson et al. |
| 2010/0010887 A1 | 1/2010 | Karlin et al. |
| 2010/0042414 A1 | 2/2010 | Lewis et al. |
| 2010/0042470 A1 | 2/2010 | Chang et al. |
| 2010/0054600 A1 | 3/2010 | Anbalagan et al. |
| 2010/0061532 A1 | 3/2010 | Takiguchi |
| 2010/0063889 A1 | 3/2010 | Proctor, Jr. et al. |
| 2010/0063914 A1 | 3/2010 | Lozano et al. |
| 2010/0076955 A1 | 3/2010 | Van Steenbergen et al. |
| 2010/0082431 A1 | 4/2010 | Ramer et al. |
| 2010/0088752 A1 | 4/2010 | Nagulakonda et al. |
| 2010/0088753 A1 | 4/2010 | Ayres et al. |
| 2010/0100424 A1* | 4/2010 | Buchanan et al. .............. 705/10 |
| 2010/0106620 A1 | 4/2010 | Marcus |
| 2010/0107152 A1 | 4/2010 | Kwon |
| 2010/0113001 A1 | 5/2010 | Tenbrook et al. |
| 2010/0113162 A1 | 5/2010 | Vemuri et al. |
| 2010/0115114 A1 | 5/2010 | Headley |
| 2010/0131589 A1 | 5/2010 | Lawyer et al. |
| 2010/0144442 A1 | 6/2010 | Yanow |
| 2010/0146639 A1 | 6/2010 | Kim et al. |
| 2010/0153148 A1 | 6/2010 | Johnson et al. |
| 2010/0153269 A1 | 6/2010 | McCabe |
| 2010/0169010 A1 | 7/2010 | Jeong |
| 2010/0169182 A1* | 7/2010 | Madani ................ G06Q 20/102 705/21 |
| 2010/0169337 A1 | 7/2010 | Green et al. |
| 2010/0174647 A1 | 7/2010 | Kowalchyk et al. |
| 2010/0175116 A1 | 7/2010 | Gum |
| 2010/0180001 A1 | 7/2010 | Hardt |
| 2010/0187302 A1 | 7/2010 | Sermersheim et al. |
| 2010/0191590 A1* | 7/2010 | Hakkarainen et al. .... 705/14.23 |
| 2010/0211637 A1 | 8/2010 | Borzsei et al. |
| 2010/0216491 A1 | 8/2010 | Winkler et al. |
| 2010/0228726 A1 | 9/2010 | Slinker et al. |
| 2010/0228767 A1 | 9/2010 | Slinker et al. |
| 2010/0235288 A1 | 9/2010 | Kisbye |
| 2010/0241507 A1 | 9/2010 | Quinn et al. |
| 2010/0241663 A1 | 9/2010 | Huang et al. |
| 2010/0250578 A1 | 9/2010 | Athsani et al. |
| 2010/0268830 A1 | 10/2010 | McKee et al. |
| 2010/0279713 A1 | 11/2010 | Dicke |
| 2010/0296505 A1 | 11/2010 | Kissinger et al. |
| 2010/0312636 A1 | 12/2010 | Coulter et al. |
| 2010/0313009 A1 | 12/2010 | Combet et al. |
| 2010/0318614 A1 | 12/2010 | Sager et al. |
| 2010/0322396 A1 | 12/2010 | Southerland |
| 2010/0324989 A1 | 12/2010 | Etchegoyen |
| 2010/0325691 A1 | 12/2010 | Willars et al. |
| 2010/0332337 A1 | 12/2010 | Bullock |
| 2011/0010423 A1 | 1/2011 | Thatcher et al. |
| 2011/0022621 A1 | 1/2011 | Luo et al. |
| 2011/0029616 A1 | 2/2011 | Wang et al. |
| 2011/0040609 A1 | 2/2011 | Hawkins et al. |
| 2011/0053574 A1 | 3/2011 | Rice |
| 2011/0060905 A1 | 3/2011 | Stack et al. |
| 2011/0071899 A1 | 3/2011 | Robertson et al. |
| 2011/0072109 A1 | 3/2011 | Robb et al. |
| 2011/0082737 A1 | 4/2011 | Crowe et al. |
| 2011/0092227 A1 | 4/2011 | Phukan |
| 2011/0093949 A1 | 4/2011 | MacRae |
| 2011/0099612 A1 | 4/2011 | Lee et al. |
| 2011/0106429 A1 | 5/2011 | Poppen et al. |
| 2011/0106610 A1* | 5/2011 | Landis et al. .............. 705/14.39 |
| 2011/0106674 A1 | 5/2011 | Perlman |
| 2011/0110364 A1 | 5/2011 | Fried et al. |
| 2011/0119593 A1 | 5/2011 | Jacobson et al. |
| 2011/0131235 A1 | 6/2011 | Petrou et al. |
| 2011/0131491 A1 | 6/2011 | Lu et al. |
| 2011/0137932 A1 | 6/2011 | Wable |
| 2011/0142299 A1 | 6/2011 | Akbarzadeh et al. |
| 2011/0145273 A1 | 6/2011 | Kolathaya et al. |
| 2011/0159856 A1 | 6/2011 | Walsh et al. |
| 2011/0161149 A1 | 6/2011 | Kaplan |
| 2011/0162078 A1* | 6/2011 | Taveau ................ G06F 21/445 726/26 |
| 2011/0165896 A1 | 7/2011 | Stromberg et al. |
| 2011/0166869 A1 | 7/2011 | Froelich et al. |
| 2011/0179126 A1 | 7/2011 | Wetherell et al. |
| 2011/0183651 A1 | 7/2011 | Mundy et al. |
| 2011/0191177 A1 | 8/2011 | Blackhurst et al. |
| 2011/0191433 A1 | 8/2011 | Du |
| 2011/0209194 A1 | 8/2011 | Kennedy |
| 2011/0213785 A1 | 9/2011 | Kristiansson et al. |
| 2011/0215949 A1 | 9/2011 | Yarnold et al. |
| 2011/0225048 A1 | 9/2011 | Nair |
| 2011/0225640 A1 | 9/2011 | Ganapathy et al. |
| 2011/0231241 A1 | 9/2011 | Kesari et al. |
| 2011/0231282 A1 | 9/2011 | Dai |
| 2011/0238575 A1 | 9/2011 | Nightengale et al. |
| 2011/0258049 A1 | 10/2011 | Ramer et al. |
| 2011/0264648 A1 | 10/2011 | Gulik et al. |
| 2011/0269424 A1 | 11/2011 | Multer et al. |
| 2011/0276418 A1 | 11/2011 | Velani |
| 2011/0288868 A1 | 11/2011 | Lloyd et al. |
| 2011/0288923 A1* | 11/2011 | Steinert ................ G06Q 30/02 705/14.25 |
| 2011/0289132 A1 | 11/2011 | Polis et al. |
| 2011/0289143 A1 | 11/2011 | Polis et al. |
| 2011/0289153 A1 | 11/2011 | Hull et al. |
| 2011/0298701 A1 | 12/2011 | Holzer et al. |
| 2011/0302012 A1 | 12/2011 | Duroux et al. |
| 2011/0320282 A1 | 12/2011 | Ramer et al. |
| 2011/0320314 A1 | 12/2011 | Brown |
| 2012/0005221 A1 | 1/2012 | Ickman et al. |
| 2012/0017266 A1 | 1/2012 | DiChiara et al. |
| 2012/0022927 A1 | 1/2012 | Yankovich et al. |
| 2012/0022931 A1* | 1/2012 | Syed .................... G06Q 30/02 705/14.23 |
| 2012/0027189 A1 | 2/2012 | Shaffer et al. |
| 2012/0030724 A1 | 2/2012 | Godas et al. |
| 2012/0033610 A1 | 2/2012 | Ring et al. |
| 2012/0036015 A1 | 2/2012 | Sheikh |
| 2012/0036364 A1 | 2/2012 | Yoneda et al. |
| 2012/0041830 A1 | 2/2012 | Rothschild et al. |
| 2012/0042320 A1 | 2/2012 | Jamjoom et al. |
| 2012/0044089 A1 | 2/2012 | Yarnold et al. |
| 2012/0066142 A1 | 3/2012 | Jenkins et al. |
| 2012/0066301 A1 | 3/2012 | Holland |
| 2012/0069731 A1 | 3/2012 | Tooher et al. |
| 2012/0071131 A1 | 3/2012 | Zisapel et al. |
| 2012/0072494 A1 | 3/2012 | Wong et al. |
| 2012/0077462 A1 | 3/2012 | Rozensztejn et al. |
| 2012/0079019 A1 | 3/2012 | Miettinen et al. |
| 2012/0084078 A1 | 4/2012 | Moganti et al. |
| 2012/0084210 A1 | 4/2012 | Farahmand |
| 2012/0094642 A1 | 4/2012 | Pöpperl et al. |
| 2012/0116979 A1* | 5/2012 | Hatch ................ G06Q 50/188 705/80 |
| 2012/0130853 A1 | 5/2012 | Petri et al. |
| 2012/0130898 A1 | 5/2012 | Snyder et al. |
| 2012/0131350 A1 | 5/2012 | Atherton |
| 2012/0143859 A1 | 6/2012 | Lymperopoulos et al. |
| 2012/0143968 A1 | 6/2012 | Oren et al. |
| 2012/0148043 A1 | 6/2012 | Tofighbakhsh |
| 2012/0150734 A1 | 6/2012 | Bangah et al. |
| 2012/0150742 A1 | 6/2012 | Poon et al. |
| 2012/0150960 A1 | 6/2012 | Nalawade |
| 2012/0157062 A1 | 6/2012 | Kim et al. |
| 2012/0158751 A1 | 6/2012 | Tseng |
| 2012/0159479 A1 | 6/2012 | Chardon et al. |
| 2012/0166530 A1 | 6/2012 | Tseng |
| 2012/0167234 A1 | 6/2012 | Donfried et al. |
| 2012/0182935 A1 | 7/2012 | Addepalli et al. |
| 2012/0192258 A1 | 7/2012 | Spencer et al. |
| 2012/0196581 A1 | 8/2012 | Papakipos et al. |
| 2012/0196629 A1 | 8/2012 | Movsesyan et al. |
| 2012/0203846 A1 | 8/2012 | Hull et al. |
| 2012/0203853 A1 | 8/2012 | Davis et al. |

(56) References Cited

U.S. PATENT DOCUMENTS

| | | |
|---|---|---|
| 2012/0214442 A1 | 8/2012 | Crawford et al. |
| 2012/0244875 A1 | 9/2012 | Cardona et al. |
| 2012/0246075 A1 | 9/2012 | Rasti |
| 2012/0246089 A1 | 9/2012 | Sikes |
| 2012/0251077 A1 | 10/2012 | Stewart et al. |
| 2012/0253985 A1* | 10/2012 | Maron ............... G06Q 10/0633 705/27.1 |
| 2012/0254774 A1 | 10/2012 | Patton |
| 2012/0257753 A1 | 10/2012 | Ochikubo et al. |
| 2012/0265684 A1 | 10/2012 | Singh |
| 2012/0278176 A1 | 11/2012 | Naor et al. |
| 2012/0278732 A1 | 11/2012 | Lee et al. |
| 2012/0290468 A1 | 11/2012 | Benco et al. |
| 2012/0295633 A1 | 11/2012 | Yom-Tov et al. |
| 2012/0303616 A1 | 11/2012 | Abuelsaad et al. |
| 2012/0310760 A1 | 12/2012 | Phillips et al. |
| 2012/0311320 A1 | 12/2012 | Brown et al. |
| 2012/0324228 A1 | 12/2012 | Padhye et al. |
| 2013/0006749 A1 | 1/2013 | Fink et al. |
| 2013/0013727 A1 | 1/2013 | Walker |
| 2013/0019089 A1 | 1/2013 | Guidotti et al. |
| 2013/0024105 A1 | 1/2013 | Thomas |
| 2013/0024267 A1 | 1/2013 | Libenson et al. |
| 2013/0030922 A1 | 1/2013 | Shalabi et al. |
| 2013/0031009 A1 | 1/2013 | Kapoor et al. |
| 2013/0031180 A1 | 1/2013 | Abendroth et al. |
| 2013/0036112 A1 | 2/2013 | Poon |
| 2013/0040654 A1 | 2/2013 | Parish |
| 2013/0041961 A1 | 2/2013 | Thrower, III et al. |
| 2013/0046689 A1 | 2/2013 | Sundberg et al. |
| 2013/0047100 A1 | 2/2013 | Kroeger et al. |
| 2013/0051542 A1 | 2/2013 | Yao et al. |
| 2013/0054587 A1 | 2/2013 | Ahari et al. |
| 2013/0060850 A1 | 3/2013 | Davis et al. |
| 2013/0061050 A1 | 3/2013 | Davis et al. |
| 2013/0061127 A1 | 3/2013 | Reyes et al. |
| 2013/0110827 A1 | 5/2013 | Nabar et al. |
| 2013/0185285 A1 | 7/2013 | Shuman et al. |
| 2013/0227707 A1 | 8/2013 | Gay et al. |
| 2013/0332700 A1 | 12/2013 | Kopylovitz et al. |
| 2014/0045454 A1 | 2/2014 | Monjas Llorente et al. |
| 2014/0048454 A1 | 2/2014 | Birken et al. |
| 2014/0058568 A1 | 2/2014 | Imes et al. |
| 2014/0067702 A1 | 3/2014 | Rathod |
| 2014/0068270 A1 | 3/2014 | Shenoy |
| 2014/0087687 A1 | 3/2014 | Brezina et al. |
| 2014/0128001 A1 | 5/2014 | Imes et al. |
| 2014/0222690 A1 | 8/2014 | Wilf et al. |
| 2015/0293997 A1 | 10/2015 | Smith et al. |

OTHER PUBLICATIONS

Milian, Mark; "Facebook lets users opt out of facial recognition"; CNN Tech; Jun. 9, 2011; pp. 1-5; retrieved by examiner on May 30, 2013; CNN Cable News Network, Turner Broadcasting System, Inc.; located at: http://www.cnn.com/2011/TECH/social.media/06/07/facebook.facial.recognition/index.html.

Dancu, John; "Using Identity and Age Verification within Social Networking Sites"; bearing a date of Jul. 21, 2008 (retrieved on Apr. 13, 2014), as provided by examiner; pp. 1-4; located at: http://cyber.law.harvard.edu/sites/cyber.law.harvard.edu/files/IDology_ISTTFTAB_submission.pdf.

"How to Set Up an ICE Contact on Your iPhone"; The Backup Plan; Jun. 21, 2010; 11 pages; located at mn10.wordpress.com/2010/06/21/how-to-set-up-an-ice-contact-on-your-iphone/.

Spivack, Nova; "How Siri Works—Interview with Tom Gruber, CTO of SIRI"; Jan. 26, 2010; 9 pages; located at http://www.novaspivack.com/technology/how-hisiri-works-interview-with-tom-gruber-cto . . . .

Smith, Chris Silver; "Cell Phone Triangulation Accuracy Is All Over the Map"; Sep. 22, 2008; total of 4 pages (as provided by examiner); located at: https://searchengineland.com/cell-phone-triangulation-accuracy-is-all-over-the-map-14790.

Weisbaum, Herb; "When are Social Security numbers required?"; Apr. 17, 2006; located at www.nbcnews.com/id/12359845/ns/business-consumer_news/t/when-are-social-security-numbers-required#.XFs1F_IKjqY; total of 2 pages (as provided by examiner).

\* cited by examiner

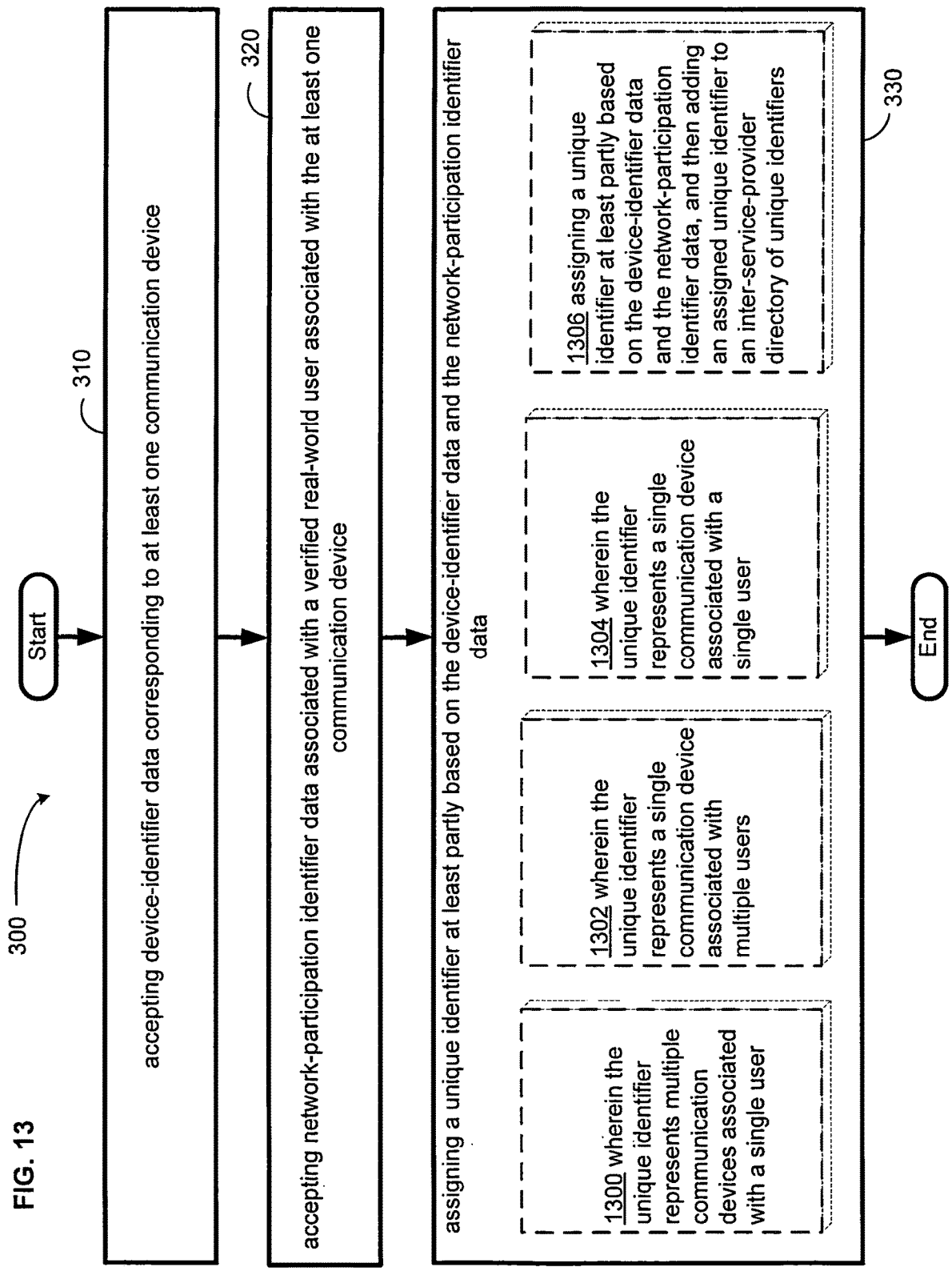

FIG. 14

1400 An article of manufacture

1402 A signal bearing medium

100 System

1404 Computer program (a) one or more instructions for accepting device-identifier data corresponding to at least one communication device;

(b) one or more instructions for accepting network-participation identifier data associated with a verified real-world user associated with the at least one communication device; and (c) one or more instructions for assigning a unique identifier at least partly based on the device-identifier data and the network-participation identifier data 1406 a computer-readable medium 1408 a recordable medium 1410 a communications medium

FIG. 15

1500 Computing System Environment

1504 Device (e.g., a workstation or other desktop computing device)

1502 Computing device

1508 Storage medium

1510 Computer-executable instructions operable to:

(a) accept device-identifier data corresponding to at least one communication device;

(b) accept network-participation identifier data associated with a verified real-world user associated with the at least one communication device; and (c) assign a unique identifier at least partly based on the device-identifier data and the network-participation identifier data

1506

1504 Device

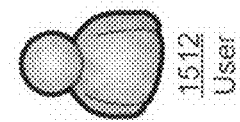
1512 User

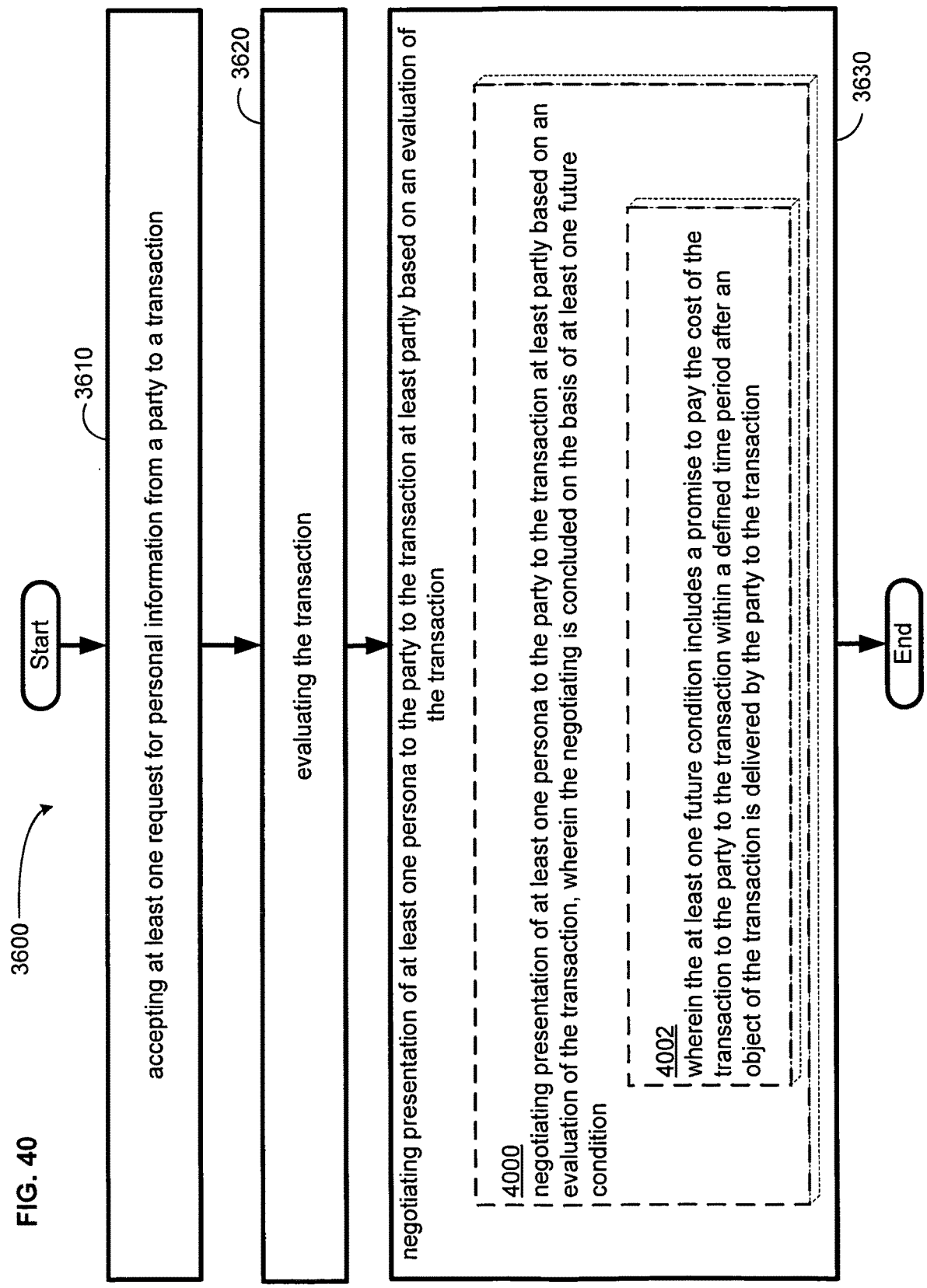

FIG. 41

4100 An article of manufacture

4102 A signal bearing medium

4104 Computer program (a) one or more instructions for accepting at least one request for personal information from a party to a transaction;

(b) one or more instructions for evaluating the transaction; and (c) one or more instructions for negotiating presentation of at least one persona to the party to the transaction at least partly based on an evaluation of the transaction 4106 a computer-readable medium 4108 a recordable medium 4110 a communications medium

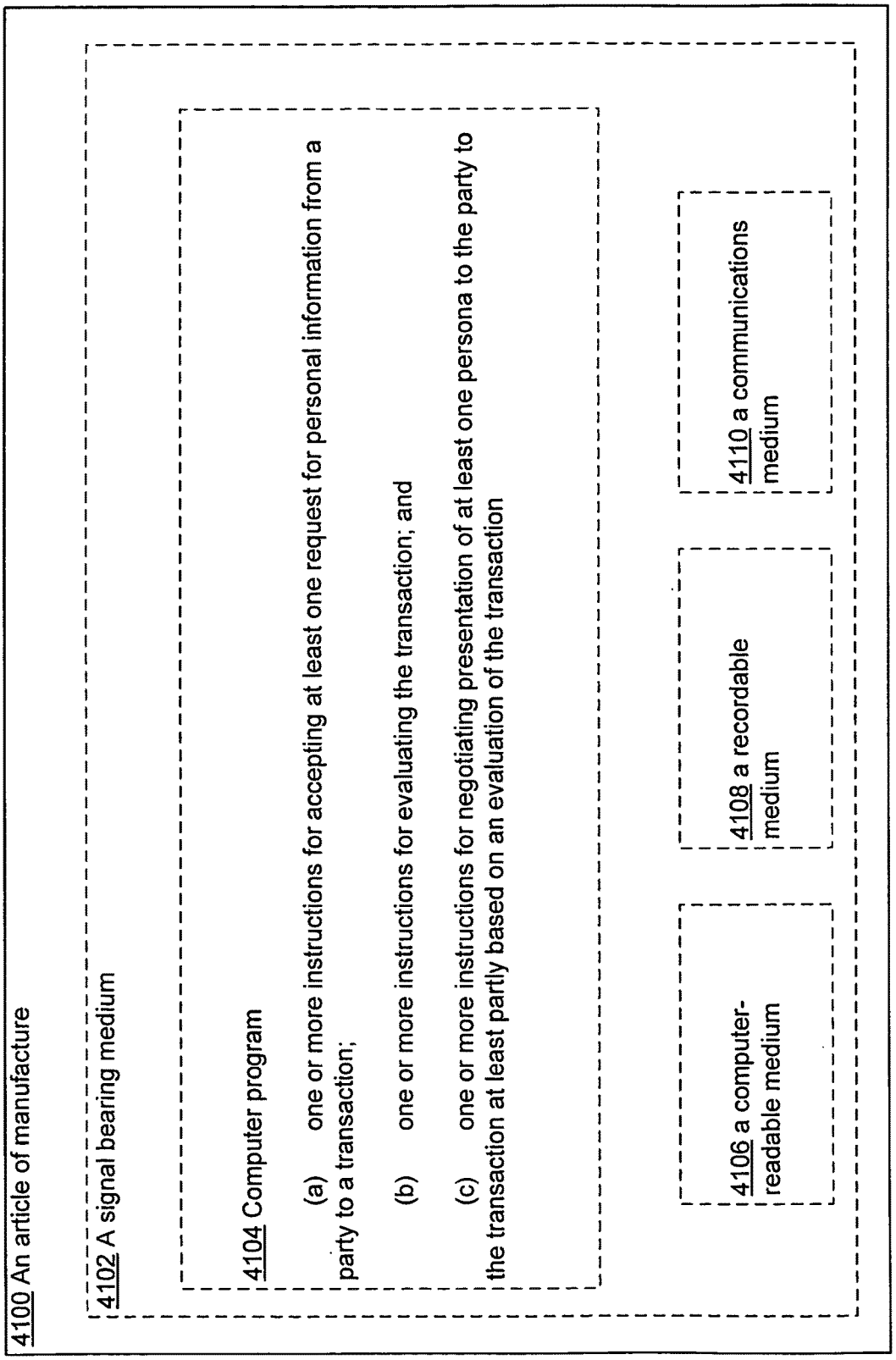

3500 System

FIG. 42

4200 Computing System Environment

4204 Device (e.g., a workstation or other desktop computing device)

4202 Computing device

4208 Storage medium

4210 Computer-executable instructions operable to:

(a) accept at least one request for personal information from a party to a transaction;

(b) evaluate the transaction; and (c) negotiate presentation of at least one persona to the party to the transaction at least partly based on an evaluation of the transaction

4206

4214 Device

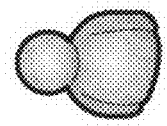

4212 User

COMPUTATIONAL SYSTEMS AND METHODS FOR REGULATING INFORMATION FLOW DURING INTERACTIONS

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC § 119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation of U.S. patent application Ser. No. 13/374,534, entitled COMPUTATIONAL SYSTEMS AND METHODS FOR REGULATING INFORMATION FLOW DURING TRANSACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011, now U.S. Pat. No. 10,198,729 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/199,832, entitled COMPUTATIONAL SYSTEMS AND METHODS FOR LINKING USERS OF DEVICES, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 7 Sep. 2011 now U.S. Pat. No. 9,747,561 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/199,829, entitled COMPUTATIONAL SYSTEMS AND METHODS FOR LINKING USERS OF DEVICES, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 9 Sep. 2011 now U.S. Pat. No. 9,183,520 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,806, entitled COMPUTATIONAL SYSTEMS AND METHODS FOR DISAMBIGUATING SEARCH TERMS CORRESPONDING TO NETWORK MEMBERS, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Sep. 2011 now U.S. Pat. No. 10,074,113 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/200,810, entitled COMPUTATIONAL SYSTEMS AND METHODS FOR DISAMBIGUATING SEARCH TERMS CORRESPONDING TO NETWORK MEMBERS, naming Marc E. Davis, Matthew G. Dyor, William Gates, Xuedong Huang, Roderick A. Hyde, Edward K. Y. Jung, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 30 Sep. 2011 now U.S. Pat. No. 9,141,977 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,542, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Nov. 2011 now U.S. Pat. No. 9,928,485 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,572, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 17 Nov. 2011 now U.S. Pat. No. 9,690,853 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,871, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 2 Dec. 2011 now U.S. Pat. No. 9,167,099 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/373,872, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 2 Dec. 2011 now U.S. Pat. No. 9,473,647 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,247, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Dec. 2011 now U.S. Pat. No. 10,263,936 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,246, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 16 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,428, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 27 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,429, entitled COMPUTATIONAL SYSTEMS AND METHODS FOR IDENTIFYING A COMMUNICATIONS PARTNER, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 27 Dec. 2011 now U.S. Pat. No. 9,159,055 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,532, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011 which is currently co-pending, or is an application of which a currently co-pending application is entitled to the benefit of the filing date.

For purposes of the USPTO extra-statutory requirements, the present application constitutes a continuation-in-part of U.S. patent application Ser. No. 13/374,535, entitled COMPUTATIONAL SYSTEMS AND METHODS FOR REGULATING INFORMATION FLOW DURING INTERACTIONS, naming Marc E. Davis, Matthew G. Dyor, William Gates, Xuedong Huang, Roderick A. Hyde, Edward K. Y. Jung, Jordin T. Kare, Royce A. Levien, Richard T. Lord, Robert W. Lord, Qi Lu, Mark A. Malamud, Nathan P. Myhrvold, Satya Nadella, Daniel Reed, Harry Shum, Clarence T. Tegreene, and Lowell L. Wood, Jr. as inventors, filed 29 Dec. 2011 which is currently co-pending, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Applications and of any and all parent, grandparent, great-grandparent, etc. applications of the Related Applications is incorporated herein by reference to the extent such subject matter is not inconsistent herewith.

TECHNICAL FIELD

This description relates to data capture and data handling techniques.

SUMMARY

An embodiment provides a system. In one implementation, the system includes but is not limited to circuitry for accepting at least one request for personal information from a party to a transaction; circuitry for evaluating the transaction; and circuitry for negotiating presentation of at least one persona to the party to the transaction at least partly based on an evaluation of the transaction. In addition to the foregoing, other system aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to computing means and/or programming for effecting the herein-referenced method aspects; the computing means and/or programming may be virtually any combination of hardware, software, and/or firmware configured to effect the herein-referenced method aspects depending upon the design choices of the system designer.

An embodiment provides a computer-implemented method. In one implementation, the method includes but is not limited to accepting at least one request for personal information from a party to a transaction; evaluating the transaction; and negotiating presentation of at least one persona to the party to the transaction at least partly based on an evaluation of the transaction. In addition to the foregoing, other method aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to (a) accepting at least one request for personal information from a party to a transaction; (b) evaluating the transaction; and (c) negotiating presentation of at least one persona to the party to the transaction at least partly based on an evaluation of the transaction. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to (a) accept at least one request for personal information from a party to a transaction; (b) evaluate the transaction; and (c) negotiate presentation of at least one persona to the party to the transaction at least partly based on an evaluation of the transaction. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

With reference now to FIG. 1, shown is an example of a system for linking users of devices in which embodiments may be implemented, perhaps in a device and/or through a network, which may serve as a context for introducing one or more processes and/or devices described herein.

Figure 3:
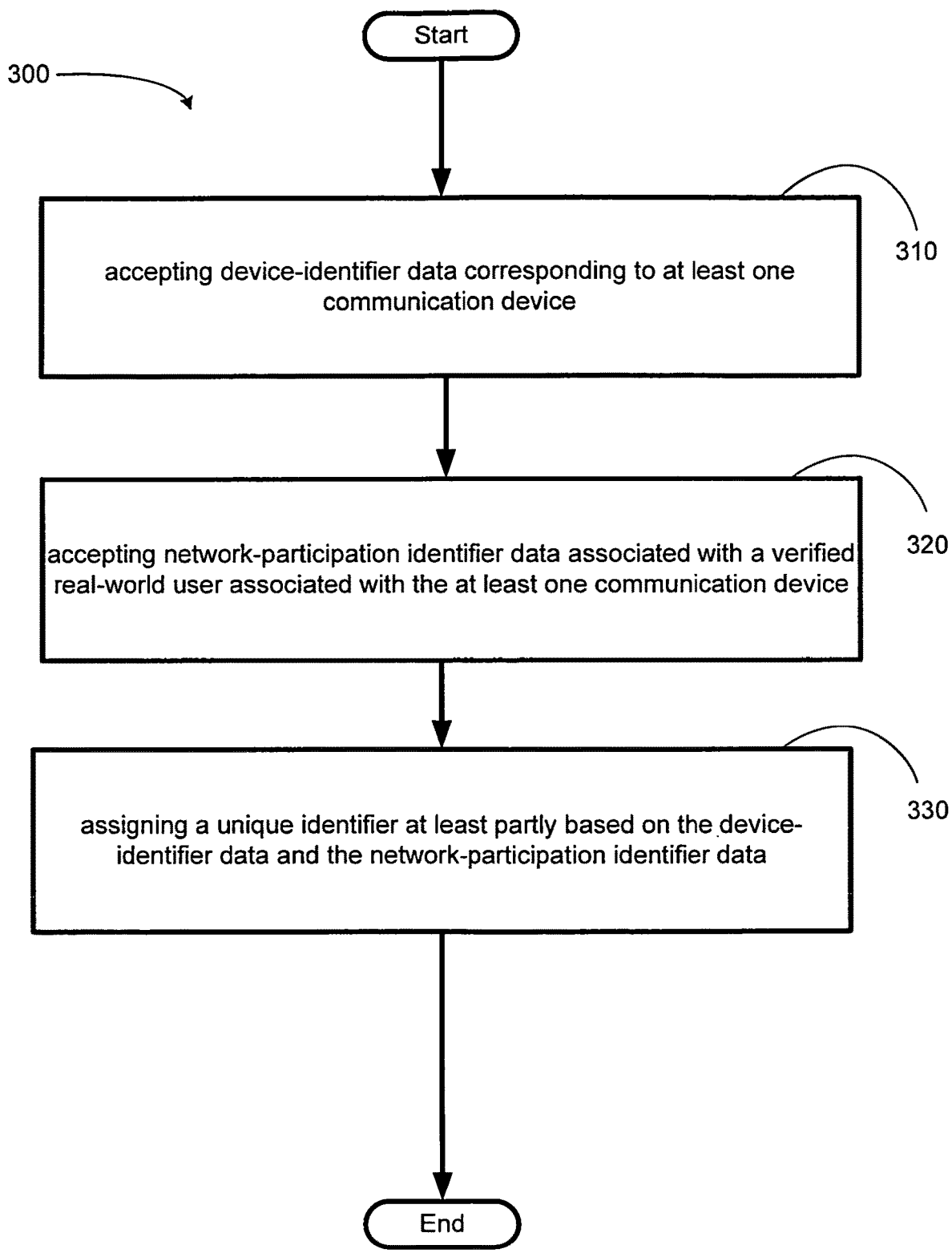

With reference now to FIG. 3, shown is an example of an operational flow representing example operations related to linking users of devices, which may serve as a context for introducing one or more processes and/or devices described herein.

Figure 4:
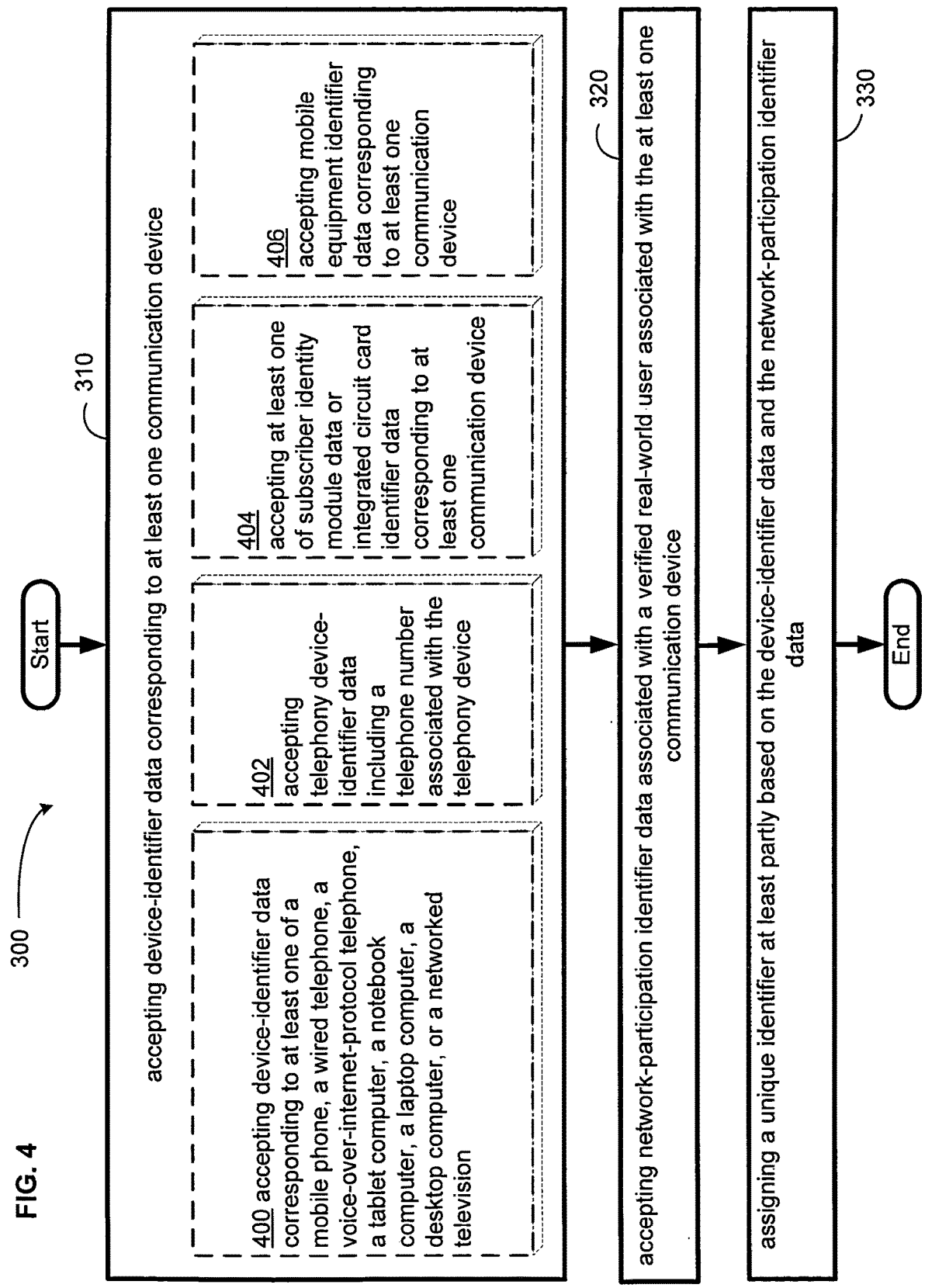

FIG. 4 illustrates an alternative embodiment of the example operational flow of FIG. 3.

Figure 5:
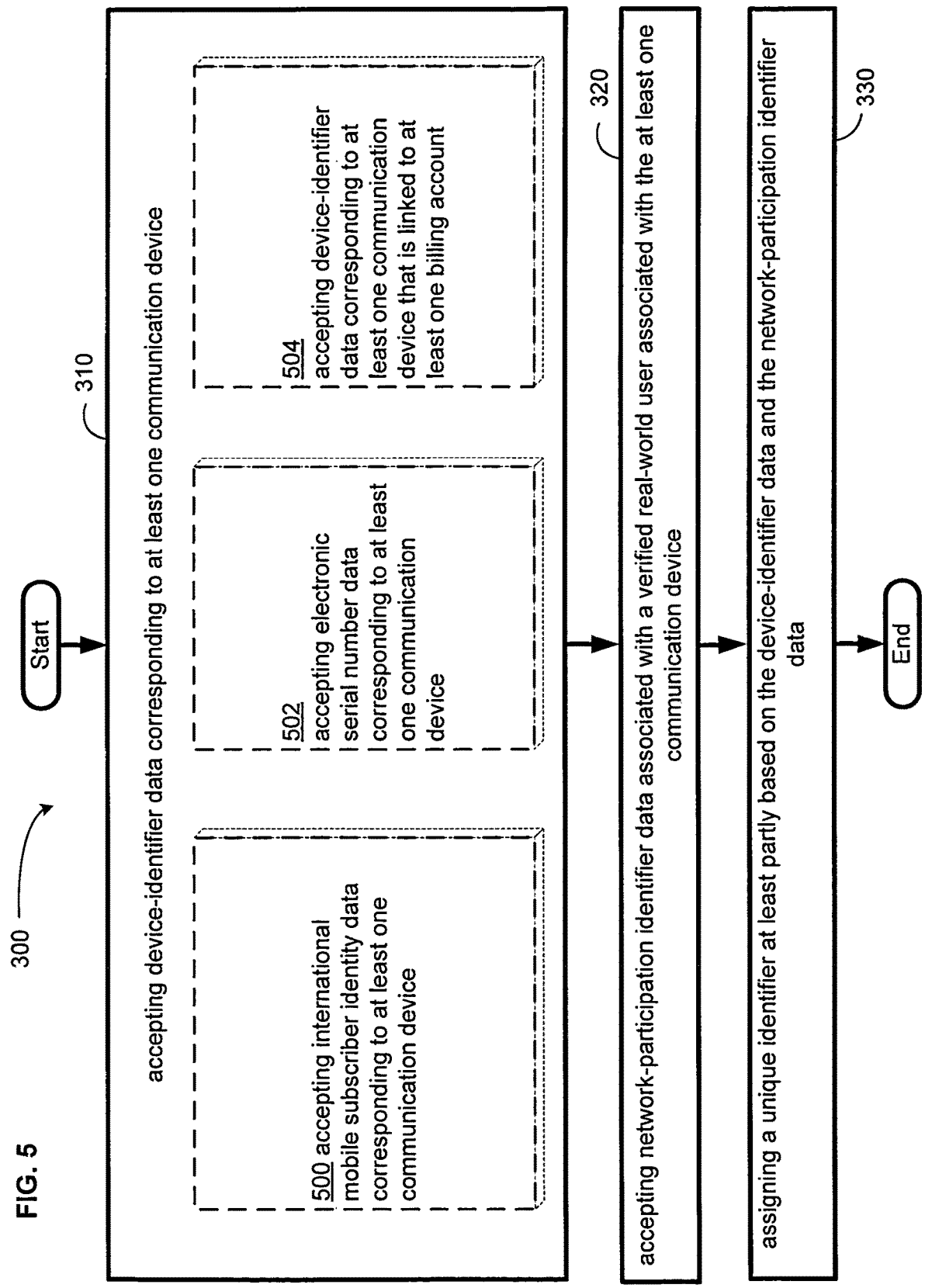

FIG. 5 illustrates an alternative embodiment of the example operational flow of FIG. 3.

Figure 6:
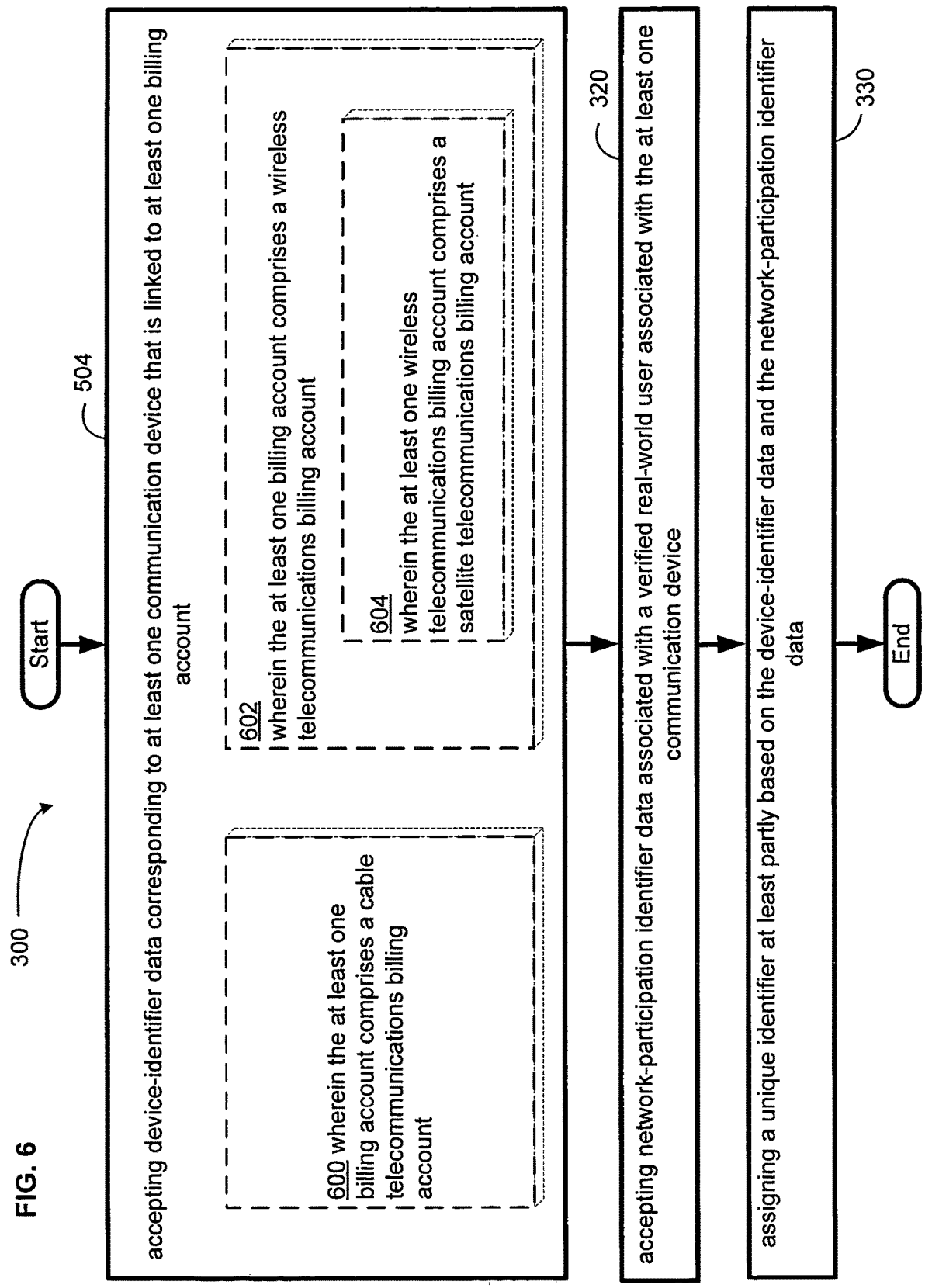

FIG. 6 illustrates an alternative embodiment of the example operational flow of FIG. 3.

Figure 7:
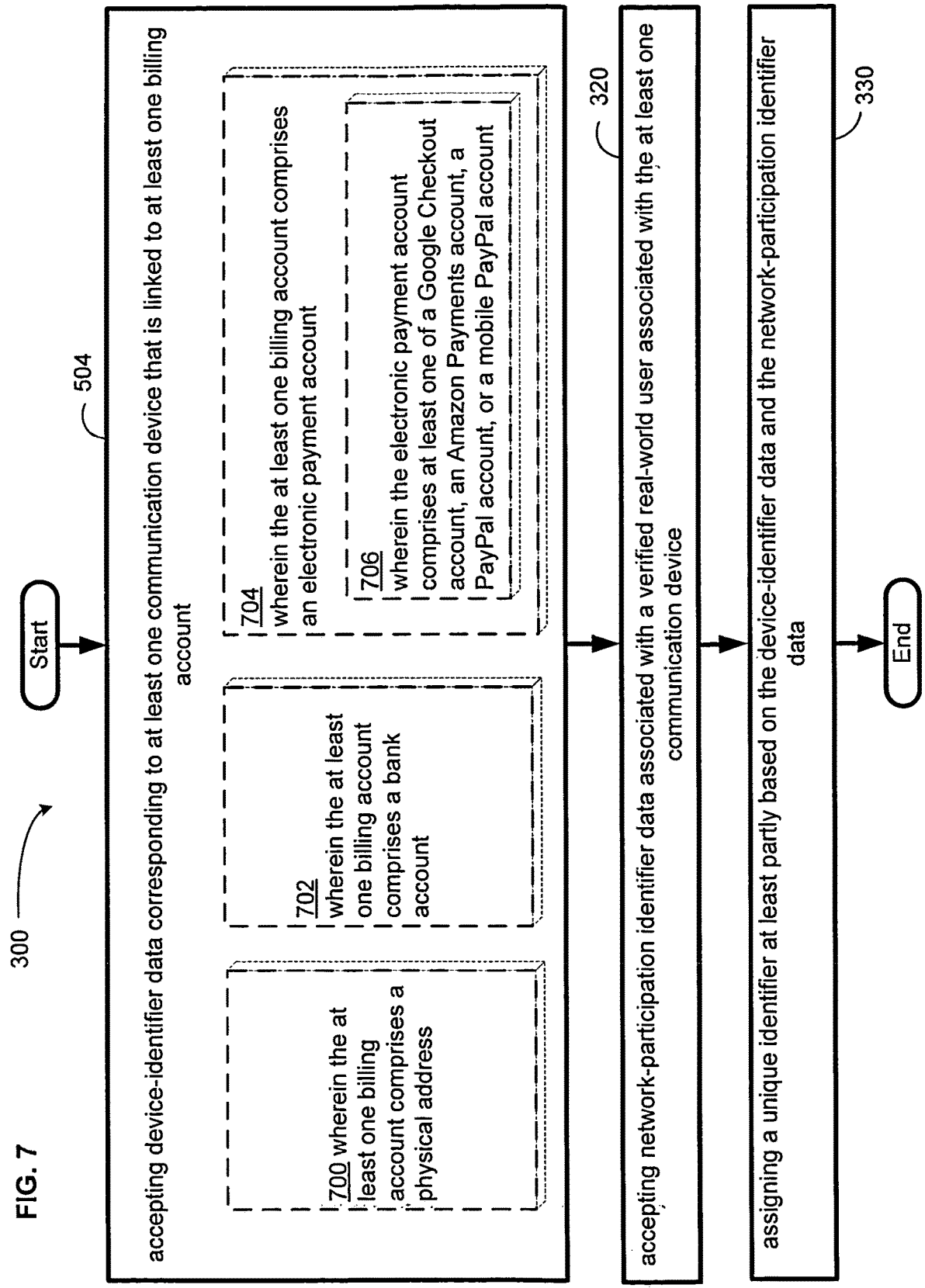

FIG. 7 illustrates an alternative embodiment of the example operational flow of FIG. 3.

Figure 8:
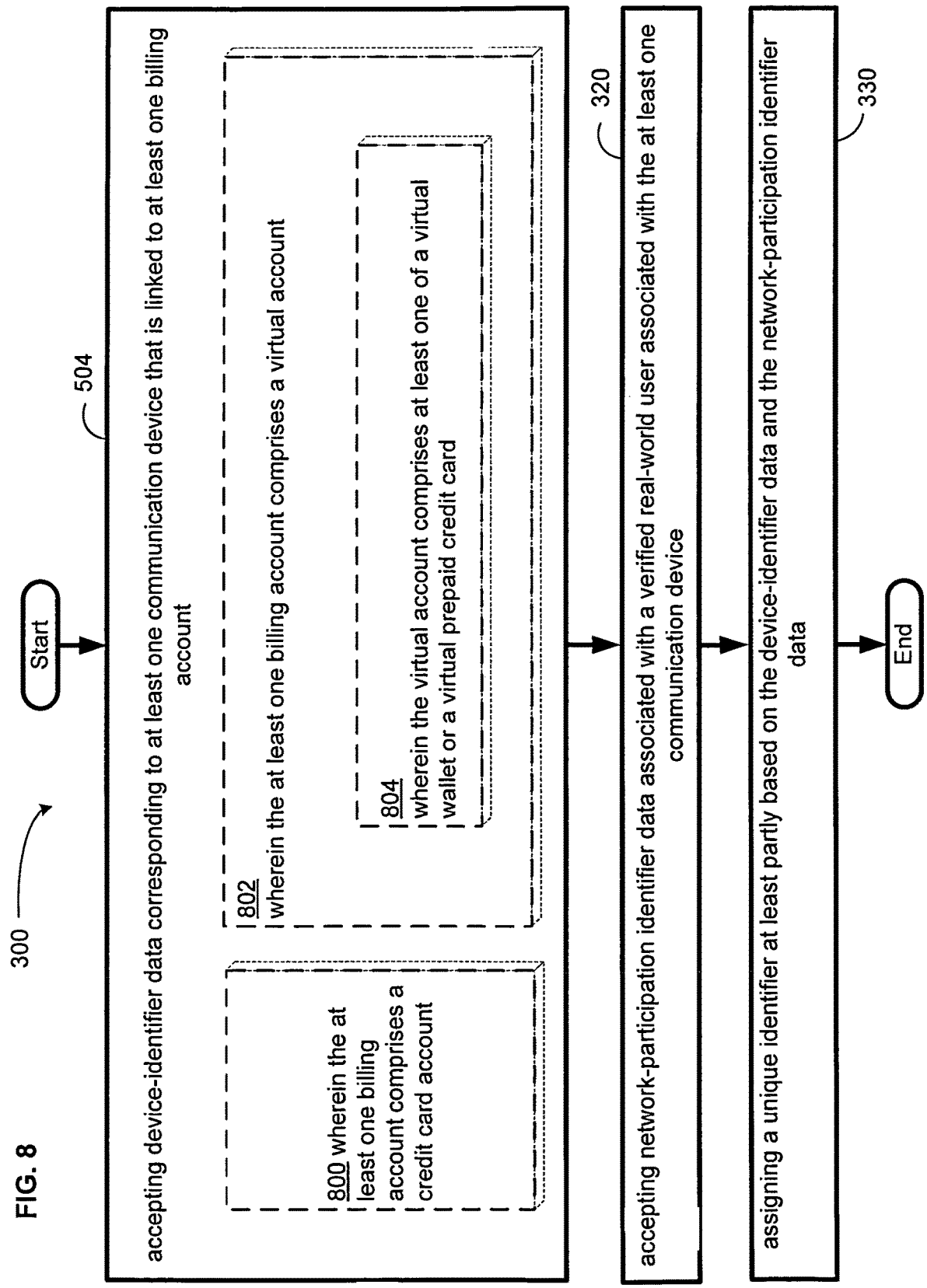

FIG. 8 illustrates an alternative embodiment of the example operational flow of FIG. 3.

Figure 9:
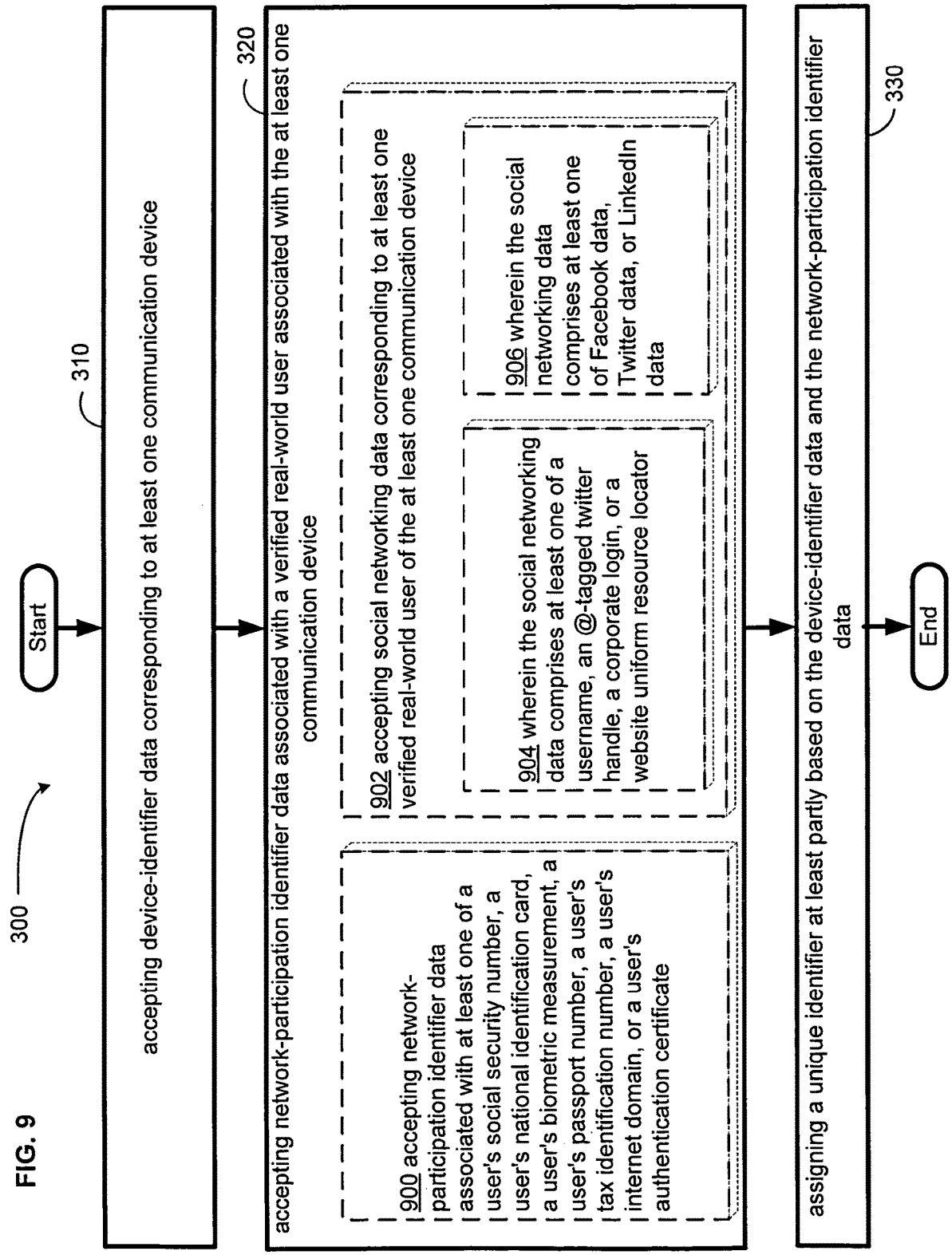

FIG. 9 illustrates an alternative embodiment of the example operational flow of FIG. 3.

Figure 10:
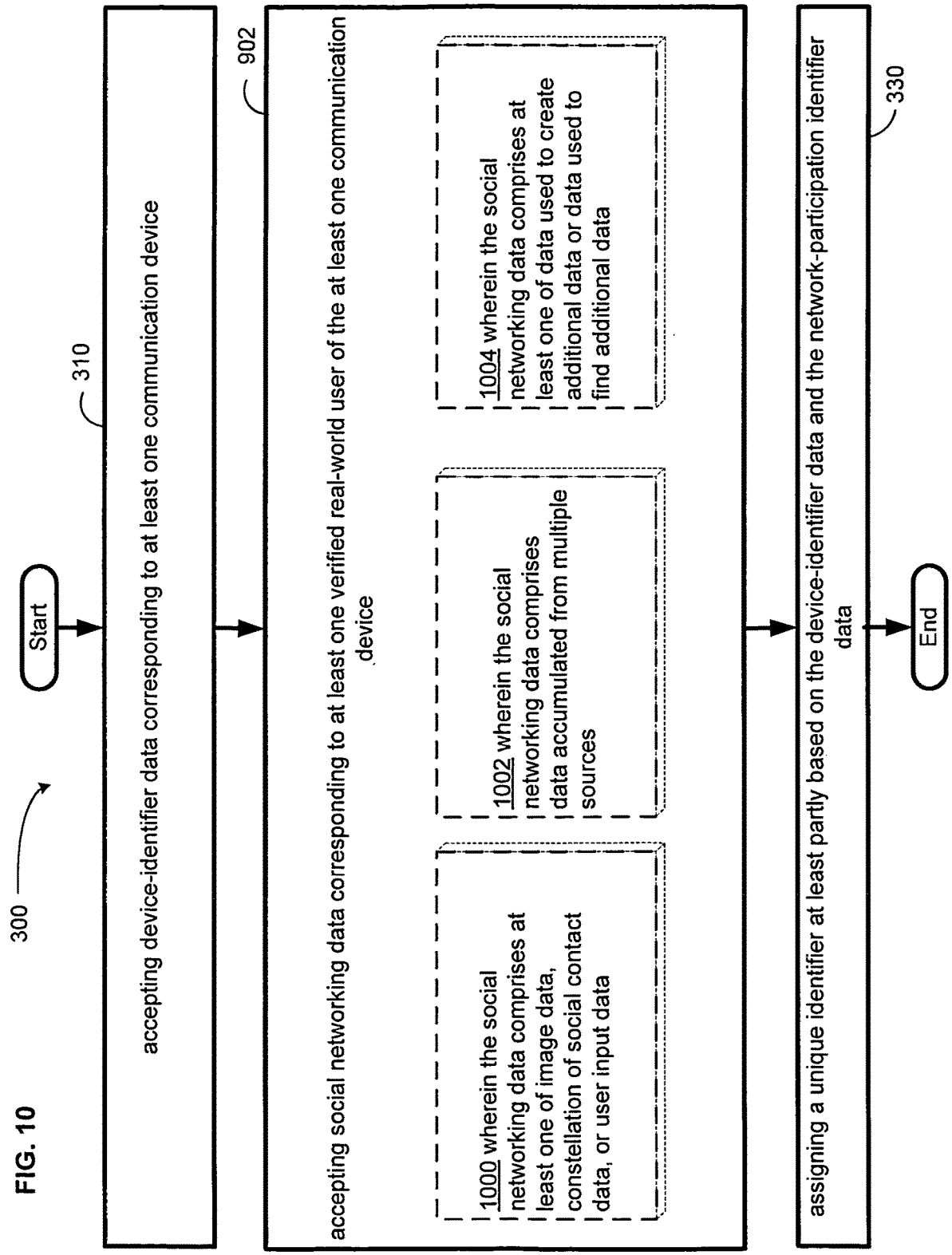

FIG. 10 illustrates an alternative embodiment of the example operational flow of FIG. 3.

Figure 11:
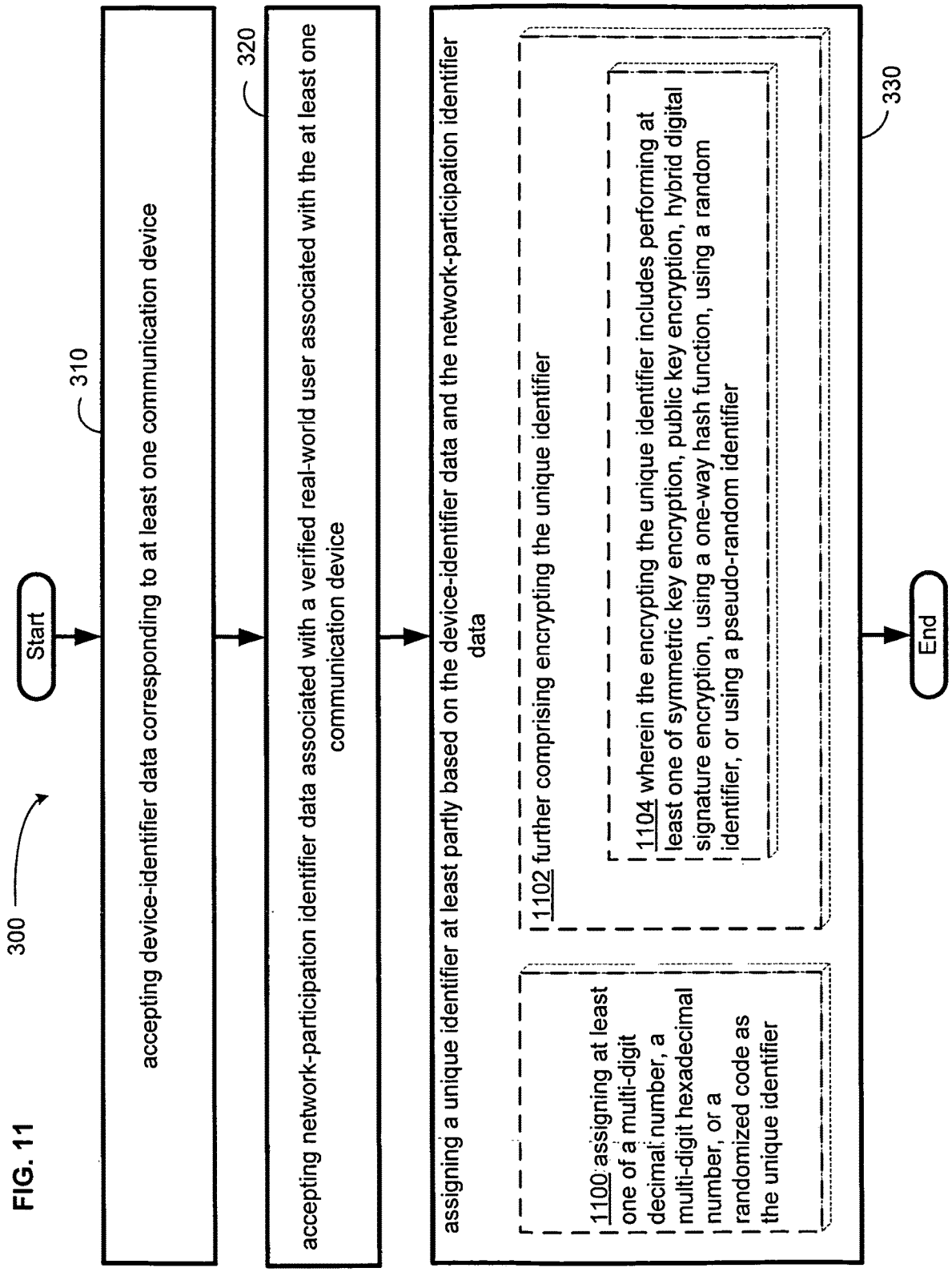

FIG. 11 illustrates an alternative embodiment of the example operational flow of FIG. 3.

Figure 12:
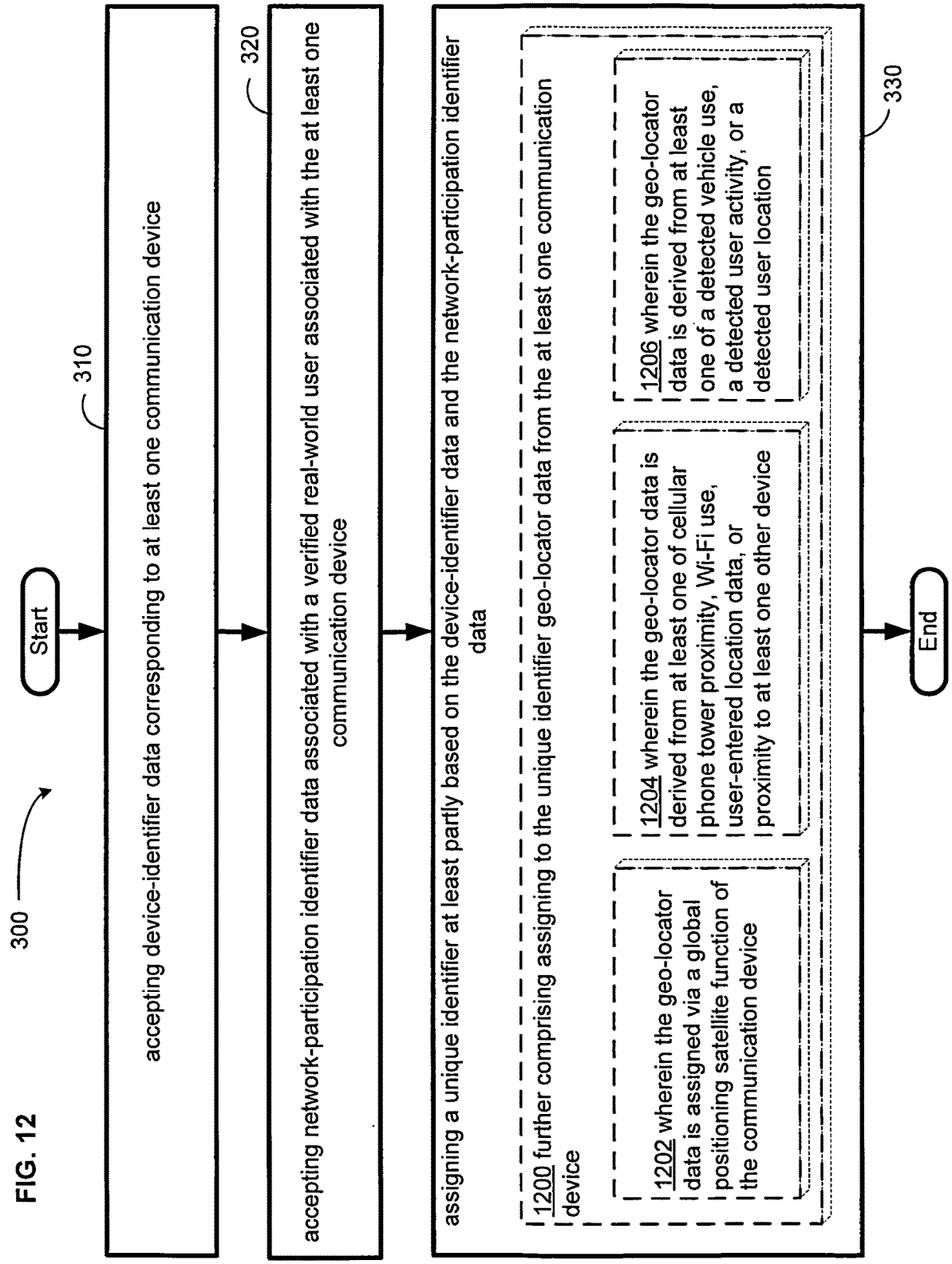

FIG. 12 illustrates an alternative embodiment of the example operational flow of FIG. 3.

FIG. 13 illustrates an alternative embodiment of the example operational flow of FIG. 3.

With reference now to FIG. 14, shown is a partial view of an example article of manufacture including a computer program product that includes a computer program for executing a computer process on a computing device related to linking users of devices, which may serve as a context for introducing one or more processes and/or devices described herein.

With reference now to FIG. 15, shown is an example device in which embodiments may be implemented related to linking users of devices, which may serve as a context for introducing one or more processes and/or devices described herein.

Figure 16:
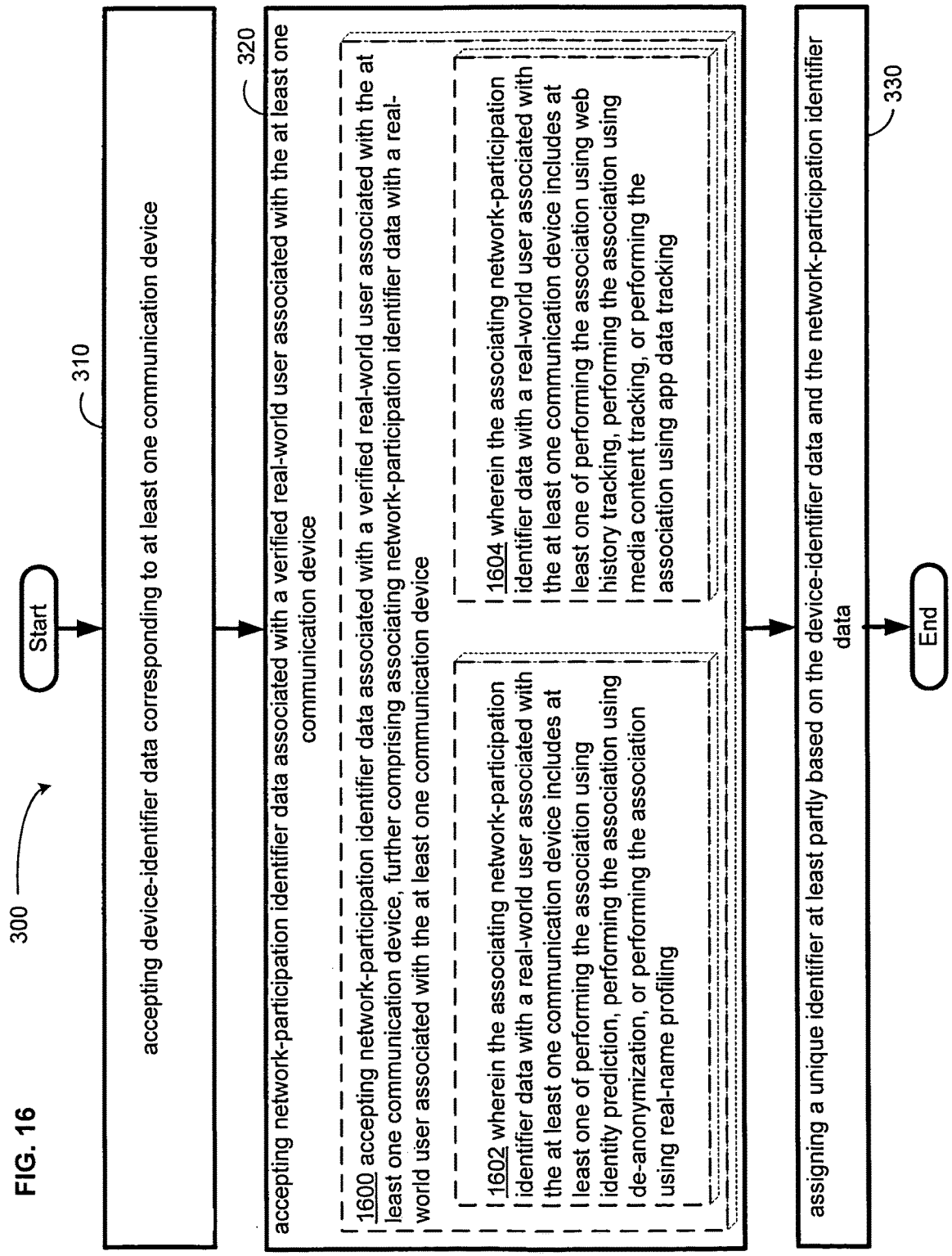

FIG. 16 illustrates an alternative embodiment of the example operational flow of FIG. 3.

Figure 17:
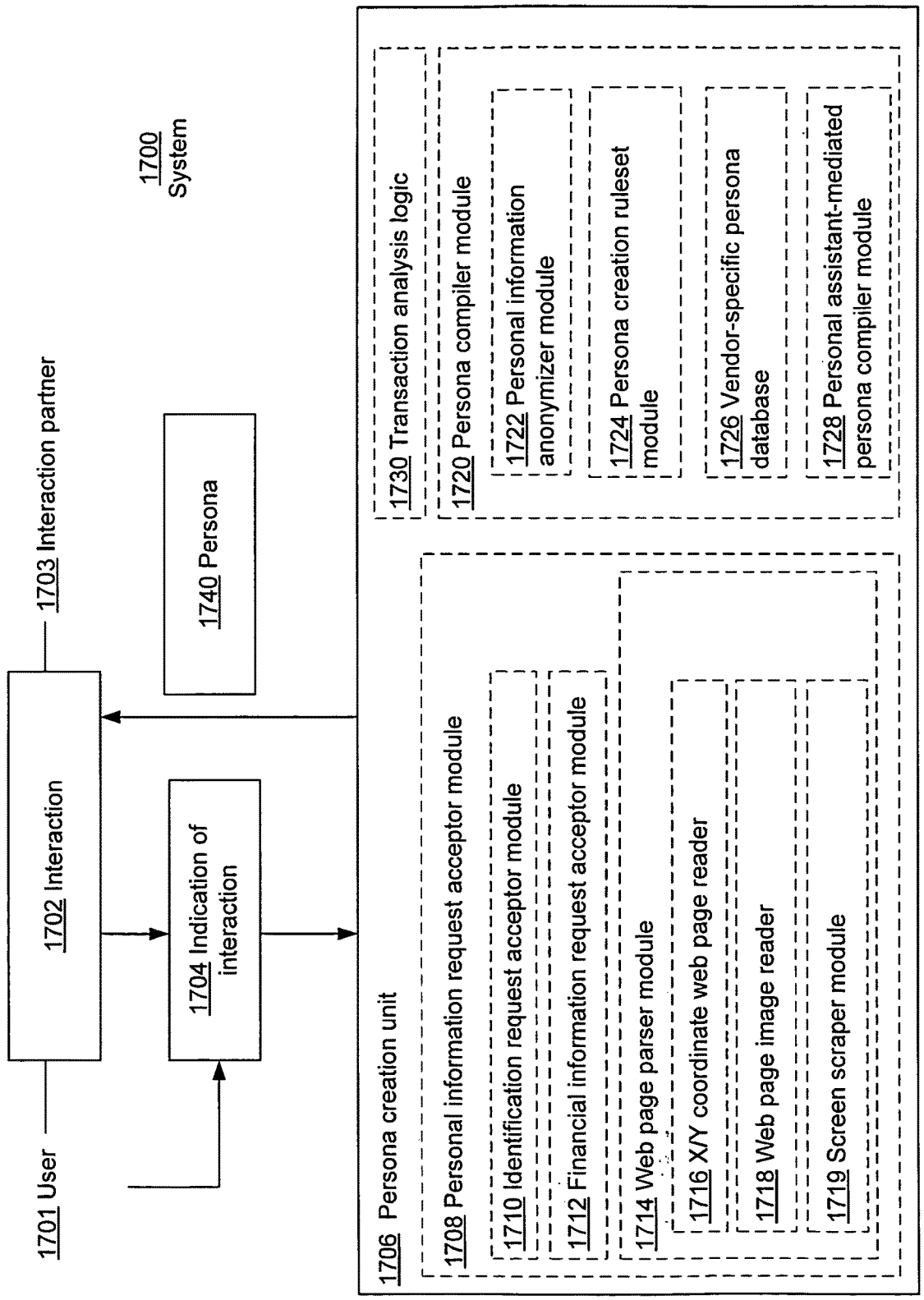

With reference now to FIG. 17, shown is an example of a system for regulating information flow during interactions in which embodiments may be implemented, perhaps in a device and/or through a network, which may serve as a context for introducing one or more processes and/or devices described herein.

Figure 18:
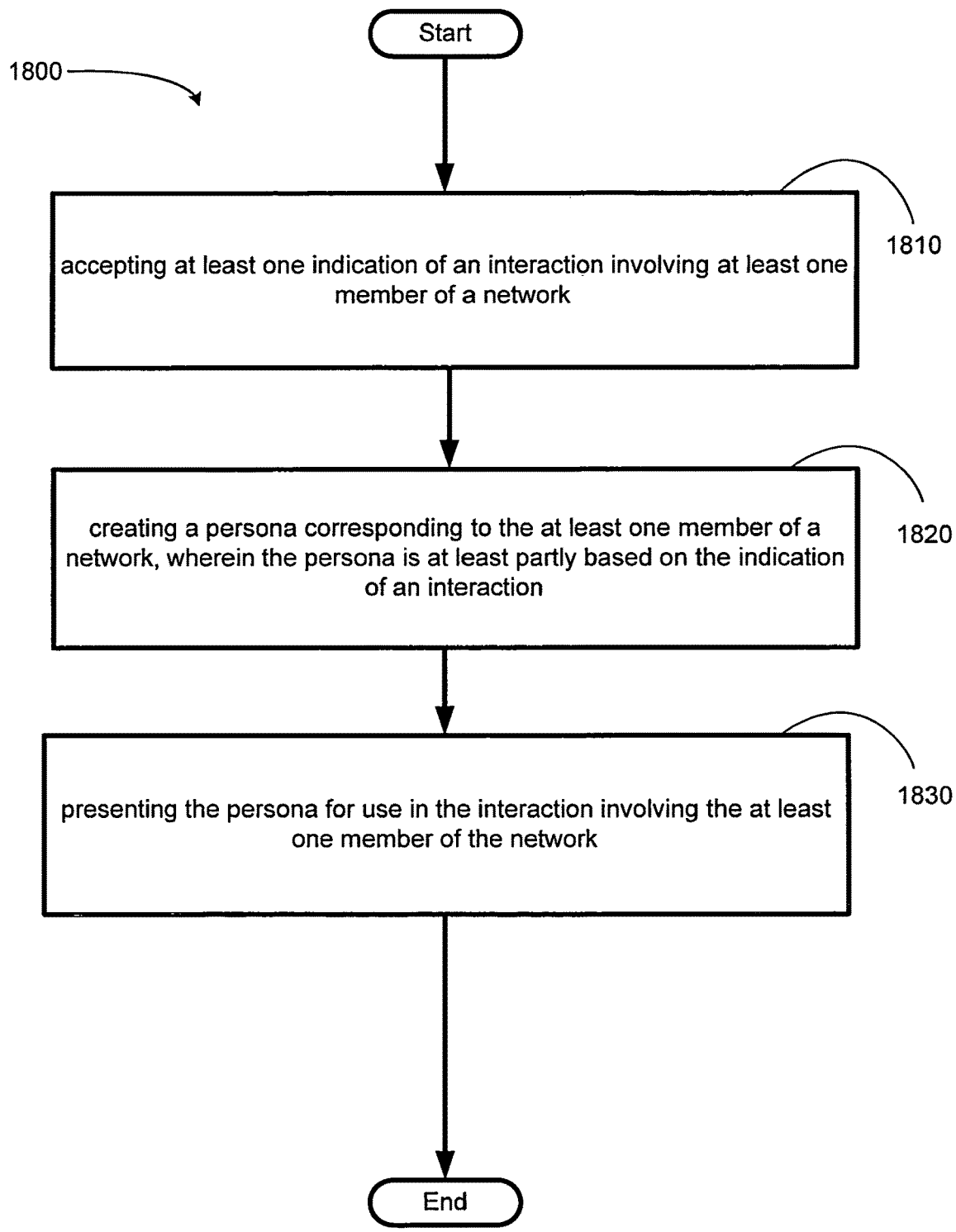

With reference now to FIG. 18, shown is an example of an operational flow representing example operations related to regulating information flow during interactions, which may serve as a context for introducing one or more processes and/or devices described herein.

Figure 19:
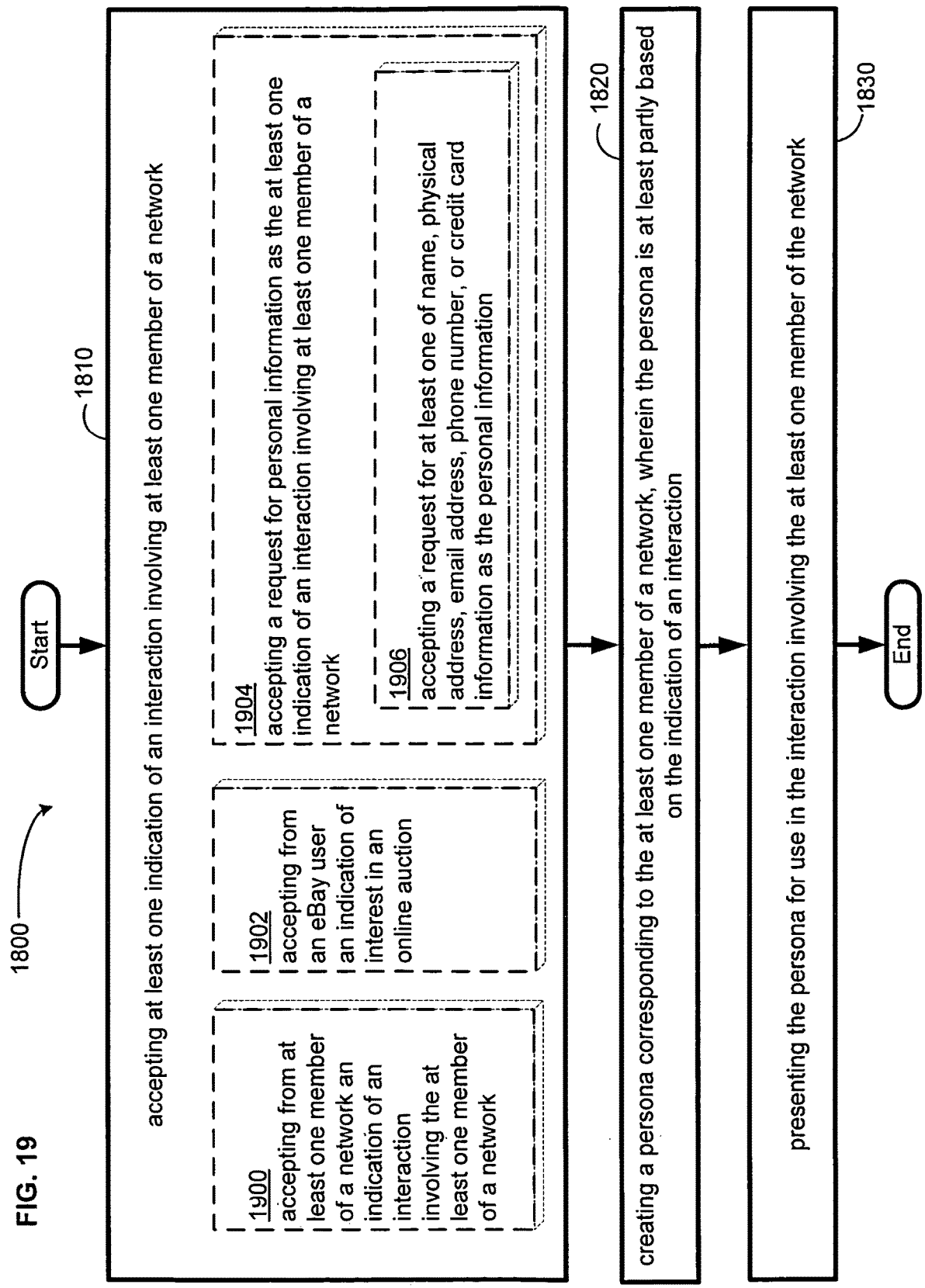

FIG. 19 illustrates an alternative embodiment of the example operational flow of FIG. 18.

Figure 20:
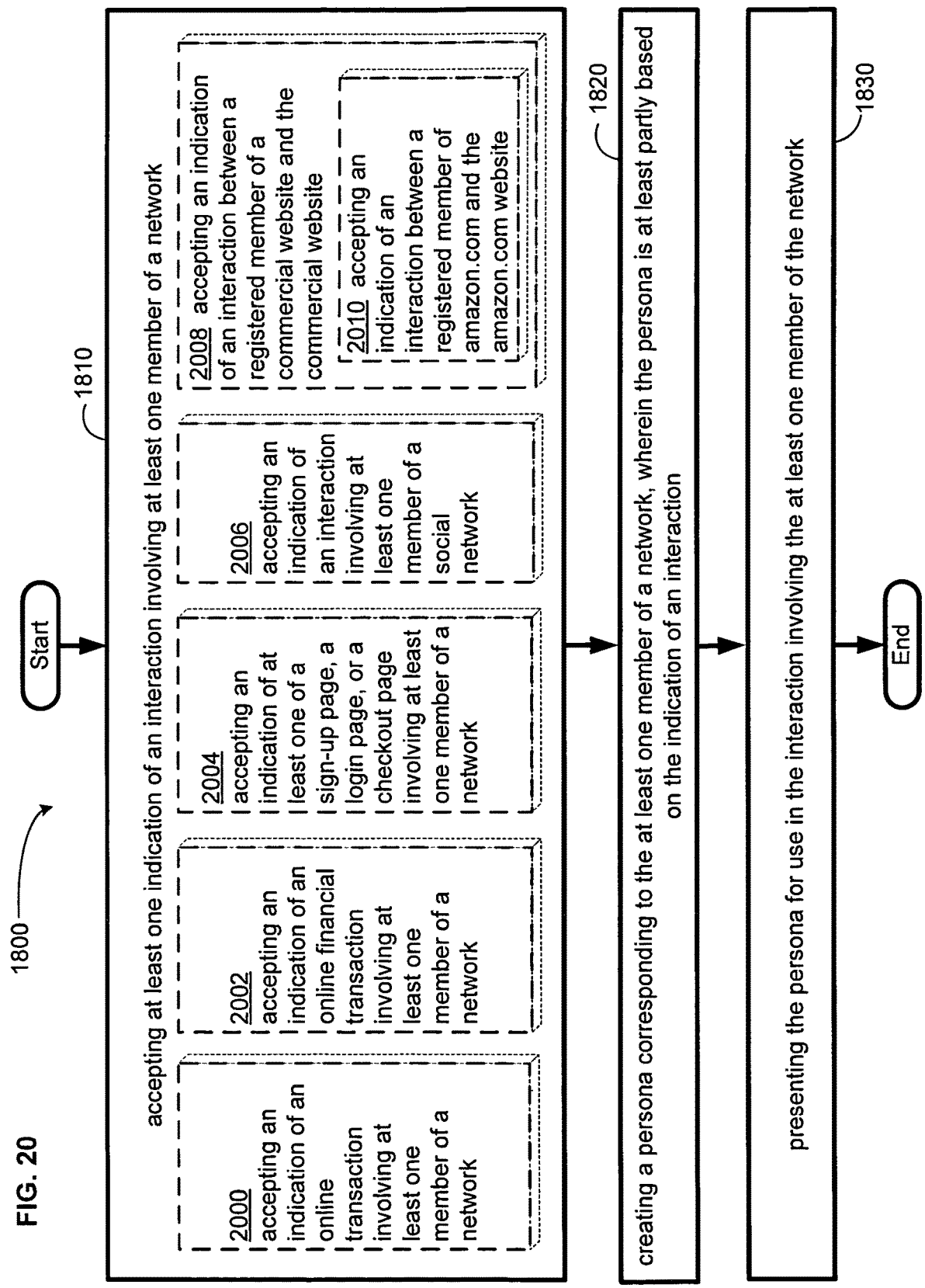

FIG. 20 illustrates an alternative embodiment of the example operational flow of FIG. 18.

Figure 21:
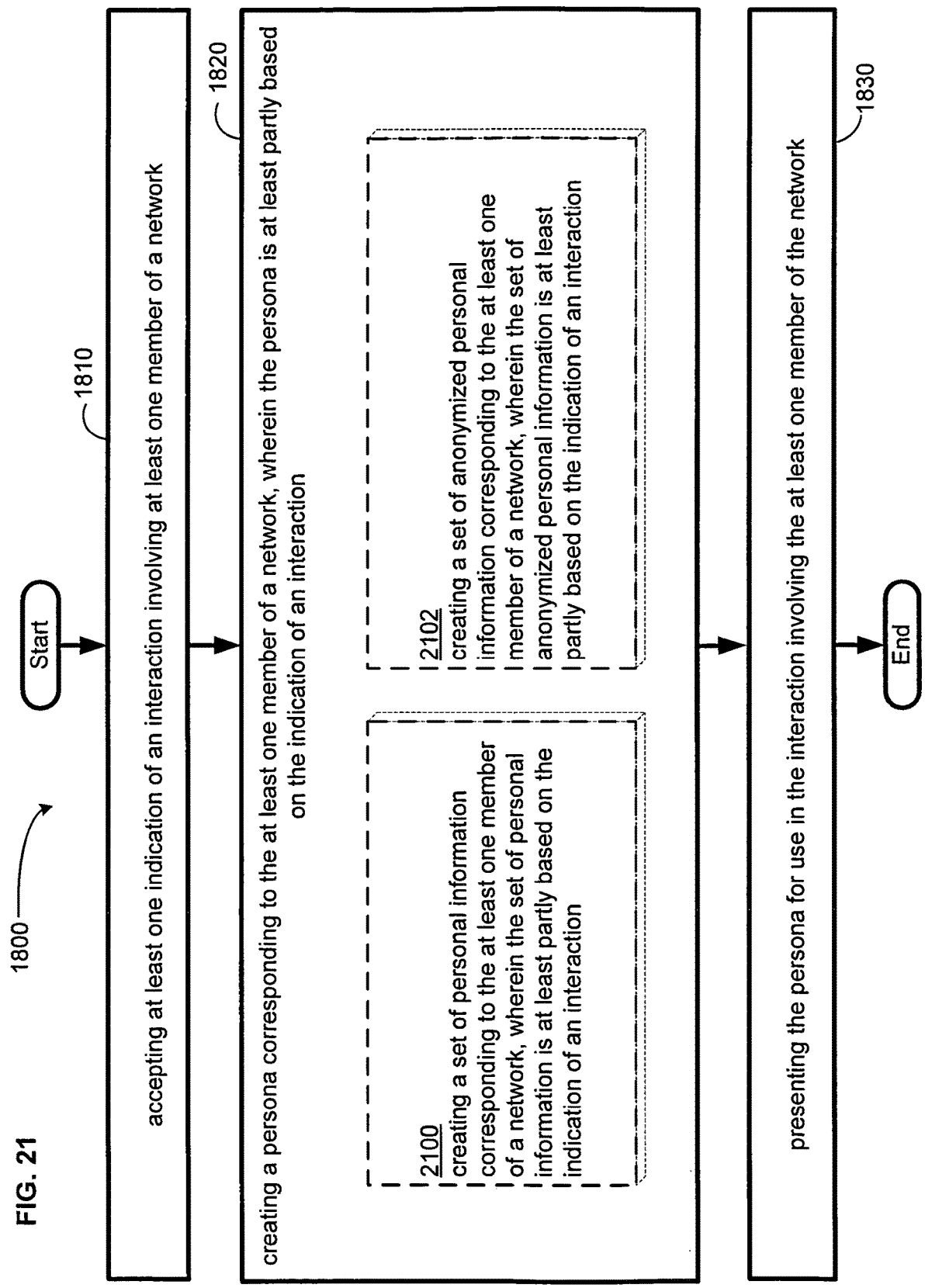

FIG. 21 illustrates an alternative embodiment of the example operational flow of FIG. 18.

Figure 22:
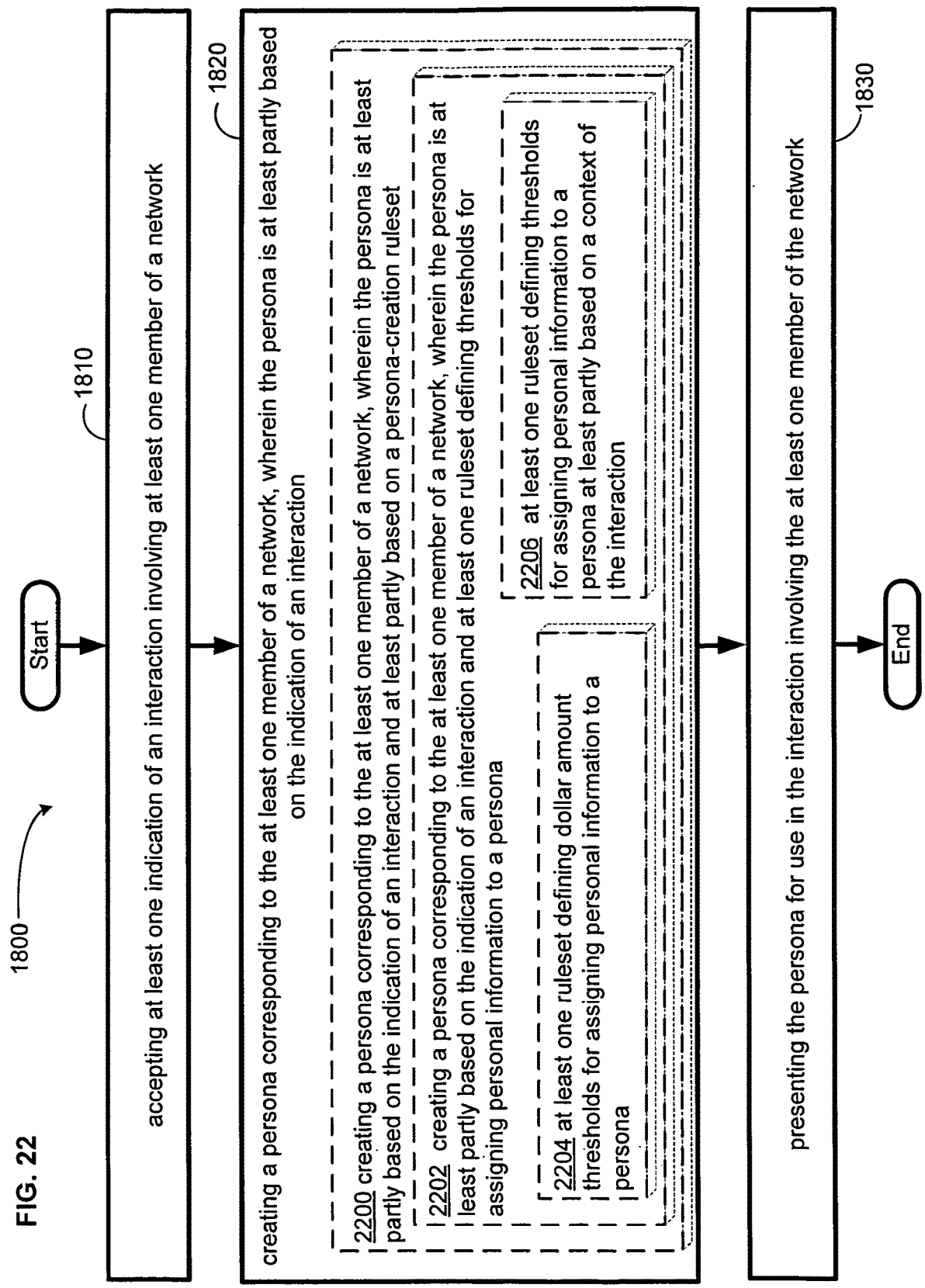

FIG. 22 illustrates an alternative embodiment of the example operational flow of FIG. 18.

Figure 23:
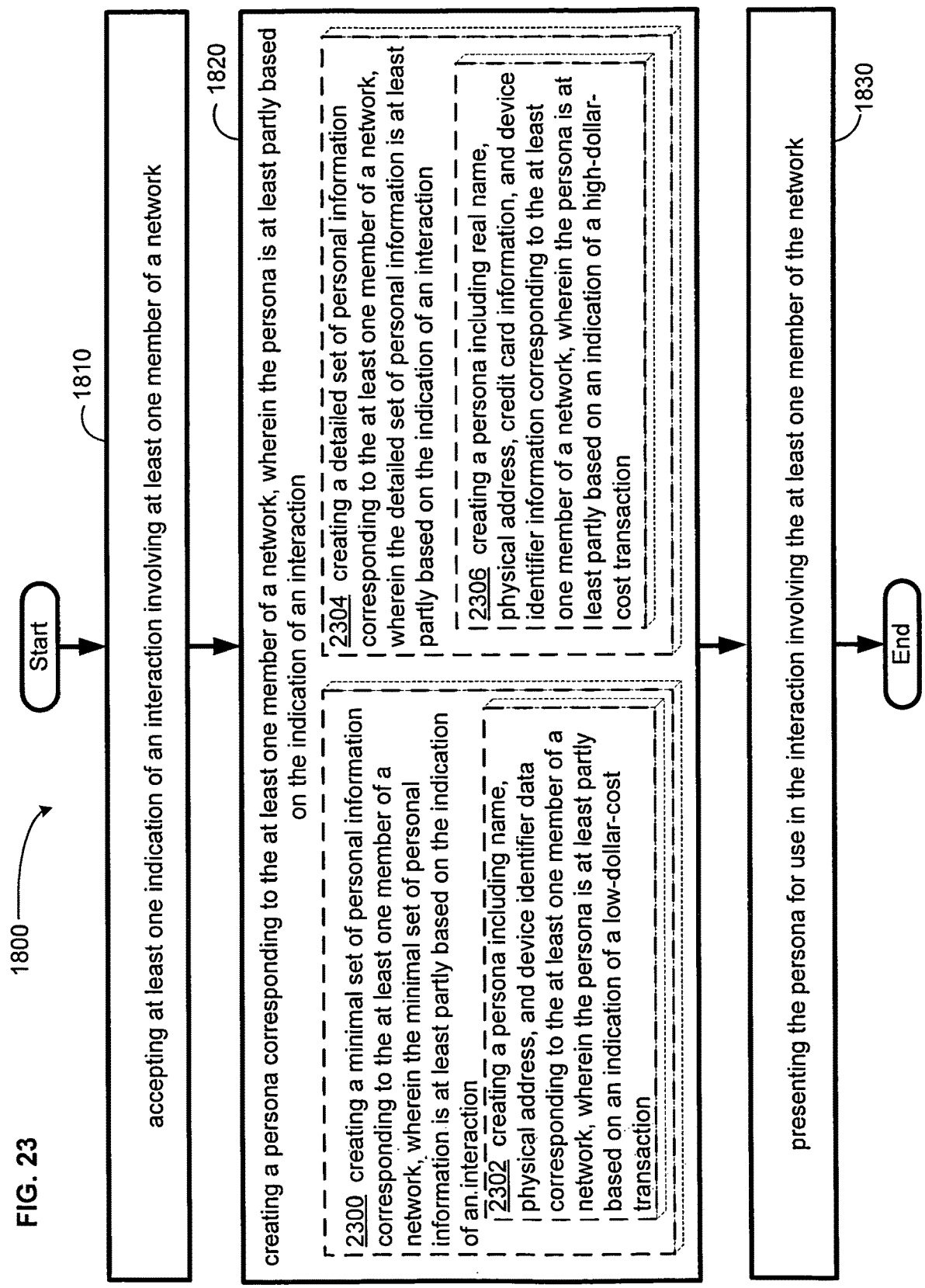

FIG. 23 illustrates an alternative embodiment of the example operational flow of FIG. 18.

Figure 24:
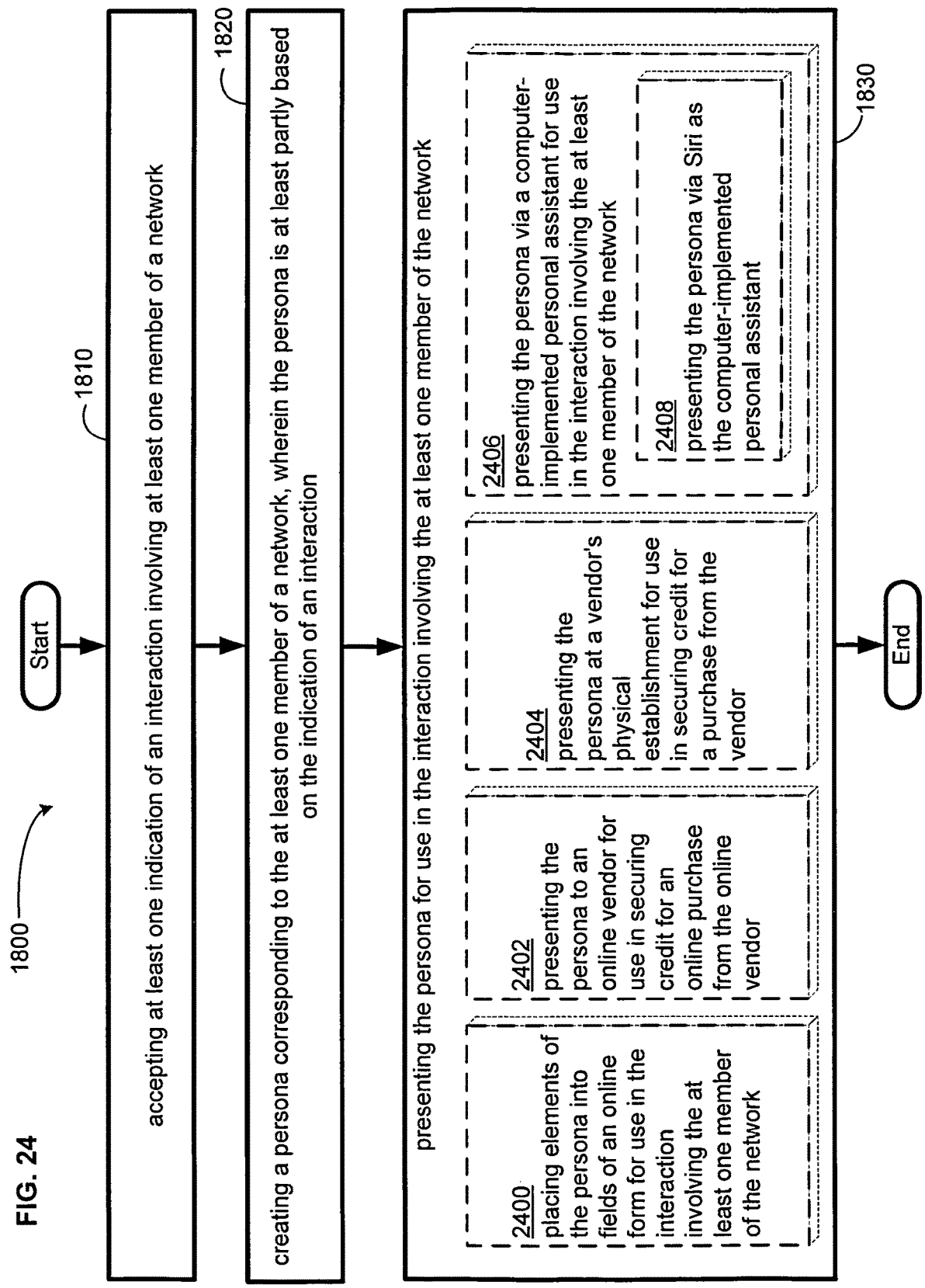

FIG. 24 illustrates an alternative embodiment of the example operational flow of FIG. 18.

Figure 25:
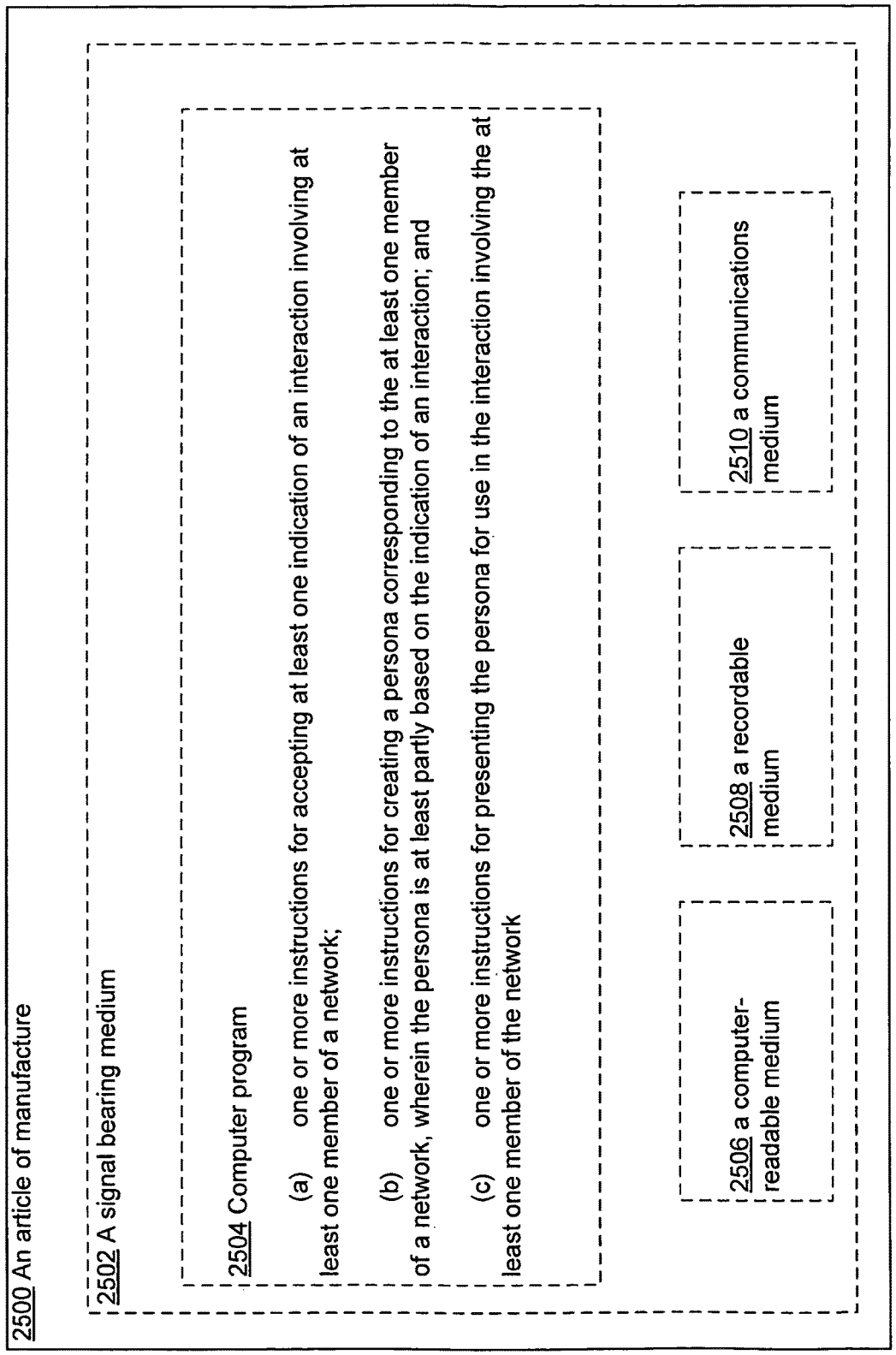

With reference now to FIG. 25, shown is a partial view of an example article of manufacture including a computer program product that includes a computer program for executing a computer process on a computing device related to regulating information flow during interactions, which may serve as a context for introducing one or more processes and/or devices described herein.

Figure 26:
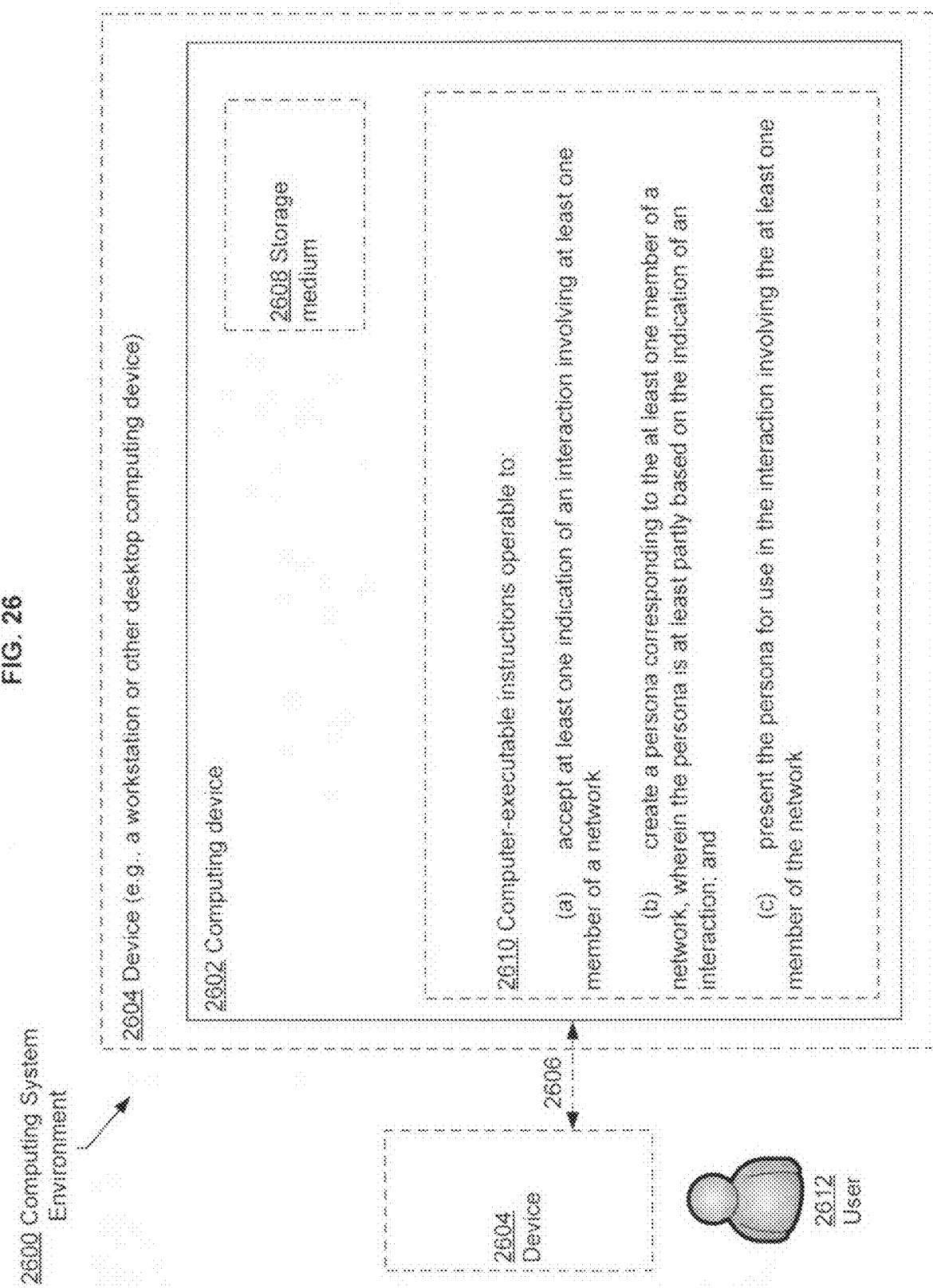

With reference now to FIG. 26, shown is an example device in which embodiments may be implemented related to regulating information flow during interactions, which may serve as a context for introducing one or more processes and/or devices described herein.

Figure 27:
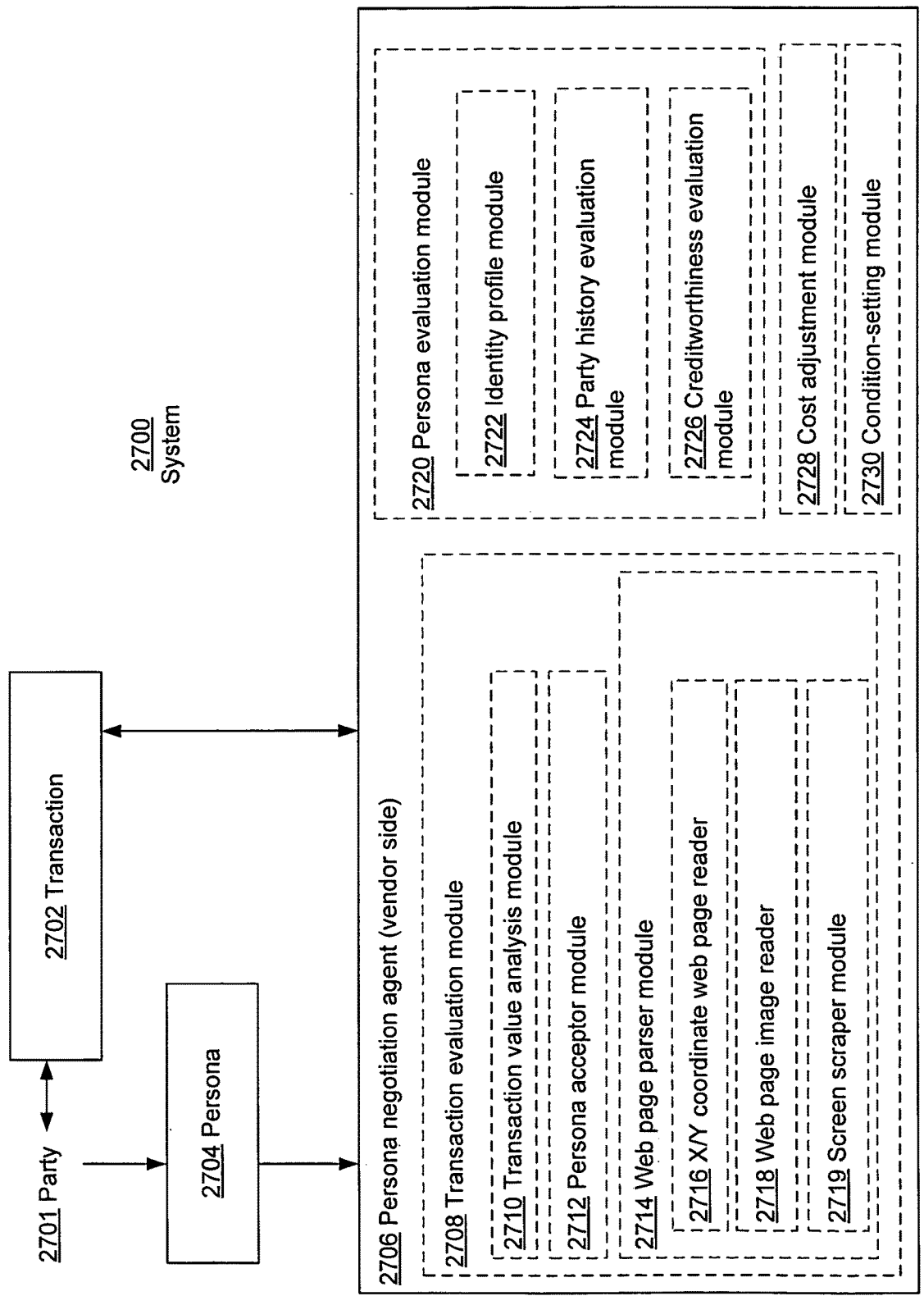

With reference now to FIG. 27, shown is an example of a system for regulating information flow during interactions in which embodiments may be implemented, perhaps in a device and/or through a network, which may serve as a context for introducing one or more processes and/or devices described herein.

Figure 28:
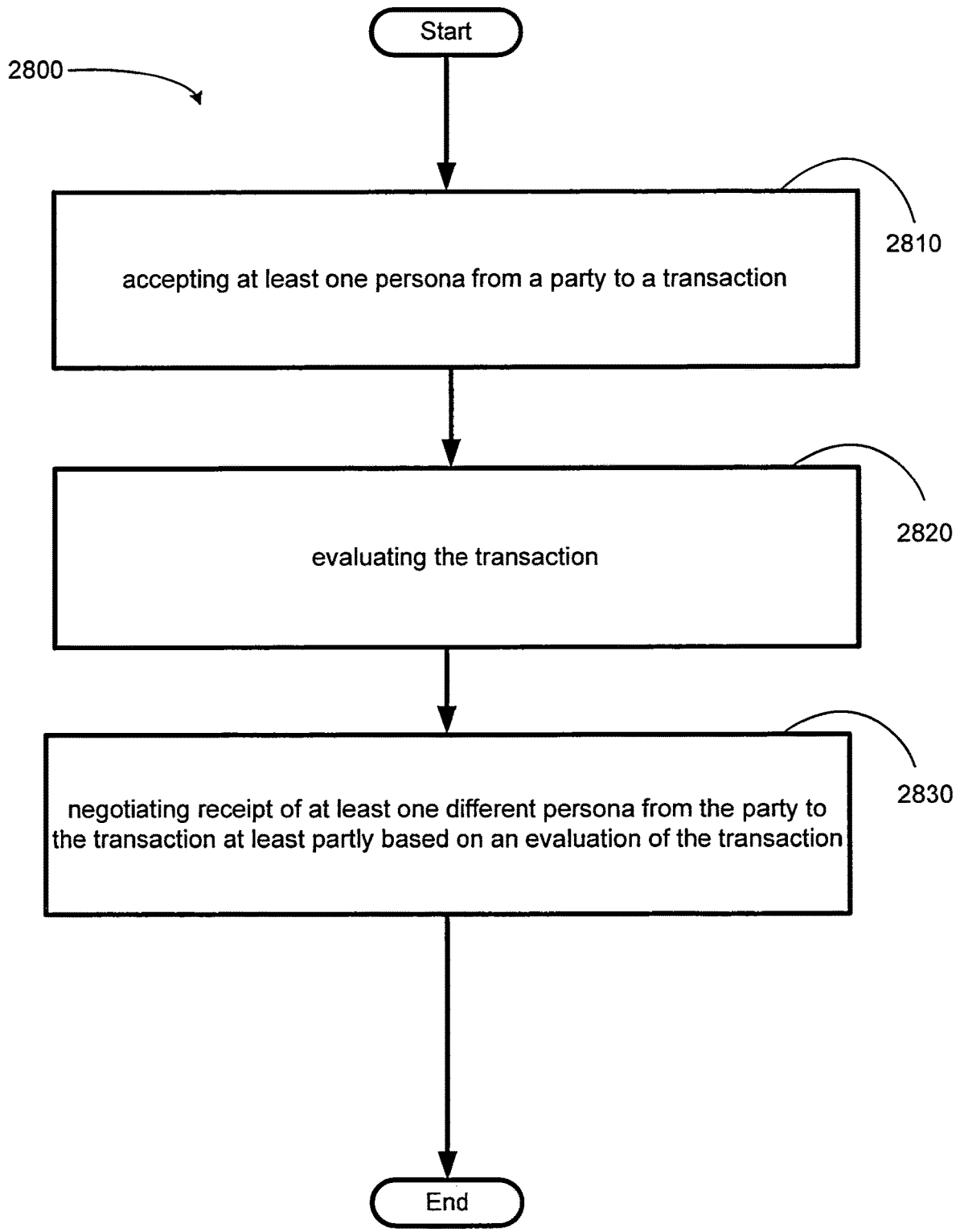

With reference now to FIG. 28, shown is an example of an operational flow representing example operations related to regulating information flow during interactions, which may serve as a context for introducing one or more processes and/or devices described herein.

Figure 29:
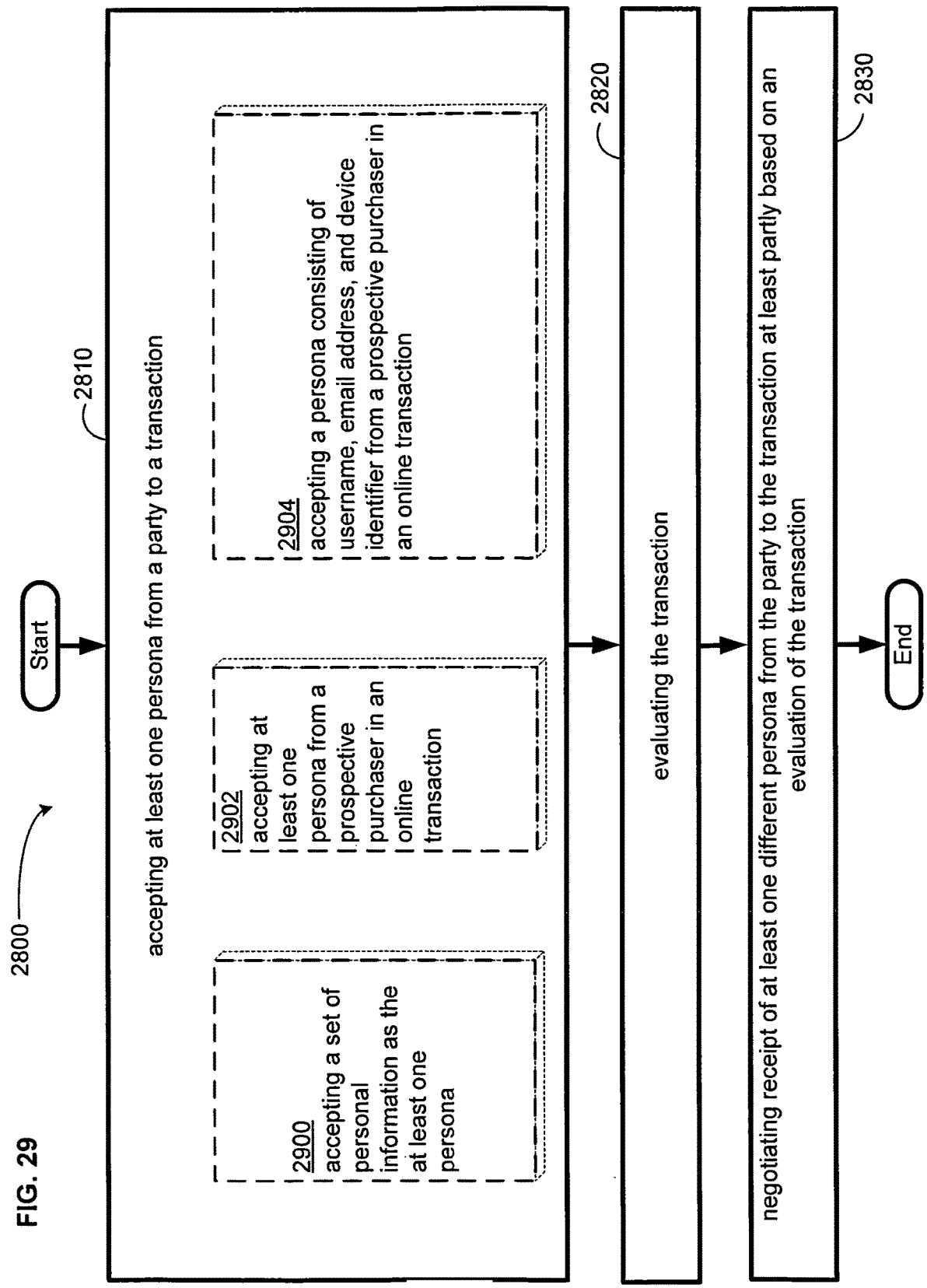

FIG. 29 illustrates an alternative embodiment of the example operational flow of FIG. 28.

Figure 30:
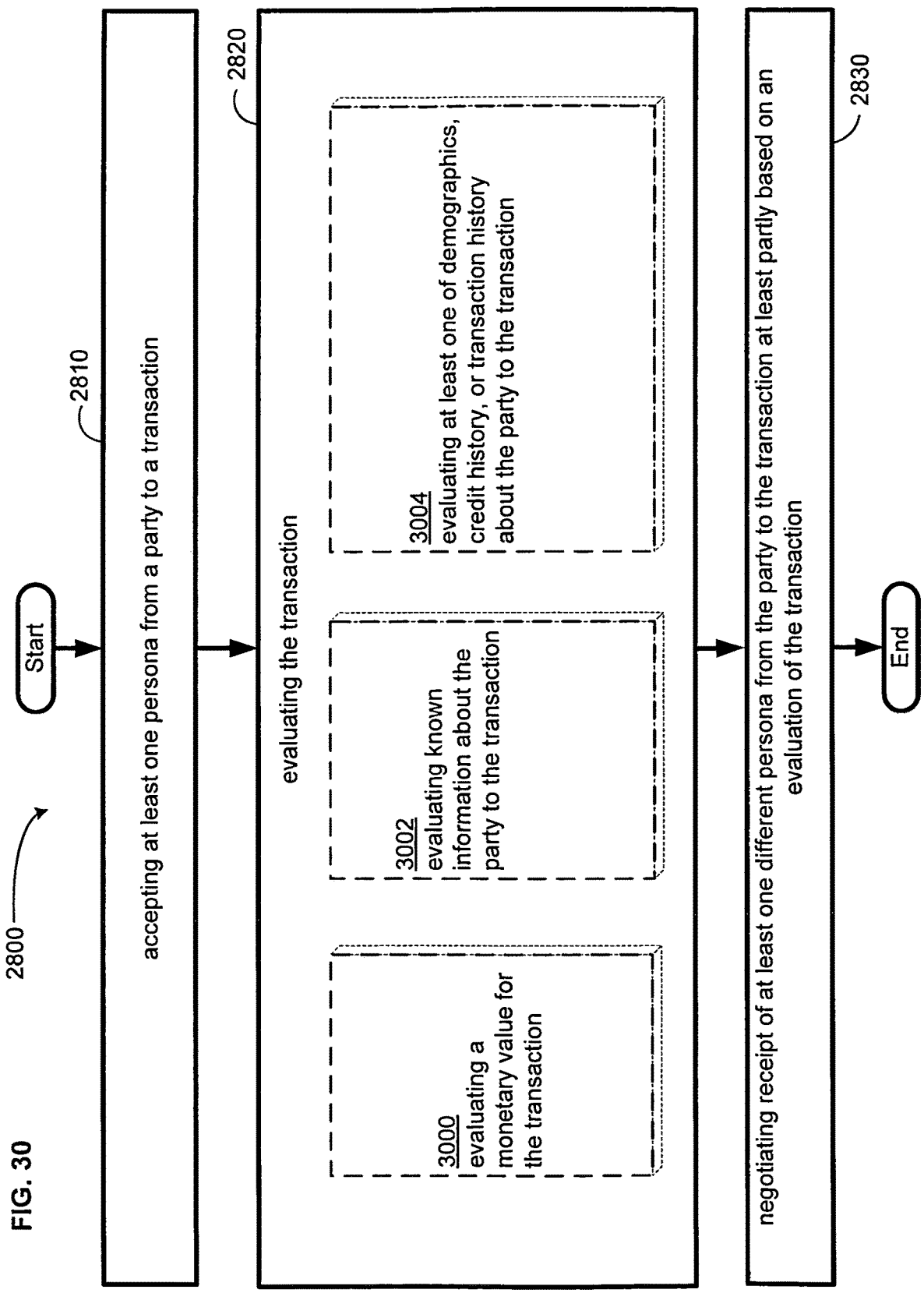

FIG. 30 illustrates an alternative embodiment of the example operational flow of FIG. 28.

Figure 31:
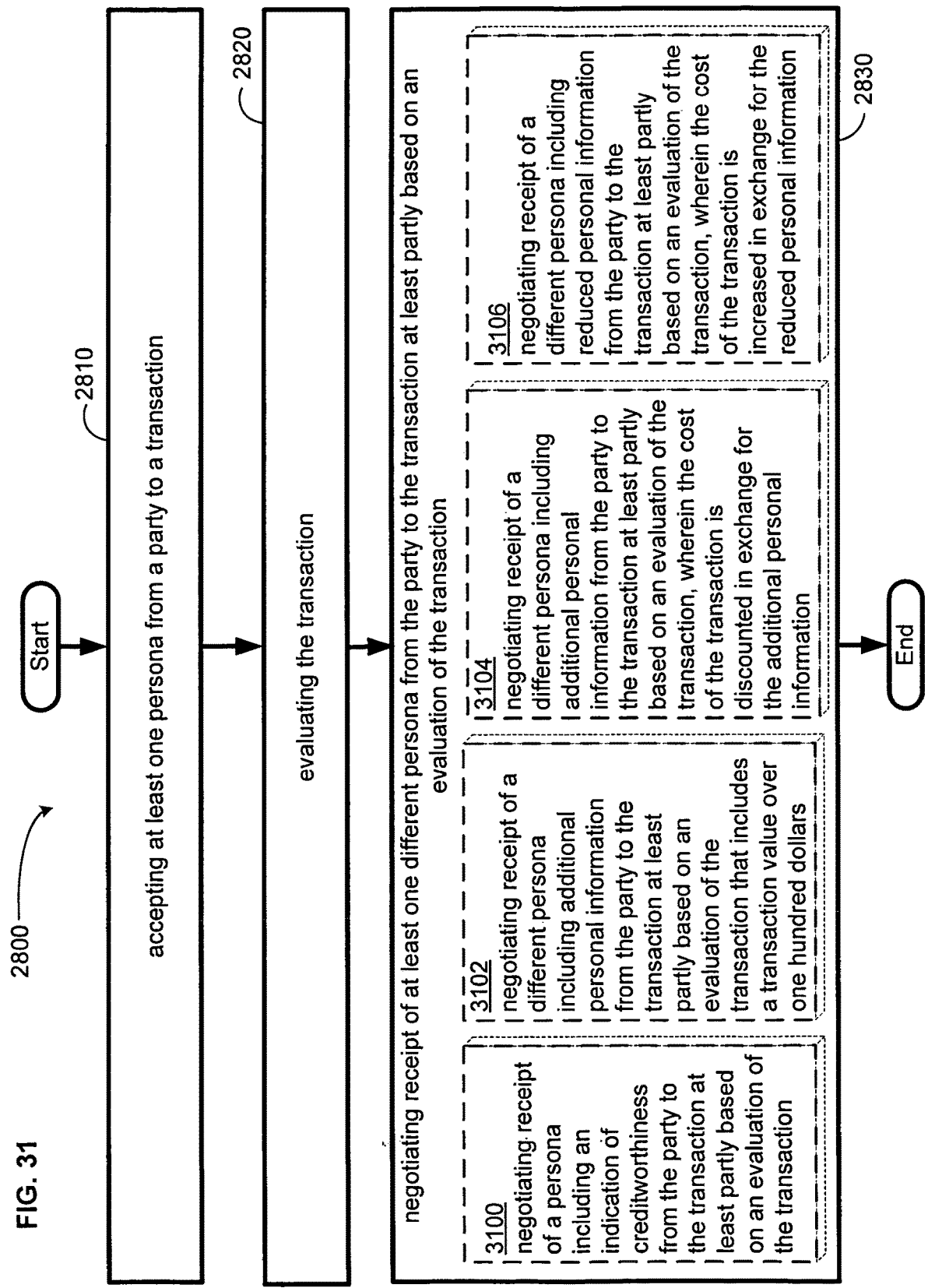

FIG. 31 illustrates an alternative embodiment of the example operational flow of FIG. 28.

Figure 32:
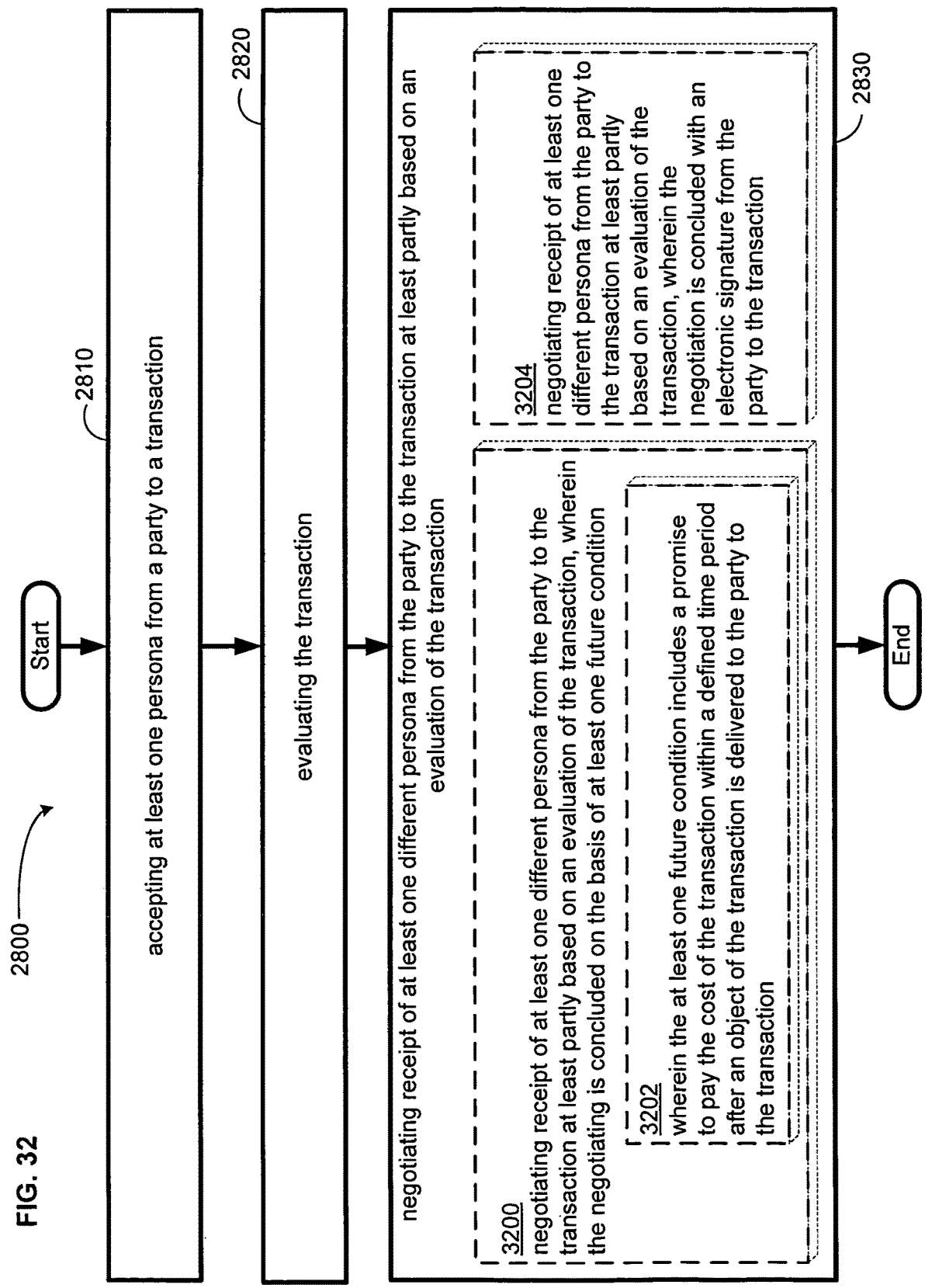

FIG. 32 illustrates an alternative embodiment of the example operational flow of FIG. 28.

Figure 33:
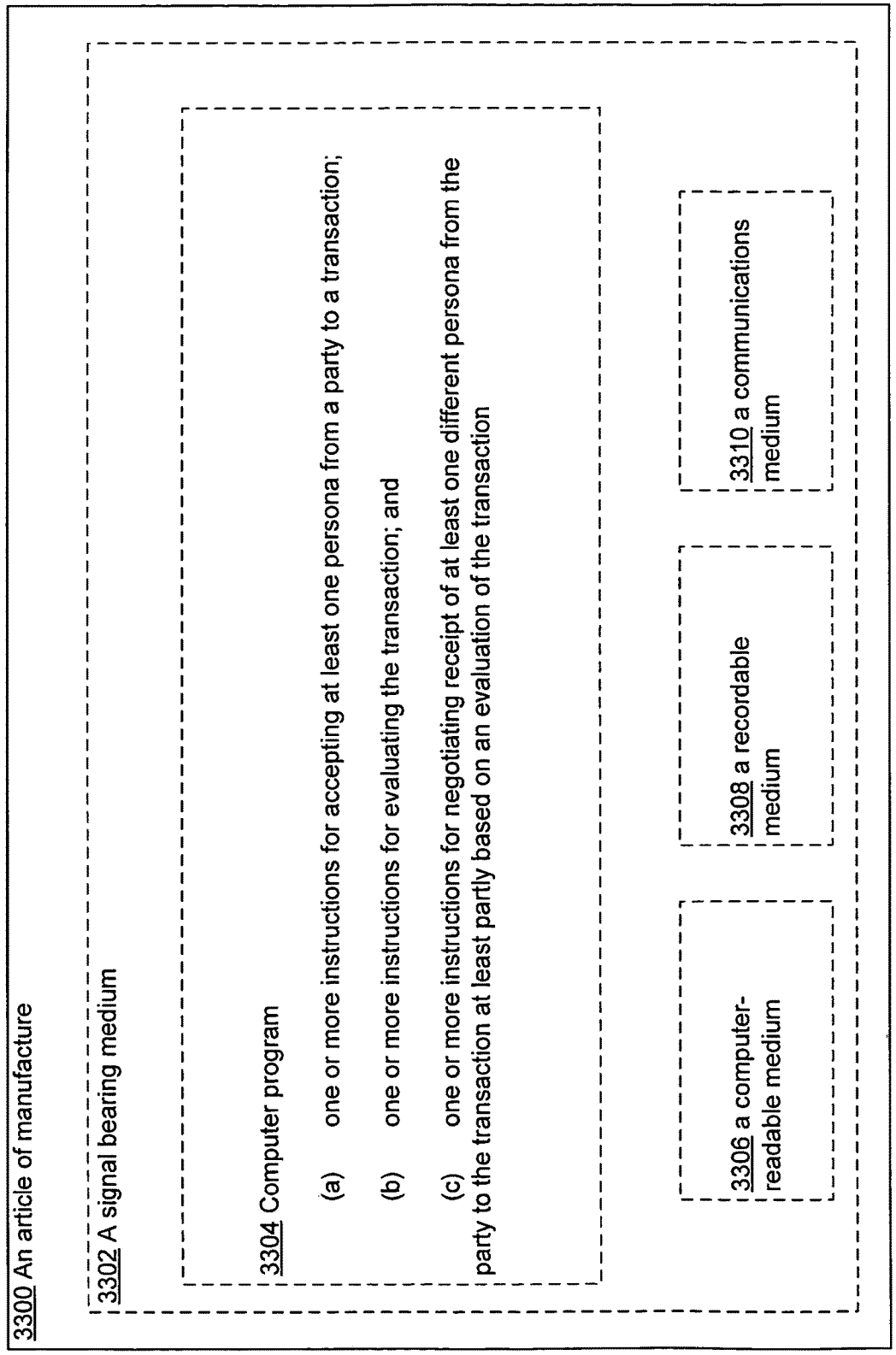

With reference now to FIG. 33, shown is a partial view of an example article of manufacture including a computer program product that includes a computer program for executing a computer process on a computing device related to regulating information flow during interactions, which may serve as a context for introducing one or more processes and/or devices described herein.

Figure 34:
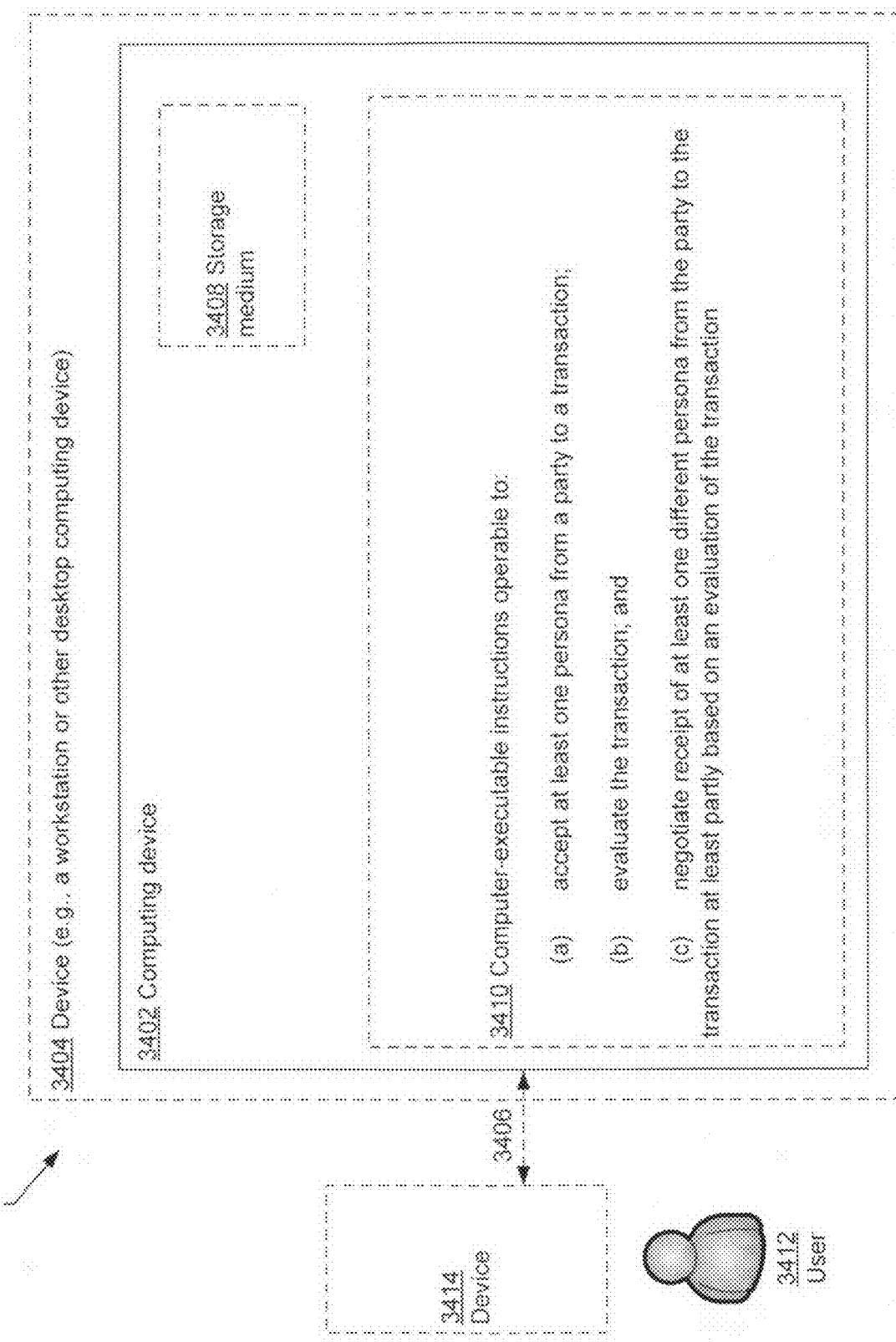

With reference now to FIG. 34, shown is an example device in which embodiments may be implemented related to regulating information flow during interactions, which may serve as a context for introducing one or more processes and/or devices described herein.

Figure 35:
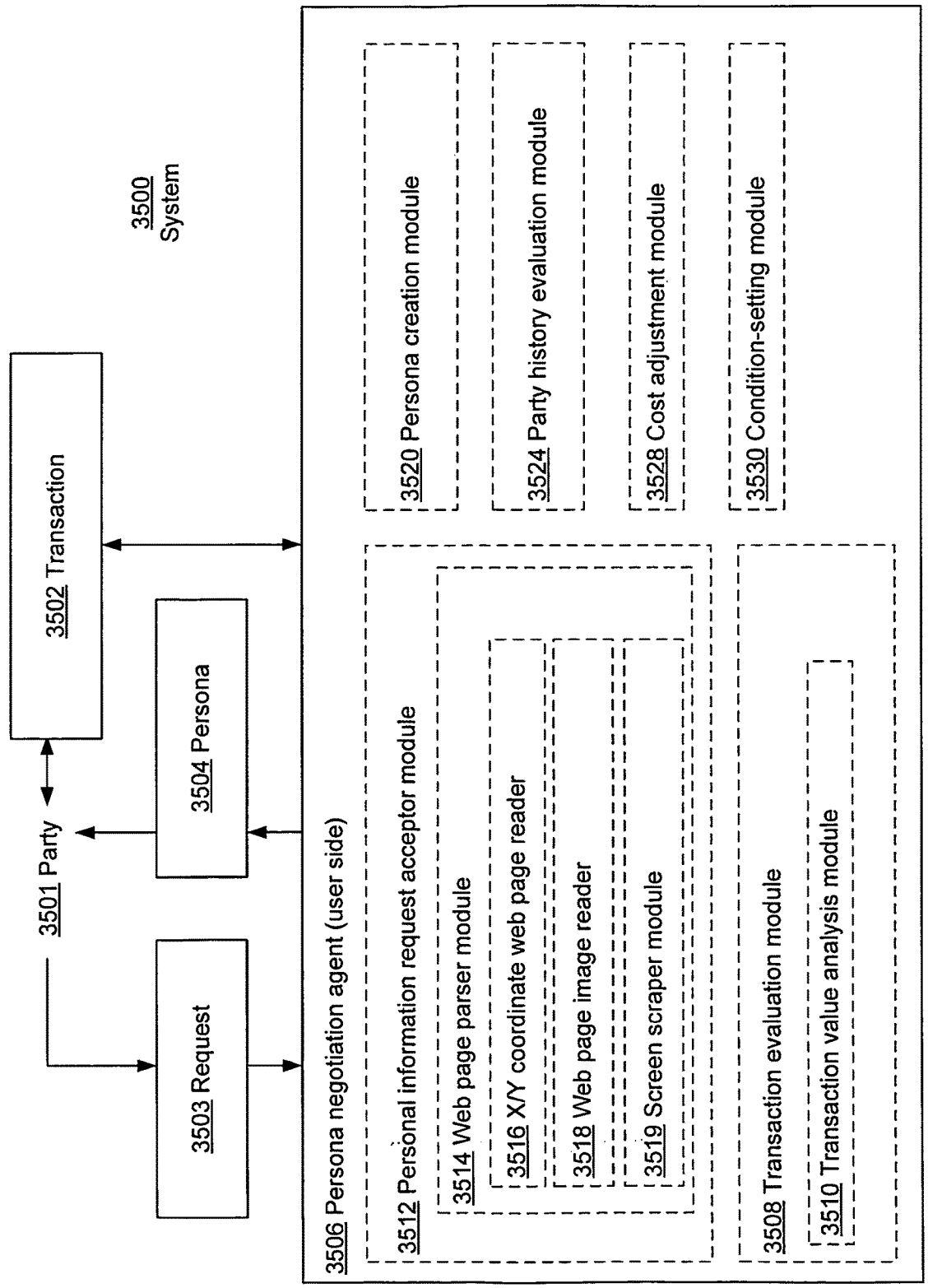

With reference now to FIG. 35, shown is an example of a system for regulating information flow during interactions in which embodiments may be implemented, perhaps in a device and/or through a network, which may serve as a context for introducing one or more processes and/or devices described herein.

Figure 36:
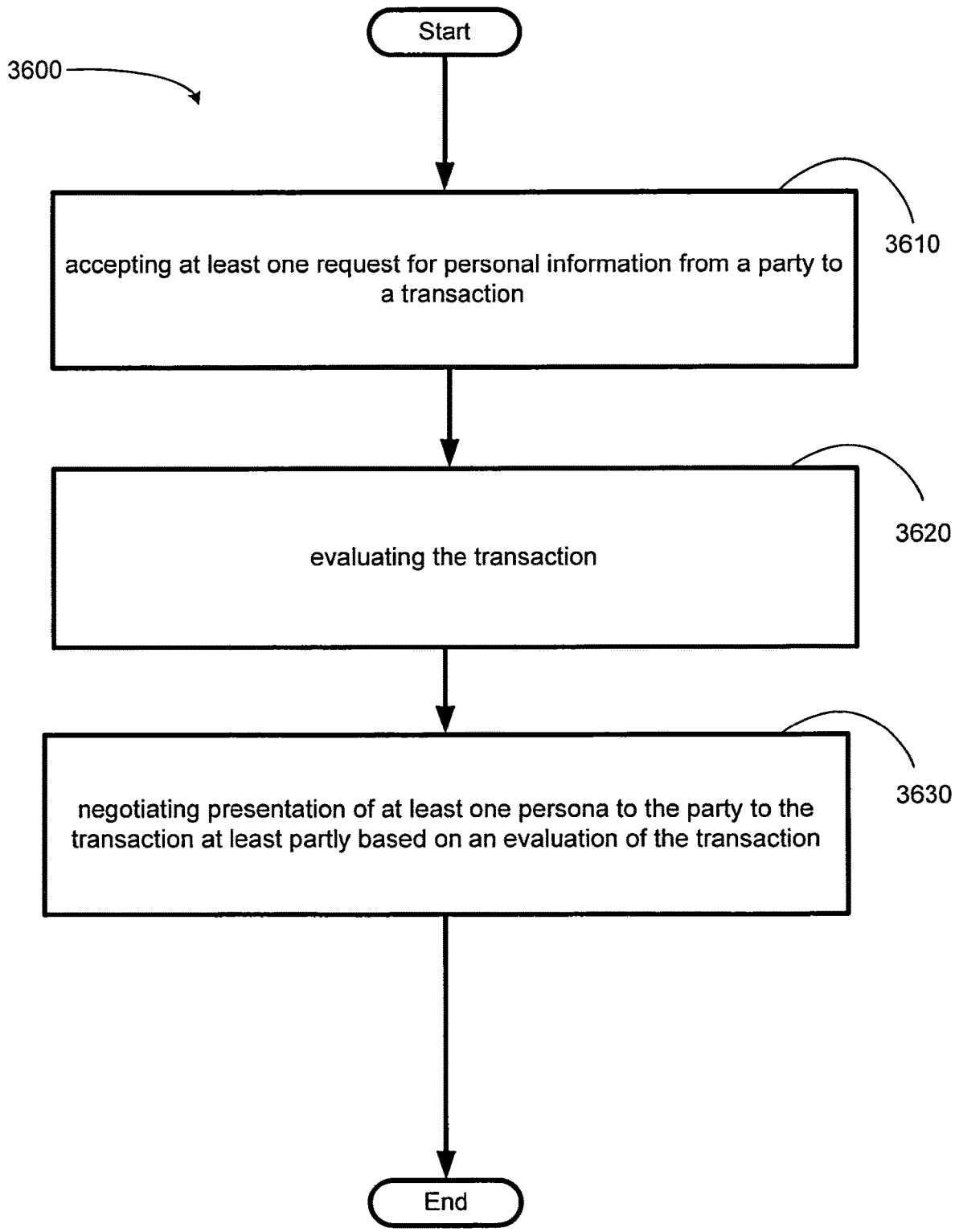

With reference now to FIG. 36, shown is an example of an operational flow representing example operations related to regulating information flow during interactions, which may serve as a context for introducing one or more processes and/or devices described herein.

Figure 37:
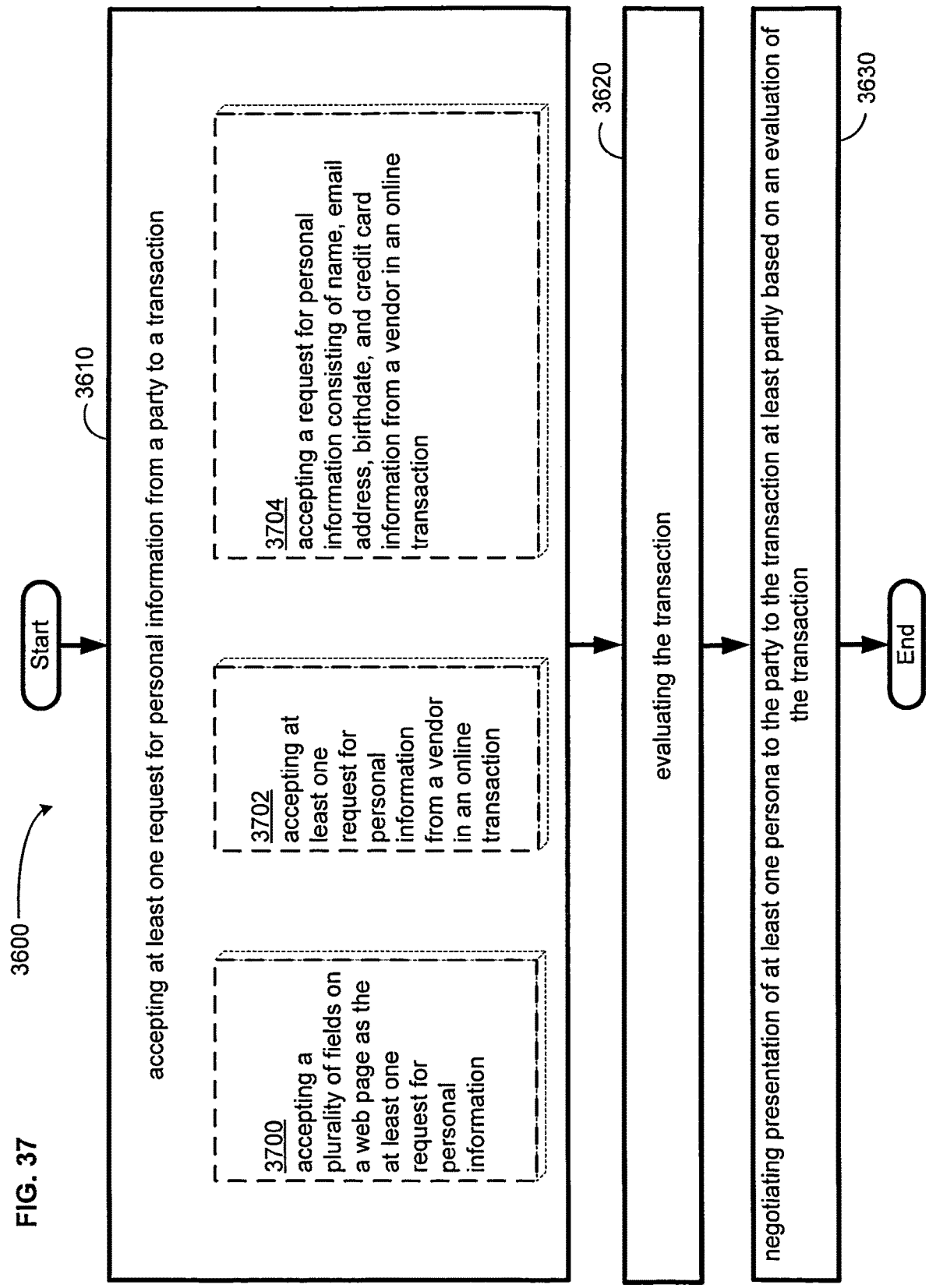

FIG. 37 illustrates an alternative embodiment of the example operational flow of FIG. 36.

Figure 38:
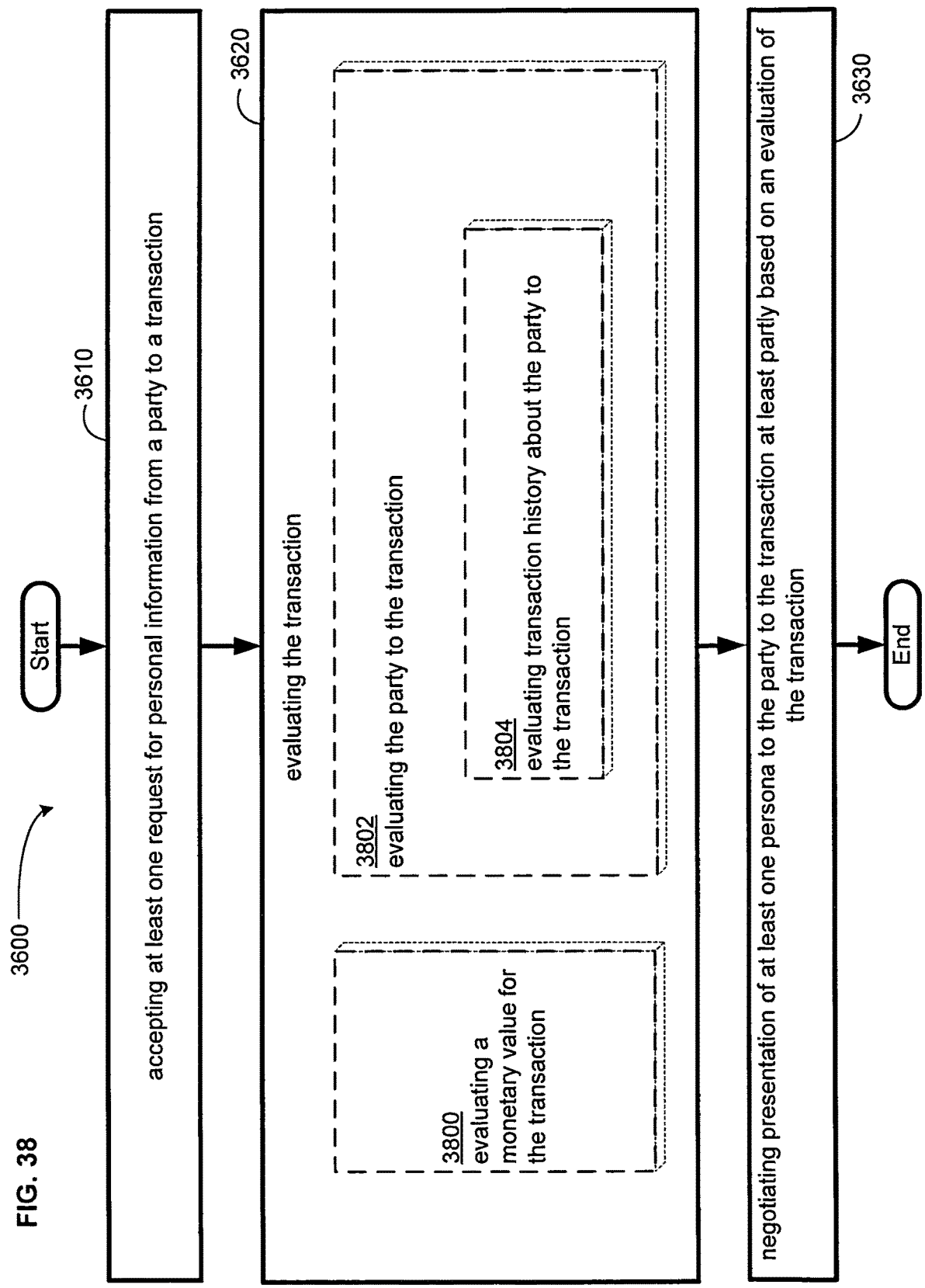

FIG. 38 illustrates an alternative embodiment of the example operational flow of FIG. 36.

Figure 39:
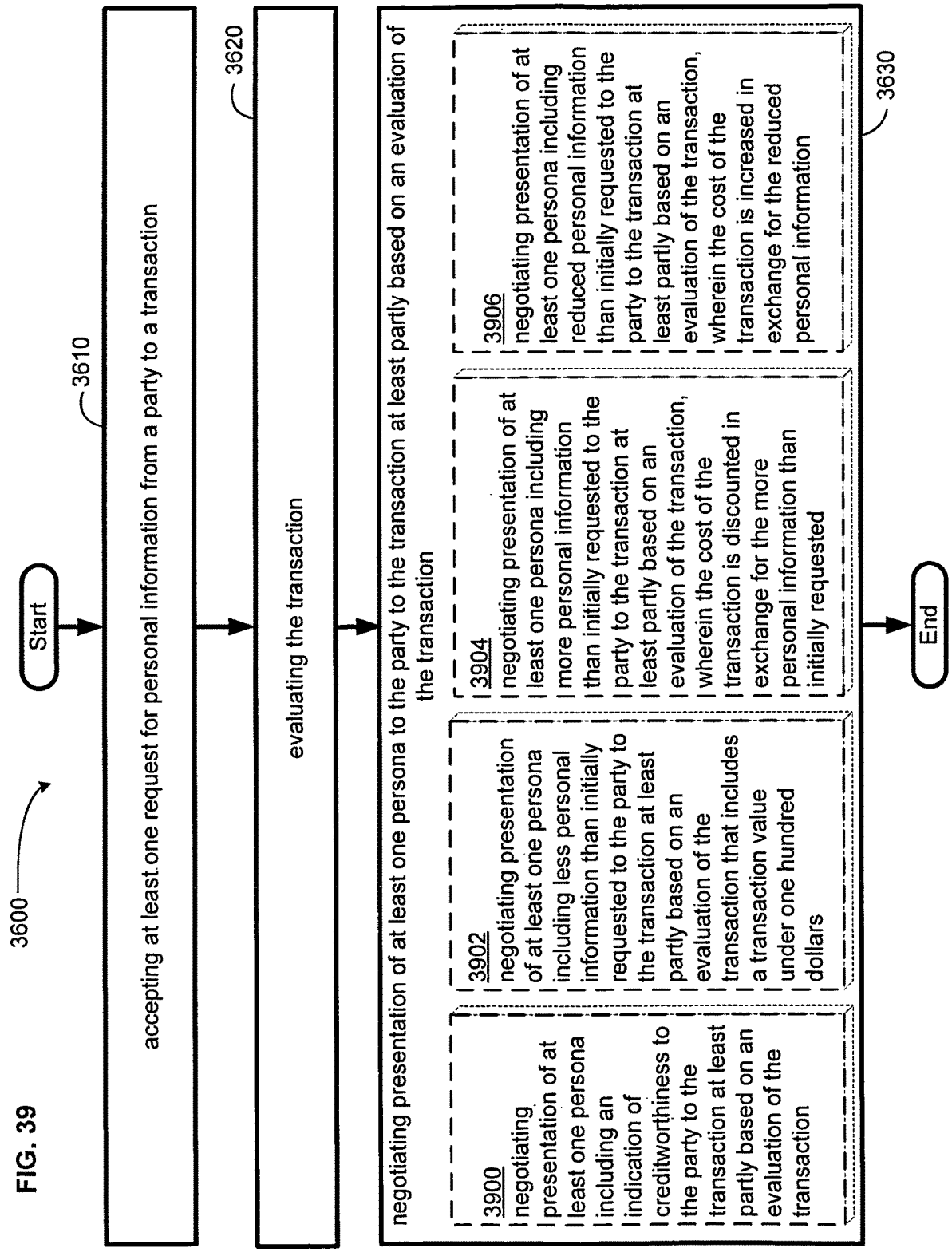

FIG. 39 illustrates an alternative embodiment of the example operational flow of FIG. 36.

FIG. 40 illustrates an alternative embodiment of the example operational flow of FIG. 36.

With reference now to FIG. 41, shown is a partial view of an example article of manufacture including a computer program product that includes a computer program for executing a computer process on a computing device related to regulating information flow during interactions, which may serve as a context for introducing one or more processes and/or devices described herein.

With reference now to FIG. 42, shown is an example device in which embodiments may be implemented related to regulating information flow during interactions, which may serve as a context for introducing one or more processes and/or devices described herein.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
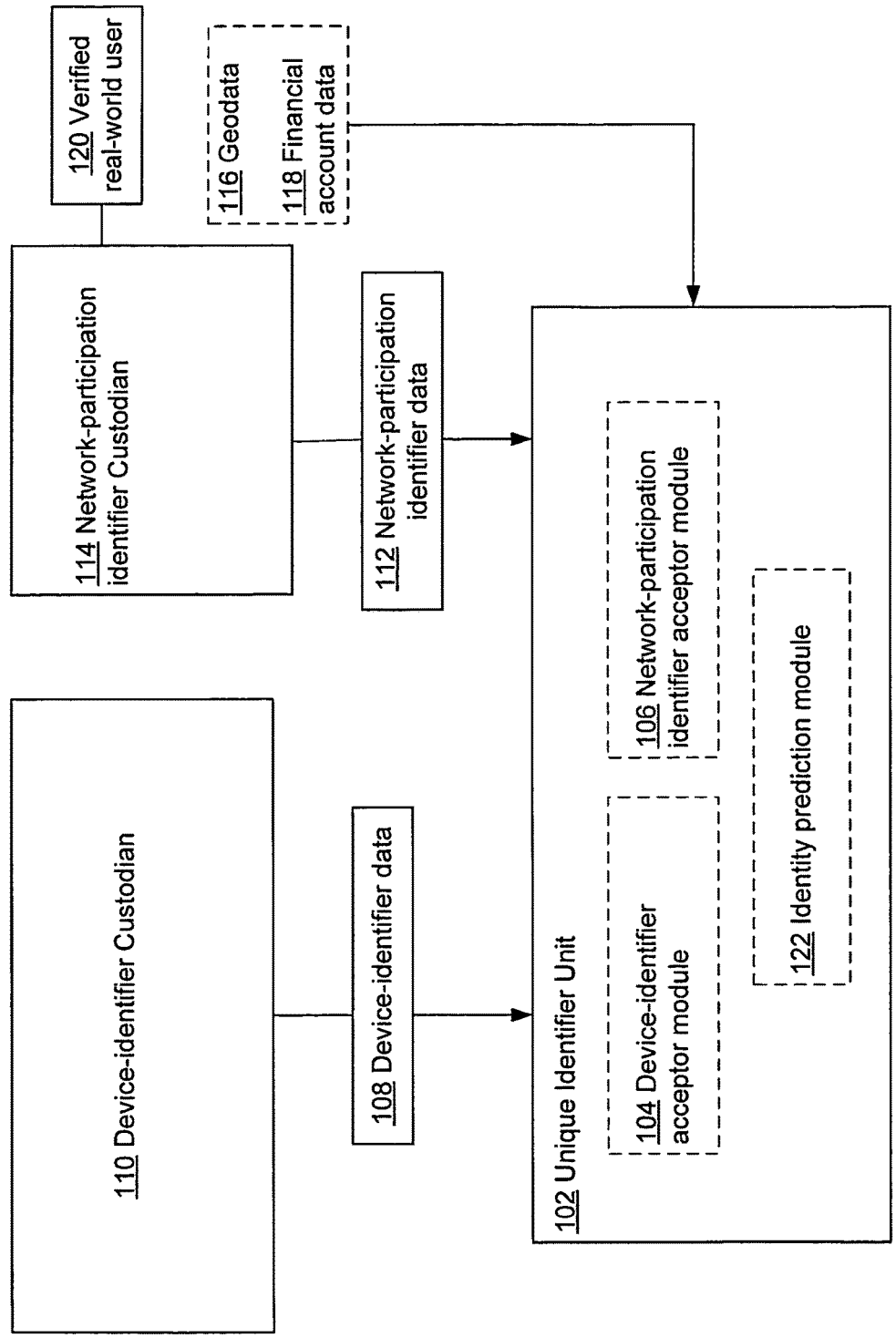

FIG. 1 illustrates an example system 100 in which embodiments may be implemented. The system 100 includes a unique identifier unit 102. The unique identifier unit 102 may contain, for example, device-identifier acceptor module 104 and network-participation identifier acceptor module 106. Unique identifier unit 102 may communicate over a network or directly with device-identifier custodian 110 to accept device-identifier data 108. Unique identifier unit 102 may also communicate over a network or directly with network-participation identifier custodian 114 to accept network-participation identifier data 112 associated with a verified real-world user 120 associated with the at least one communication device. Optionally, unique identifier unit 102 may also accept geodata 116 or financial account data 118. Unique identifier unit 102 may also include identity prediction module 122 for associating network-participation identifier data with a verified real-world user 120 associated with a communication device.

In FIG. 1, unique identifier unit 102 may assign a unique identifier based on accepted device-identifier data 108 and accepted network-participation identifier data 112. Optionally, unique identifier unit 102 may assign geodata 116 and/or financial account data 118 to an assigned unique identifier.

In FIG. 1, the unique identifier unit 102 is illustrated as possibly being included within a system 100. Of course, virtually any kind of computing device may be used to implement the special purpose unique identifier unit 102, such as, for example, a workstation, a desktop computer, a networked computer, a server, a collection of servers and/or databases, a virtual machine running inside a computing device, a mobile computing device, or a tablet PC.

Additionally, not all of the unique identifier unit 102 need be implemented on a single computing device. For example, the unique identifier unit 102 may be implemented and/or operable on a remote computer, while a user interface and/or local instance of the unique identifier unit 102 are implemented and/or occur on a local computer. Further, aspects of the unique identifier unit 102 may be implemented in different combinations and implementations than that shown in FIG. 1. For example, functionality of a user interface may be incorporated into the unique identifier unit 102. The unique identifier unit 120 may perform simple data relay functions and/or complex data analysis, including, for example, fuzzy logic and/or traditional logic steps. Further, many methods of assigning unique identifiers described herein or known in the art may be used, including, for example, algorithms used in generating globally unique identifiers, universally unique identifiers, other random number generation methods. In some embodiments, the unique identifier unit 102 may assign unique identifiers based on device-identifier data 108 and/or network-participation identifier data 112 available as updates through a network.

Unique identifier unit 102 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

Figure 2:
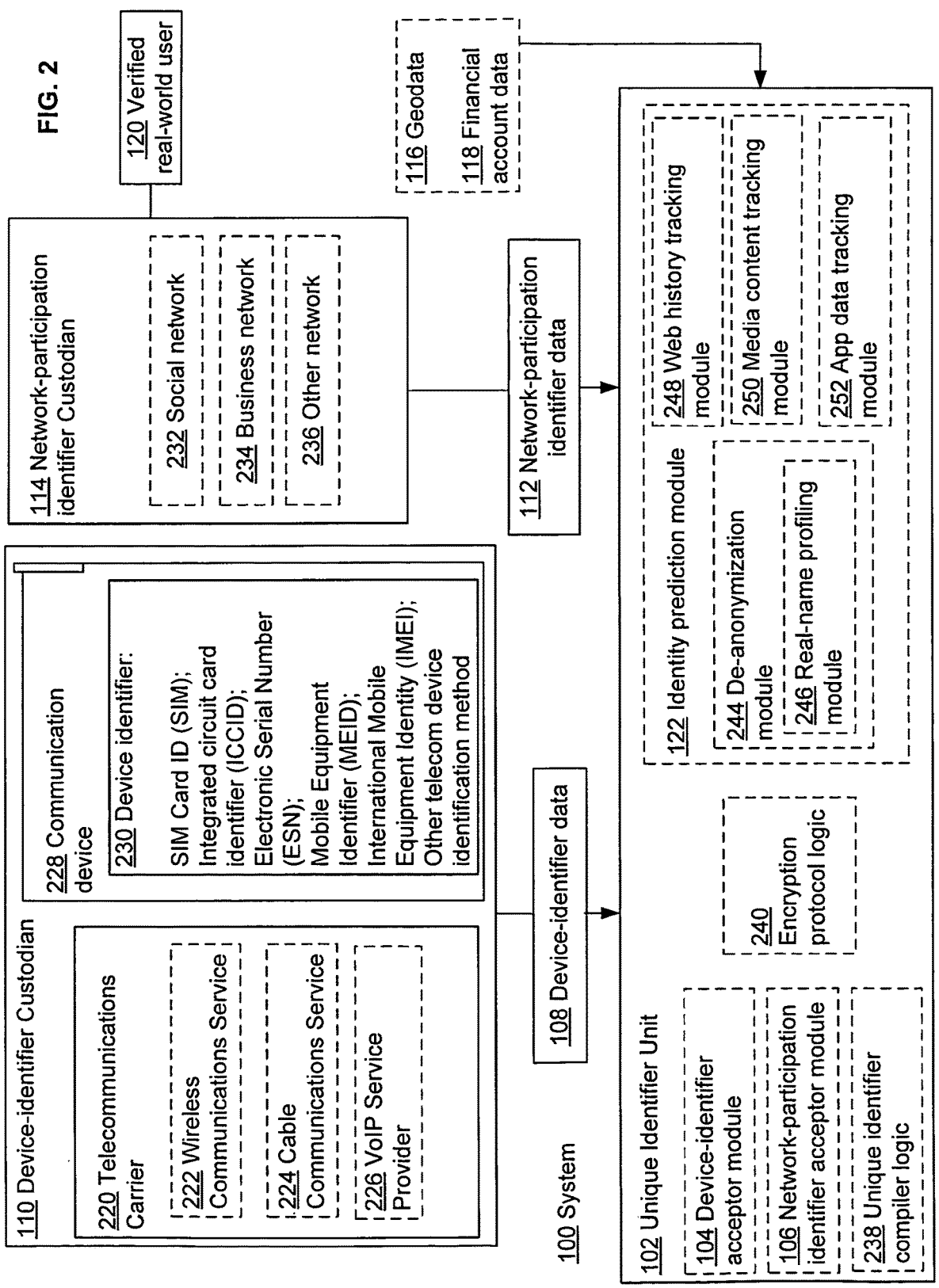
FIG. 2 illustrates certain alternative embodiments of the system for linking users of devices of FIG. 1.

FIG. 2 illustrates certain alternative embodiments of the system 100 of FIG. 1. In FIG. 2, The unique identifier unit 102 may also include unique identifier compiler logic 238 and or encryption protocol logic 240. Unique identifier unit 102 may communicate over a network or directly with device-identifier custodian 110 to accept device-identifier data 108, perhaps in the form of device identifier 230 from communication device 228. Unique identifier unit 102 may also communicate over a network or directly with network-participation identifier custodian 114 to accept network-participation identifier data 112 associated with a verified real-world user 120 associated with the at least one communication device, perhaps from social network 232, business network 234, and/or other network 236.

In this way, the unique identifier unit 102 may generate a compiled and/or encrypted list of unique identifiers that are optionally coded with or otherwise linked to geodata and/or financial account data.

In some embodiments, unique identifier compiler logic 112 may create a compiled set of composite identifiers that can be used to disambiguate search results in the network based on device-identifier data, network participation identifier data, and/or geodata, for example. Unique identifier unit 102 can be operated by a telecom company or by a social or other network owner, or by both in cooperation with each other. A compiled list of unique identifiers as discussed herein can represent all or substantially all unique user devices in a given social network or other communications network, e.g., wireless network, email network, or the like.

A directory of uniquely-identified devices can serve as the foundation for searching within a social network, and for facilitating financial transactions via the device for members of the social network associated with the device.

In some embodiments, unique identifier unit 102 may also include identity prediction module 122 for associating network-participation identifier data with a verified real-world user 120 associated with a communication device 228. Identity prediction module 122 may include various search and/or matching functions for associating network-participation identifier data 112 with a verified real-world user 120 associated with a communications device 228. For example, identity prediction module 122 may include de-anonymization module 244, which in turn may include real-name profiling module 246. Identity prediction module 122 may also include web history tracking module 248, media content tracking module 250, and/or app list tracking module 252.

For the purposes of this application, SIM as used herein includes mini-SIM, micro-SIM, Universal Subscriber Identity Module, CDMA Subscriber Identity Module, Universal Integrated Circuit Card, Removable User Identity Module, virtual SIM, and other variants of the subscriber identity module described herein and understood by those of ordinary skill in the art.

As referenced herein, the unique identifier unit 102 may be used to perform various data querying and/or recall techniques with respect to the device-identifier data 108 and/or network-participation identifier data 112, in order to assign a unique identifier. For example, where the network-participation identifier data 112 is organized, keyed to, and/or otherwise accessible using one or more user accounts such as social network, email, or the like, unique identifier unit 102 may employ various Boolean, statistical, and/or semi-boolean searching techniques to assign a unique identifier. Similarly, for example, where device-identifier data 108 is organized, keyed to, and/or otherwise accessible using one or more device-identifier custodian 110, various Boolean, statistical, and/or semi-boolean searching techniques may be performed by unique identifier unit 102 to assign a unique identifier.

Many examples of databases and database structures may be used in connection with the unique identifier unit 102. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for disambiguating information and/or for gathering and/or compiling data from the relational database(s).

For example, SQL or SQL-like operations over one or more device-identifier data 108 and/or network-participation identifier data 112 may be performed, or Boolean operations using a device-identifier data 108 and/or network-participation identifier data 112 may be performed. For example, weighted Boolean operations may be performed in which different weights or priorities are assigned to one or more of the device-identifier data 108 and/or network-participation identifier data 112, including various network participation aliases associated with a particular verified real-world user, perhaps relative to one another. For example, a number-weighted, exclusive-OR operation may be performed to request specific weightings of network participation identifiers.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 3 illustrates an operational flow 300 representing example operations related to linking users of devices. In FIG. 3 and in following figures that include various examples of operational flows, discussion and explanation may be provided with respect to the above-described system environments of FIGS. 1-2, and/or with respect to other examples and contexts. However, it should be understood that the operational flows may be executed in a number of other environments and contexts including that of FIG. 15, and/or in modified versions of FIGS. 1-2. Also, although the various operational flows are presented in the sequence(s) illustrated, it should be understood that the various operations may be performed in other orders than those which are illustrated, or may be performed concurrently.

After a start operation, operation 310 depicts accepting device-identifier data corresponding to at least one communication device. For example, unique identifier unit 102 and/or device-identifier acceptor module 104 can accept device-identifier data 108 from a telecommunications carrier 220, for example in the form of a Unique Device Identifier (UDID) for an iPhone or iPod Touch. The UDID is a sequence of 40 letters and numbers that is specific to each iPhone or iPod Touch. It may look something like this: 2b6f0cc904d137be2e1730235f5664094b831186. Other examples of sources of device-identifier data 108 include voice-over-internet-protocol service providers such as Skype (peer-to-peer VoIP), and wireless carriers such as Verizon Wireless (CDMA-based wireless communication). Other examples of device-identifier data 108 include Media Access Control addresses (MAC address) and International Mobile Equipment Identity numbers (IMEI).

Operation 320 depicts accepting network-participation identifier data associated with a verified real-world user associated with the at least one communication device. For example, unique identifier unit 102 and/or network-participation identifier acceptor module 106 may accept from Facebook a username associated with a verified real-world user having an iPhone and corresponding account with a telecommunications company. In another example, unique identifier unit 102 may accept from LinkedIn the name of a person associated with a videoconferencing device and corresponding account with a videoconferencing service such as WebEx Web conferencing. In another example, unique identifier unit 102 may accept from Google the email address of a person associated with an Android phone and corresponding account with a wireless carrier.

In some embodiments, network-participation identifier custodian 114 and device-identifier custodian will cooperate to provide the necessary network-participation identifier data 112 and device-identifier data 108 to unique identifier unit 108. For example, Facebook may provide usernames, images, birthdates, telephone numbers, or other data that it has about the verified real-world users of its social network to a consortium of telecommunications carriers 220 (this may optionally involve an opting-in step whereby users of Facebook affirmatively approve this action), who may provide device-identifier data 108. Assigning a unique identifier (discussed below) for each network-user-associated device across each of the carriers in the consortium may result in a directory that is particularly valuable for the telecommunications carriers, who can then provide directory searching, support, and disambiguation for a potentially large fraction of the Facebook social network. Such a directory will likely be of equal interest and value to networks including Facebook in this example, for the same reasons. For example, a cross-carrier directory of Facebook members with associated phone numbers would be an added feature for Facebook that could significantly enhance the social information provided by the network.

Operation 330 depicts assigning a unique identifier at least partly based on the device-identifier data and the network-participation identifier data. For example, unique identifier unit 102, upon accepting device-identifier data 108 and network-participation identifier data 112 associated with a verified real-world user 120 associated with the at least one communication device, may assign a randomly-generated 32-bit unique identifier. In the iPhone example above, unique identifier unit 102 may accept the iPhone's unique device identifier (UDID) as the device-identifier data 108, accept an iTunes username associated with a user with a valid credit card and security code as the network-participation identifier data 112 associated with a verified real-world user 120 associated with the at least one communication device, and assign a unique identifier to the device and username pair.

As another example, unique identifier unit 102 may accept the MAC address of a networked computer as the device-identifier data 108, accept an Outlook email address associated with a user with a verified biometric measurement as the network-participation identifier data 112 associated with a verified real-world user 120 associated with the at least one communication device, and assign a unique identifier to the computer and email address pair.

As another example, unique identifier unit 102 may accept a mobile phone's integrated circuit card ID (ICC-ID) as the device-identifier data 108, accept a Facebook username associated with a user with a valid Facebook Credits account as the network-participation identifier data 112 associated with a verified real-world user 120 associated with the at least one communication device, and assign a unique identifier to the mobile phone and Facebook username pair.

In some embodiments, unique identifier unit 102 may include an identity prediction algorithm such as a de-anonymization algorithm, a real-name profiling algorithm, a web history tracking algorithm, media content tracking algorithm, and/or an app list tracking algorithm. These algorithms may aid in the association of network-participation identifier data with a verified real-world user 120 associated with the communication device 228, where those associations are not provided directly by a device-identifier custodian 110 and/or a network-participation identifier custodian 114.

FIG. 4 illustrates alternative embodiments of the example operational flow 300 of FIG. 3. FIG. 4 illustrates example embodiments where the accepting operation 310 may include at least one additional operation. Additional operations may include operation 400, 402, 404, and/or operation 406.

Operation 400 depicts accepting device-identifier data corresponding to at least one of a mobile phone, a wired telephone, a voice-over-internet-protocol telephone, a tablet computer, a notebook computer, a laptop computer, a desktop computer, or a networked television. For example, unique identifier unit 102 and/or device-identifier acceptor module 104 may accept device-identifier data corresponding to at least one of a mobile phone, a wired telephone, a voice-over-internet-protocol telephone, a tablet computer, a notebook computer, a laptop computer, a desktop computer, or a networked television. For example, device-identifier acceptor module 104 may accept a mobile phone's mobile equipment identifier, a land line's telephone number, or a networked computer's media access control address (MAC address) or internet protocol address (IP address).

Device-identifier data 108 may be accepted in different forms depending on the device identified. For example, an IP address or MAC address may be used to identify a computer.

Every device connected to the public internet is assigned a unique number known as an internet protocol address (IP address). IP addresses consist of four numbers separated by periods (also called a "dotted-quad") and look something like 127.0.0.1. Since these numbers are usually assigned to internet service providers within region-based blocks, an IP address can often be used to identify the region or country from which a computer is connecting to the Internet. An IP address can sometimes be used to show the user's general location. An IP address may also be assigned to a Host name, which may be easier to remember. Hostnames may be looked up to find IP addresses, and vice-versa. At one time internet service providers issued one IP address to each user. These are static IP addresses. With the increased number of issued IP addresses, internet service providers now issue IP addresses in a dynamic fashion out of a pool of IP addresses using dynamic host configuration protocol (DHCP), which provides a central database for keeping track of computers that have been connected to the network. This prevents two computers from accidentally being configured with the same IP address. These are referred to as dynamic IP addresses. In addition to users connecting to the internet, with virtual hosting, a single machine can act like multiple machines, with multiple domain names and IP addresses.

MAC addresses are unique identifiers assigned to network interfaces for communications on the physical network segment. They are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. It may also be known as an Ethernet hardware address (EHA), hardware address, or physical address. A network node may have multiple NICs and will then have one unique MAC address per NIC.

A subscriber identity module or subscriber identification module (SIM) is an integrated circuit that securely stores the service-subscriber key or international mobile subscriber identity (IMSI) used to identify a subscriber on mobile telephony devices (such as mobile phones and computers). A SIM card typically contains its unique serial number (integrated circuit card identifier or ICCID), an internationally unique number of the mobile user (IMSI), security authentication and ciphering information, temporary information related to the local network, a list of the services the user has access to and two passwords: a personal identification number (PIN) for usual use and a PIN unlock code (PUC) for unlocking. A SIM card may also store other carrier-specific data such as the SMSC (Short Message Service Center) number, Service Provider Name (SPN), Service Dialing Numbers (SDN), Advice-Of-Charge parameters and Value Added Service (VAS) applications.

A SIM card's ICCID is stored in the SIM card and also engraved or printed on the SIM card body. The ICCID is typically composed of an issuer identification number (IIN), an individual account identification number, and a check digit.

SIM cards are identified on their individual operator networks by a unique international mobile subscriber identity number or IMSI. Mobile operators connect mobile phone calls and communicate with their market SIM cards using their IMSIs. The format is: the first 3 digits represent the Mobile Country Code (MCC), the next 2 or 3 digits represent the Mobile Network Code (MNC), and the next digits represent the mobile station identification number.

SIM cards may also orthogonally store a number of SMS messages and phone book contacts. A SIM is held on a removable SIM card, which can be transferred between different mobile devices.

Operation 402 depicts accepting telephony device-identifier data including a telephone number associated with the telephony device. For example, unique identifier unit 102 may accept a ten-digit telephone number or a seven-digit telephone number from a telecommunications carrier 220 as the device-identifier data 108. The number contains the information necessary to identify uniquely the intended endpoint for the telephone call. Each such endpoint must have a unique number within the public switched telephone network.

Operation 404 depicts accepting at least one of subscriber identity module data or integrated circuit card identifier data corresponding to at least one communication device. For example, unique identifier unit 102 may accept an international mobile subscriber identity (IMSI) from a mobile phone's SIM card from a telecommunications carrier 220 as the device-identifier data 108. As another example, device-identifier acceptor module 104 may accept from a wireless communications service 222 an integrated circuit card identifier number from a SIM card for a mobile phone.

Operation 406 depicts accepting mobile equipment identifier data corresponding to at least one communication device. For example, unique identifier unit 102 may accept a mobile equipment identifier corresponding to a mobile handset from a telecommunications carrier 220 or wireless communications service 222. A Mobile Equipment IDentifier (MEID) is a globally unique 56-bit identification number for a physical piece of mobile equipment. Equipment identifiers are "burned" into a device and are used as a means to facilitate mobile equipment identification and tracking. Additionally, MEIDs are coordinated with International Mobile Equipment Identifiers (IMEIs), facilitating global roaming and harmonization between 3G technologies as a universal mobile equipment identifier. The MEID is a 14-digit hexadecimal value. The MEID is capable of being transmitted over the air upon a request from the network. The MEID is composed mainly of two basic components, the manufacturer code and the serial number.

FIG. 5 illustrates alternative embodiments of the example operational flow 300 of FIG. 3. FIG. 5 illustrates example embodiments where the accepting operation 310 may include at least one additional operation. Additional operations may include operation 500, 502, and/or operation 504.

Operation 500 depicts accepting international mobile subscriber identity data corresponding to at least one communication device. For example, device-identifier acceptor module 104 may accept an international mobile subscriber identity (IMSI) from a mobile phone's SIM card from a wireless communications service 222 as the device-identifier data 108. An International Mobile Subscriber Identity or IMSI is a unique identification associated with all GSM and UMTS network mobile phone users. It is stored as a 64-bit field in the SIM inside the phone and is sent by the phone to the network. It is also used for acquiring other details of the mobile device in the Home Location Register (HLR) or as locally copied in the Visitor Location Register. To prevent eavesdroppers identifying and tracking the subscriber on the radio interface, the IMSI is sent as rarely as possible and a randomly-generated temporary mobile subscriber identity (TMSI) is sent instead. The IMSI is used in any mobile network that interconnects with other networks. This number is kept in the phone directly or in the removable user identity module (R-UIM) card, a card developed for CDMA handsets that extends the GSM SIM card to CDMA phones and networks.

Operation 502 depicts accepting electronic serial number data corresponding to at least one communication device. For example, unique identifier unit 102 may accept an electronic serial number from a mobile phone's SIM card from a telecommunications carrier 220 as the device-identifier data 108. As another example, device-identifier acceptor module 104 may accept from a wireless communications service 222 an electronic serial number from a SIM card for a CDMA-based mobile phone.

Operation 504 depicts accepting device-identifier data corresponding to at least one communication device that is linked to at least one billing account. For example, unique identifier unit 102 may accept a mobile equipment identifier from a mobile phone's SIM card from a telecommunications carrier 220, the MEID corresponding to a billing account for a subscriber of a wireless service provided by the telecommunications carrier 220. As another example, device-identifier acceptor module 104 may accept from a wireless communications service 222 an IMSI from a SIM card for a mobile phone, the IMSI corresponding to a billing account for a subscriber of the wireless communications service 222.

FIG. 6 illustrates alternative embodiments of the example operational flow 300 of FIGS. 3 and 5. FIG. 6 illustrates example embodiments where the accepting operation 504 may include at least one additional operation. Additional operations may include operation 600, 602, and/or operation 604.

Operation 600 depicts accepting device-identifier data corresponding to at least one communication device that is linked to at least one billing account, wherein the at least one billing account comprises a cable telecommunications billing account. For example, unique identifier unit 102 may accept a computer user's MAC address or IP address as the device identifier data 108. In this example, the MAC address or IP address of the computer may be linked to a Skype account for billing purposes.

Operation 602 depicts accepting device-identifier data corresponding to at least one communication device that is linked to at least one billing account, wherein the at least one billing account comprises a wireless telecommunications billing account. For example, unique identifier unit 102 may accept from a wireless service provider an IMEI for a mobile phone linked to a billing account for an individual subscriber.

Operation 604 depicts accepting device-identifier data corresponding to at least one communication device that is linked to at least one billing account, wherein the at least one wireless telecommunications billing account comprises a satellite telecommunications billing account. For example, unique identifier unit 102 may accept from a satellite-based wireless service provider such as LightSquared, a device-identifier for a mobile phone linked to a billing account for an individual subscriber.

FIG. 7 illustrates alternative embodiments of the example operational flow 300 of FIGS. 3 and 5. FIG. 7 illustrates example embodiments where the accepting operation 504 may include at least one additional operation. Additional operations may include operation 700, 702, 704, and/or operation 706.

Operation 700 depicts accepting device-identifier data corresponding to at least one communication device that is linked to at least one billing account, wherein the at least one billing account comprises a physical address. For example, device-identifier acceptor module 104 may accept from a wireless communications service 222 an IMSI from a SIM card for a mobile phone, the IMSI corresponding to a billing account for a subscriber of the wireless communications service 222 at a specific street, city, and country address.

Operation 702 depicts accepting device-identifier data corresponding to at least one communication device that is linked to at least one billing account, wherein the at least one billing account comprises a bank account. For example, device-identifier acceptor module 104 may accept from a wireless communications service 222 an iPhone or iPod Touch device identifier, the identifier corresponding to a bank account number for a subscriber of the wireless service to the iPhone or iPod Touch device.

Operation 704 depicts accepting device-identifier data corresponding to at least one communication device that is linked to at least one billing account, wherein the at least one billing account comprises an electronic payment account. To continue the previous example involving the iPhone or iPod Touch device, the wireless service subscription may be linked to a bank's electronic payment service, wire transfer service, or the like.

Operation 706 depicts accepting device-identifier data corresponding to at least one communication device that is linked to at least one electronic payment account, wherein the electronic payment account comprises at least one of a Google Checkout account, an Amazon Payments account, a PayPal account, or a mobile PayPal account. For example, a unique identifier unit 102 may accept a mobile device ID for an Android mobile phone from an Android app such as "Android Device ID" available for download from the Android Market. The Android mobile device ID, perhaps derived from a wireless network socket, for the mobile phone may correspond to a Google Checkout account for the subscriber of the wireless service to the mobile phone.

FIG. 8 illustrates alternative embodiments of the example operational flow 300 of FIGS. 3 and 5. FIG. 8 illustrates example embodiments where the accepting operation 504 may include at least one additional operation. Additional operations may include operation 800, 802, and/or operation 804.

Operation 800 depicts accepting device-identifier data corresponding to at least one communication device that is linked to at least one billing account, wherein the at least one billing account comprises a credit card account. For example, a wireless device's service subscription may be linked to a user's credit card account.

Operation 802 depicts accepting device-identifier data corresponding to at least one communication device that is linked to at least one billing account, wherein the at least one billing account comprises a virtual account. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual account such as a Facebook credit account.

Operation 804 depicts accepting device-identifier data corresponding to at least one communication device that is linked to at least one virtual account, wherein the virtual account comprises at least one of a virtual wallet or a virtual prepaid credit card. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual wallet account such as Google wallet.

FIG. 9 illustrates alternative embodiments of the example operational flow 300 of FIG. 3. FIG. 9 illustrates example embodiments where the accepting operation 320 may include at least one additional operation. Additional operations may include operation 900, 902, 904, and/or operation 906.

Operation 900 depicts accepting network-participation identifier data associated with at least one of a user's social security number, a user's national identification card, a user's biometric measurement, a user's passport number, a user's tax identification number, a user's internet domain, or a user's authentication certificate. For example, unique identifier unit 102 and/or network-participation identifier acceptor module 106 may accept network-participation identifier data associated with at least one of a user's social security number, a user's national identification card, a user's biometric measurement, a user's passport number, a user's tax identification number, a user's internet domain, or a user's authentication certificate. For example, network-participation identifier acceptor module 106 may accept a Facebook username as network-participation identifier data, the username associated with a photograph of the user as a biometric measurement verifying that a real-world user is associated with the username. In some embodiments, an image recognition system may be employed to associate an image with a specific user. In some embodiments, the real-world user may be a corporation.

In another example, network-participation identifier acceptor module 106 may accept an email address as network-participation identifier data, the email address associated with a social security number on file with a telecommunications company with which the user has a service subscription.

As used herein, "network-participation identifier data" may refer to a signifier of belonging in a network, such as an email address; a username, such as a social networking user name; or other mark such as an image, number, or writing that signifies participation in a particular network.

Operation 902 depicts accepting social networking data corresponding to at least one verified real-world user of the at least one communication device. For example, unique identifier unit 102 and/or network-participation identifier acceptor module 106 may accept a Google+ username as a network-participation identifier datum, wherein the Google+ username is associated with a photograph of the user having the username. In some embodiments, the photograph of the user may be analyzed by image recognition technologies to identify a person having specific geographic, demographic, or other identifying characteristics.

Operation 904 depicts accepting social networking data corresponding to at least one verified real-world user of the at least one communication device, wherein the social networking data comprises at least one of a username, an @-tagged twitter handle, a corporate login, or a website uniform resource locator (URL). For example, unique identifier unit 102 and/or network-participation identifier acceptor module 106 may accept a blogger's website URL as a network-participation identifier datum, wherein the website URL is associated with a photograph and/or description of the blogger on the website at the website URL.

Operation 906 depicts accepting social networking data corresponding to at least one verified real-world user of the at least one communication device, wherein the social networking data comprises at least one of Facebook data, Twitter data, or LinkedIn data. For example, unique identifier unit 102 and/or network-participation identifier acceptor module 106 may accept a LinkedIn username as a network-participation identifier datum, wherein the username is associated with a public profile of a user of the business-related social networking site LinkedIn.

FIG. 10 illustrates alternative embodiments of the example operational flow 300 of FIGS. 3 and 9. FIG. 10 illustrates example embodiments where the accepting operation 902 may include at least one additional operation. Additional operations may include operation 1000, 1002, and/or operation 1004.

Operation 1000 depicts accepting social networking data corresponding to at least one verified real-world user of the at least one communication device, wherein the social networking data comprises at least one of image data, constellation of social contact data, or user input data. For example, unique identifier unit 102 and/or network-participation identifier acceptor module 106 may accept a list of social contacts from a social network such as Facebook or LinkedIn as the network-participation identifier data. In another example, unique identifier unit 102 and/or network-participation identifier acceptor module 106 may accept a list of email contacts grouped as friends or family from an email contact list as the network-participation identifier data.

Operation 1002 depicts accepting social networking data corresponding to at least one verified real-world user of the at least one communication device, wherein the social networking data comprises data accumulated from multiple sources. For example, unique identifier unit 102 and/or network-participation identifier acceptor module 106 may accept a plurality of usernames sourced from various social networks, each corresponding to the same verified real-world user of the at least one communication device as the data accumulated from multiple sources. As another example, unique identifier unit 102 and/or network-participation identifier acceptor module 106 may accept a set of photographs of the same verified real-world user of the at least one communication device, sourced from various social networks as the data accumulated from multiple sources.

Operation 1004 depicts accepting social networking data corresponding to at least one verified real-world user of the at least one communication device, wherein the social networking data comprises at least one of data used to create additional data or data used to find additional data. For example, unique identifier unit 102 and/or network-participation identifier acceptor module 106 may accept a website URL of a social networking site's videoconferencing or videochat feed as data (website URL) used to create additional data (streaming video of network participants). In another example, unique identifier unit 102 and/or network-participation identifier acceptor module 106 may accept a user image or alias that can be used to find other data, for example as a search term in an reverse-image query or a text query, respectively.

FIG. 11 illustrates alternative embodiments of the example operational flow 300 of FIG. 3. FIG. 11 illustrates example embodiments where the assigning operation 330 may include at least one additional operation. Additional operations may include operation 1100, 1102, and/or operation 1104.

Operation 1100 depicts assigning at least one of a multi-digit decimal number, a multi-digit hexadecimal number, or a randomized code as the unique identifier. For example, unique identifier unit 102 may assign at least one of a multi-digit decimal number, a multi-digit hexadecimal number, or a randomized code as the unique identifier. In another example, unique identifier unit 102 may assign a unique identifier using an algorithm(s) known in the art to generate unique multi-digit decimal numbers or unique multi-digit hexadecimal numbers. See, e.g., U.S. Pat. No. 8,010,587 (hereby incorporated by reference).

Operation 1102 depicts further comprising encrypting the unique identifier. For example, unique identifier unit 102 and/or encryption protocol logic 240 may encrypt the assigned unique identifier. Encrypting the unique identifier may be desirable in cases where telecommunications carriers sharing a directory comprised of unique identifiers for the purpose of locating and disambiguating users of one or more networks, can share the unique identifiers but still protect them and the underlying data from access by undesirable entities such as spammers and telemarketers. In another example, unique identifier unit 102 may encrypt the assigned identifier or associated sensitive personal and/or financial information according to encryption schemes described herein and known in the art. See, e.g., U.S. Pat. Nos. 8,010,791 and 8,010,786 (hereby incorporated by reference).

Operation 1104 depicts further comprising encrypting the unique identifier, wherein the encrypting the unique identifier includes performing at least one of symmetric key encryption, public key encryption, hybrid digital signature encryption, using a one-way hash function, using a random identifier, or using a pseudo-random identifier. For example, unique identifier unit 102 and/or encryption protocol logic 240 may encrypt the assigned unique identifier using a one-way hash function, which is easy to compute on every input, but hard to invert given the image of a random input.

FIG. 12 illustrates alternative embodiments of the example operational flow 300 of FIG. 3. FIG. 12 illustrates example embodiments where the assigning operation 330 may include at least one additional operation. Additional operations may include operation 1200, 1202, 1204, and/or operation 1206.

Operation 1200 depicts assigning a unique identifier at least partly based on the device-identifier data and the network-participation identifier data, further comprising assigning to the unique identifier geo-locator data from the at least one communication device. For example, unique identifier unit 102 may accept geodata 116 from a mobile phone, and then assign that geodata to an assigned unique identifier corresponding to a device and a network participant. In another example, unique identifier unit 102 may accept geodata 116 in the form of a computer's IP address, and then assign that geodata to an assigned unique identifier corresponding to the computer and a verified network participant associated with that computer.

Operation 1202 depicts assigning a unique identifier at least partly based on the device-identifier data and the network-participation identifier data, further comprising assigning to the unique identifier geo-locator data from the at least one communication device, wherein the geo-locator data is assigned via a global positioning satellite function of the communication device. For example, unique identifier unit 102 may accept geodata 116 from a mobile phone having a gps receiver, and then assign that geodata to an assigned unique identifier corresponding to a device and a network participant.

Operation 1204 depicts assigning a unique identifier at least partly based on the device-identifier data and the network-participation identifier data, further comprising assigning to the unique identifier geo-locator data from the at least one communication device, wherein the geo-locator data is derived from at least one of cellular phone tower proximity, Wi-Fi use, user-entered location data, or proximity to at least one other device. For example, unique identifier unit 102 may accept geodata 116 from a smart phone using a Wi-Fi network contained in a database that contains location information for the Wi-Fi network, and then assign that geodata to an assigned unique identifier corresponding to a device and a network participant.

Operation 1206 depicts assigning a unique identifier at least partly based on the device-identifier data and the network-participation identifier data, further comprising assigning to the unique identifier geo-locator data from the at least one communication device, wherein the geo-locator data is derived from at least one of a detected vehicle use, a detected user activity, or a detected user location. For example, unique identifier unit 102 may derive geo-locator data from detected automobile use, based on, for example, last known location and predicted range of travel of the automobile. In another example, unique identifier unit 102 may receive or deduce geo-locator data from a detected user activity, for example, checking in with foursquare at a specific location or searching for driving directions in a web browser, respectively.

FIG. 13 illustrates alternative embodiments of the example operational flow 300 of FIG. 3. FIG. 13 illustrates example embodiments where the assigning operation 330 may include at least one additional operation. Additional operations may include operation 1300, 1302, 1304, and/or operation 1306.

Operation 1300 depicts assigning a unique identifier at least partly based on the device-identifier data and the network-participation identifier data, wherein the unique identifier represents multiple communication devices associated with a single user. For example, unique identifier unit 102 may assign a unique identifier at least partly based on the device-identifier data and the network-participation identifier data, wherein the unique identifier represents multiple communication devices associated with a single user.

In another example, unique identifier unit 102 may accept device-identifier data from a mobile phone, a desktop computer, and a laptop computer, each of which is associated with a single user, for example by virtue of an IMSI or other SIM data, email data, billing account data, or social networking data.

Operation 1302 depicts assigning a unique identifier at least partly based on the device-identifier data and the network-participation identifier data, wherein the unique identifier represents a single communication device associated with multiple users. For example, unique identifier unit 102 may assign a unique identifier at least partly based on the device-identifier data and the network-participation identifier data, wherein the unique identifier represents a single communication device associated with multiple users. In another example, unique identifier unit 102 may accept device-identifier data from a mobile phone, the device-identifier data associated with a multiple users, for example members of a family by virtue of different login data used for access to the device and/or different social networking usernames used on the device.

Operation 1304 depicts assigning a unique identifier at least partly based on the device-identifier data and the network-participation identifier data, wherein the unique identifier represents a single communication device associated with a single user. For example, unique identifier unit 102 may assign a unique identifier at least partly based on the device-identifier data and the network-participation identifier data, wherein the unique identifier represents a single communication device associated with a single user. As another example, unique identifier unit 102 may assign a unique identifier at least partly based on a videoconferencing device ID, such as an IP address or a MAC address, and at least partly based on a username and password for the videoconference, accompanied by a video image of a user associated with the username and password, verifying that a real-world user is associated with the videoconferencing device.

Operation 1306 depicts assigning a unique identifier at least partly based on the device-identifier data and the network-participation identifier data, and then adding an assigned unique identifier to an inter-service-provider directory of unique identifiers. For example, unique identifier unit 102 may assign a unique identifier at least partly based on the device-identifier data and the network-participation identifier data, and then adding an assigned unique identifier to an inter-service-provider directory of unique identifiers. In another example, unique identifier unit 102 may assign a unique identifier at least partly based on SIM data identifying a user's mobile phone, and at least partly based on subscriber's participation in the wireless network, as verified, for example, by a social security number for the user on file with the wireless carrier for the mobile device, for example, Verizon. Verizon may similarly create unique identifiers for all of the other verified real-world users of its network and their associated devices. Other wireless carriers may similarly create unique identifiers for their subscribers and associated devices.

If many wireless carriers agree to share their unique identifier lists and keep them in the same format for use as a global directory of mobile phone users, a comprehensive "white pages" of communications device users becomes possible, across potentially all service providers. Such a directory could also be keyed to social networking data such as username or user image, such that, for example, Facebook users could easily find each other's device contact information and possibly location information. Inclusion of users' device information in such a directory could be done on an opt-in basis.

As used herein, a unique identifier based on a device-identifier and a network-participant identifier may be keyed to that underlying data. That is, having the unique identifier corresponding to specific device data and specific network-participation identifier data associated with a verified real-world user associated with the at least one communication device will permit the creator of the unique identifier to use it to call up the specific device data and specific network participation identifier data. This may allow, for example, a telecommunications carrier to disambiguate one user from another having similar or identical network participation identifier data. This can be done on the basis of different device identifier data for the two users with similar or identical network participation identifier data, for example.

FIG. 14 illustrates a partial view of an example article of manufacture 1400 that includes a computer program 1404 for executing a computer process on a computing device. An embodiment of the example article of manufacture 1400 is provided including a signal bearing medium 1402, and may include one or more instructions for accepting device-identifier data corresponding to at least one communication device; one or more instructions for accepting network-participation identifier data associated with a verified real-world user associated with the at least one communication device; and one or more instructions for assigning a unique identifier at least partly based on the device-identifier data and the network-participation identifier data. The one or more instructions may be, for example, computer executable and/or logic-implemented instructions. In one implementation, the signal-bearing medium 1402 may include a computer-readable medium 1406. In one implementation, the signal bearing medium 1402 may include a recordable medium 1408. In one implementation, the signal bearing medium 1402 may include a communications medium 1410.

FIG. 15 illustrates an example system 1500 in which embodiments may be implemented. The system 1500 includes a computing system environment. The system 1500 also illustrates a user 1512 using a device 1504, which is optionally shown as being in communication with a computing device 1502 by way of an optional coupling 1506. The optional coupling 1506 may represent a local, wide-area, or peer-to-peer network, or may represent a bus that is internal to a computing device (e.g., in example embodiments in which the computing device 1502 is contained in whole or in part within the device 1504). A storage medium 1508 may be any computer storage media. In one embodiment, the computing device 1502 may include a virtual machine operating within another computing device. In an alternative embodiment, the computing device 1502 may include a virtual machine operating within a program running on a remote server.

The computing device 1502 includes computer-executable instructions 1510 that when executed on the computing device 1502 cause the computing device 1502 to (a) accept device-identifier data corresponding to at least one communication device; (b) accept network-participation identifier data associated with a verified real-world user associated with the at least one communication device; and (c) assign a unique identifier at least partly based on the device-identifier data and the network-participation identifier data. As referenced above and as shown in FIG. 15, in some examples, the computing device 1502 may optionally be contained in whole or in part within the device 1504.

In FIG. 15, then, the system 1500 includes at least one computing device (e.g., 1502 and/or 1504). The computer-executable instructions 1510 may be executed on one or more of the at least one computing device. For example, the computing device 1502 may implement the computer-executable instructions 1510 and output a result to (and/or receive data from) the computing device 1504. Since the computing device 1502 may be wholly or partially contained within the computing device 1504, the device 1504 also may be said to execute some or all of the computer-executable instructions 1510, in order to be caused to perform or implement, for example, various ones of the techniques described herein, or other techniques.

The device 1504 may include, for example, a portable computing device, workstation, or desktop computing device. In another example embodiment, the computing device 1502 is operable to communicate with the device 1504 associated with the user 1512 to receive information about the input from the user 1512 for performing data access and data processing, and assign a unique identifier at least partly based on the device-identifier data and the network-participation identifier data.

FIG. 16 illustrates alternative embodiments of the example operational flow 300 of FIG. 3. FIG. 16 illustrates example embodiments where the accepting operation 320 may include at least one additional operation. Additional operations may include operation 1600, 1602, and/or operation 1604.

Operation 1600 depicts accepting network-participation identifier data associated with a verified real-world user associated with the at least one communication device, further comprising associating network-participation identifier data with a real-world user associated with the at least one communication device. To continue an example of operation 302 above in which unique identifier unit 102 and/or network-participation identifier acceptor module 106 may accept from Facebook a username associated with a verified real-world user having an iPhone and corresponding account with a telecommunications company, the unique identifier unit 102 and/or identity prediction module 122 may search one or more identity databases for associations between the username and a real-world user, and for associations between that real-world user and the iPhone. Sources of data for associating a user with network-participation data and/or a communication device may include, for example, information that is provided by the user. For example, social network, message boards, internet forums, and the like may contain a link between a username and a phone number, a real-world name, birth date, gender, age, or other identifying attribute. Private sources of data may also include information provided by the user, such as private social networks, e-commerce websites, or any websites to which a consumer provides sign-up information. Publicly available sources may contain unique consumer information, including for example, vehicle registration records, real estate records, driving records, voting records, political donations, health information, government related data, technographics, or any other online sources disclosing information about people. Examples of algorithms that may be employed to perform these associations can be found in U.S. Patent Application Publication 2010/0088313 "Data Source Attribution System," hereby incorporated in its entirety by reference. See also U.S. Patent Application Publication 2010/0010993 "Distributed Personal Information Aggregator," also hereby incorporated in its entirety by reference.

In the example above, the Facebook username may be used as a search query by identity prediction module 122 to find the same username on a blog containing a real-world name and mobile phone number associated with the username, the mobile phone number being assigned to the iPhone associated with the now-verified real-world user associated with the Facebook username.

Operation 1602 depicts associating network-participation identifier data with a real-world user associated with the at least one communication device, including at least one of performing the association using identity prediction, performing the association using de-anonymization, or performing the association using real-name profiling. For example, unique identifier unit 102, identity prediction module 122, de-anonymization module 244, and/or real-name profiling module 246 may associate network-participation identifier data with a real-world user associated with the at least one communication device, including at least one of performing the association using identity prediction, performing the association using de-anonymization, or performing the association using real-name profiling. For example, accept from LinkedIn the name of a person associated with a videoconferencing device and corresponding account with a videoconferencing service such as WebEx Web conferencing. If the association between the LinkedIn subscriber and a real-world user associated with the videoconferencing device is missing, identity prediction module 122 may search relevant identity databases for matches to the subscriber's username or other profile data. In this way, verification of the real-world user can be accomplished, and association between the network-participation identifier data and the user associated with the communications device can be performed.

Operation 1604 depicts associating network-participation identifier data with a real-world user associated with the at least one communication device, including at least one of performing the association using web history tracking, performing the association using media content tracking, or performing the association using app data tracking. For example, unique identifier unit 102, Web history tracking module 248, media content tracking module 250, and/or app data tracking module 252 may associate network-participation identifier data with a real-world user associated with the at least one communication device, including at least one of performing the association using web history tracking, performing the association using media content tracking, or performing the association using app data tracking. For example, unique identifier unit 102 may accept from Google the email address of a person associated with an Android phone and corresponding account with a wireless carrier. In this example, app data tracking module 252 may match the email address with device ID from the phone, e.g., SIM data, and make the association between the email address and the phone. Additionally, web history tracking module 248 may search public databases for verification that a real-world user is associated with the email address, for example by searching department of motor vehicle records or real estate records.

Regulating Information Flow During Interactions

FIG. 17 illustrates an example system 1700 in which embodiments may be implemented. The system 1700 includes a persona creation unit 1706. The persona creation unit 1706 may contain, for example, personal information request acceptor module 1708, which may in turn contain identification request acceptor module 1710, financial information request acceptor module 1712, and/or web page parser module 1714. Web page parser module 1714 may contain X/Y coordinate web page reader 1716, web page image reader 1718, and/or screen scraper module 1719.

Persona creation unit 1706 also may contain, for example, transaction analysis logic 1730 and/or persona compiler module 1720, which may in turn contain personal information anonymizer module 1722, persona creation ruleset module 1724, vendor-specific persona database 1726, and/or personal assistant-mediated persona compiler module 1728. Persona creation unit 1706 may communicate over a network or directly with user 1701 to accept indication of interaction 1704 reflecting interaction 1702 with interaction partner 1703. Persona creation unit 1706 may also communicate over a network or directly with user 1701 and/or interaction partner 1703 to present persona 1740.

In FIG. 17, persona creation unit 1706 may accept indication of interaction 1704 by direct inspection of interaction 1702 or from user 1701 and/or interaction partner 1703. Optionally, persona creation unit 1706 may accept indication of interaction 1704 such as a request for personal information, a transaction indication, and/or a call from user 1701 for a persona.

In FIG. 17, the persona creation unit 1706 is illustrated as possibly being included within a system 1700. Of course, virtually any kind of computing device may be used to implement the special purpose persona creation unit 1706, such as, for example, a workstation, a desktop computer, a networked computer, a server, a collection of servers and/or databases, a virtual machine running inside a computing device, a mobile computing device, or a tablet PC.

Additionally, not all of the persona creation unit 1706 need be implemented on a single computing device. For example, the persona creation unit 1706 may be implemented and/or operable on a remote computer, while a user interface and/or local instance of the persona creation unit 1706 are implemented and/or occur on a local computer. Further, aspects of the persona creation unit 1706 may be implemented in different combinations and implementations than that shown in FIG. 17. For example, functionality of a user interface may be incorporated into the persona creation unit 1706. The persona creation unit 1706 may perform simple data relay functions and/or complex data analysis, including, for example, fuzzy logic and/or traditional logic steps. Further, many methods of establishing different online personas described herein or known in the art may be used, including, for example, algorithms commonly used in web page analysis may be used to determine a transaction scale as a basis for creating an appropriate persona containing an appropriate level of personal information for that transaction. In some embodiments, the persona creation unit 1706 may create a persona based on indications of interaction available as updates through a network.

Persona creation unit 1706 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona creation unit 1706 may be used to perform various data querying and/or recall techniques with respect to the indication of interaction 1704 and/or the interaction 1702, in order to create and present an appropriate persona 1740. For example, where indication of interaction 1704 elements are organized, keyed to, and/or otherwise accessible using one or more web page analysis tools, or the like, persona creation unit 1706 may employ various Boolean, statistical, and/or semi-boolean searching techniques to determine the appropriate level of information to place in a persona to be created. Similarly, for example, where user personal information is organized, keyed to, and/or otherwise accessible using one or more persona creation rulesets, various Boolean, statistical, and/or semi-boolean searching techniques may be performed by persona creation unit 1706 to create an appropriate persona.

Many examples of databases and database structures may be used in connection with the persona creation unit 1706. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive negotiation of persona content and/or for gathering and/or compiling data from the relational database(s).

For example, SQL or SQL-like operations over one or more indications of interaction 1704 and/or interaction 1702 may be performed, or Boolean operations using indications of interaction 1704 and/or interaction 1702 may be performed. For example, weighted Boolean operations may be performed in which different weights or priorities are assigned to one or more of the indications of interaction 1704 and/or interaction 1702, including various transaction identifier elements, locations, and/or contexts, perhaps relative to one another. For example, a number-weighted, exclusive-OR operation may be performed to request specific weightings of elements found on a check-out page of an e-commerce web page (e.g., dollar amount in cart, web site name, payment type).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 18 illustrates an operational flow 1800 representing example operations related to regulating information flow during interactions. In FIG. 18 and in following figures that include various examples of operational flows, discussion and explanation may be provided with respect to the above-described system environments of FIG. 17, and/or with respect to other examples and contexts. However, it should be understood that the operational flows may be executed in a number of other environments and contexts including that of FIG. 26, and/or in modified versions of FIG. 17. Also, although the various operational flows are presented in the sequence(s) illustrated, it should be understood that the various operations may be performed in other orders than those which are illustrated, or may be performed concurrently.

After a start operation, operation 1810 depicts accepting at least one indication of an interaction involving at least one member of a network. For example, persona creation unit 1706, personal information request acceptor module 1708, and/or persona compiler module 1720 may accept indication of interaction 1704 from a user 1701, for example in the form of auction bid dollar amount, a website name, or a purchase item name or dollar value. In another example, persona creation unit 1706 or transaction analysis logic 1730 may accept markup language code (e.g., HTML or XML) corresponding to a web page as the indication of interaction 1704.

Operation 1820 depicts creating a persona corresponding to the at least one member of a network, wherein the persona is at least partly based on the indication of an interaction. For example, persona creation unit 1706, personal information request acceptor module 1708, and/or persona compiler module 1720 may create a persona corresponding to the at least one member of a network, wherein the persona is at least partly based on the indication of an interaction. In one embodiment, persona creation unit 1706 may accept markup language code from a checkout webpage as the indication of interaction 1704. In this example, the code may indicate a dollar value of a purchase or auction bid. Based on that dollar value, the persona compiler module 1720 may present a specific persona containing specific personal information about the user for use in the interaction. In some embodiments, persona compiler 1720 may present a limited persona or alias of the user where the interaction is deemed by persona creation unit 1706 and/or transaction analysis logic 1730 to be of low dollar value. For financial interactions such as purchases or auctions, transaction analysis logic 1730 may detect a dollar value and assign a dollar value category for the interaction, for example low dollar value, intermediate dollar value, or high dollar value.

Alternatively, many intermediate levels of interaction value may be assigned based on a detected value present in the code or other attribute of the interaction. In these embodiments, a minimal persona containing few elements of personal information may be presented. In cases where a negotiation is initiated, subsequent presentations of personas containing progressively more personal information may be presented with the goal that an acceptable persona may be presented to the interaction partner which provides only that amount of personal information which is sufficient for completion of the interaction/transaction. This approach attempts to avoid gratuitous dissemination of potentially valuable personal information. For example, for low dollar transactions, persona compiler logic 1720 may be programmed to put together a persona for the user 1701 containing only a name and a device identifier, such as a telephone number. For some interaction partners, such a minimal persona will provide enough trust in the creditworthiness of the user 1701, perhaps via a check with a telecommunications carrier that the name matches the telephone number. In other, higher dollar value transactions, a persona containing more detailed personal information may be necessary. For example, for a car purchase, a persona including credit information, credit history, and personal financial asset data may be presented by persona compiler logic 1720.

In some embodiments, user 1701 will provide indication of interaction 1704 to persona creation unit 1706. In another embodiment, user 1701 may grant access to interaction 1702, for example by an affirmative step of opting-in or by not opting-out of a request by persona creation unit 1706. Personal information may be obtainable as a matter of course by persona creation unit 1706. For example, personal information of a user 1701 may be directly entered into persona creation unit 1706 for the purpose of allowing the unit to create personas, or alternatively, persona creation unit 1706 may indirectly access personal information through access to various accounts of user 1701, such as bank accounts, social network accounts, or telecommunications accounts. In some embodiments, some of the personal information may be publicly available.

Operation 1830 depicts presenting the persona for use in the interaction involving the at least one member of the network. For example, persona creation unit 1706, upon creating a persona based on an indication of interaction 1704, may present the persona for use in the interaction involving the at least one member of the network. For example, persona creation unit 1706 may accept a request for personal information from an interaction partner such as amazon.com. Persona creation unit 1706 may then assess the interaction 1702 based on dollar amount or personal information requested, and create a persona accordingly, perhaps according to a persona creation ruleset pre-programmed into persona creation ruleset module 1724. Persona creation unit 1706 may then present the persona to user 1701 for use in interaction 1702, or directly present the persona to the interaction 1702, perhaps in the form of filling in personal information fields on an e-commerce website. Such fields are equivalent to requests for personal information.

In some embodiments, persona creation unit 1706 may include a persona compiler algorithm such as an anonymization algorithm, a user-defined persona creation algorithm (i.e., ruleset), a vendor-specific persona creation algorithm, and/or a personal assistant-mediated persona compiler algorithm. These algorithms may aid in the creation of personas that are appropriate to a given interaction 1702.

In some embodiments, both for detecting the specifics of an interaction or transaction on a web page and for placing data into fields on a web page, it may be useful to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page. Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

The creation of personas described and claimed herein may function as a control feature of the unique identifier described above. In one embodiment, cascaded personas give more and more access to your real-world assets information. These personas may be uniquely or semi-uniquely linked to a real user. A credit bank such as Visa may manages these online personas—from something with little personal information such as "white male" to detailed real-life identity information. Because there is a direct link to personal information, provided by a telecommunications carrier via the device, it is possible to protect previously vulnerable web surfers who are at risk for having their personal information taken at will by snoopers. A user may look online and find a persona on the internet that is uniquely associated with them.

Under the persona creation environment described herein, opt-in may no longer be binary because a user may opt in to a set of circumstances around a persona or a type of identification. In this environment a user will have a true identity—SIM data and all that goes with it—that may or may not be communicated to an interaction partner 1703 depending upon the nature of interaction 1702. Accordingly, in the herein envisioned personas/relationships a user may have an unfolding level of envelopes that increases exposure to their personal information as you go deeper into the value of an interaction.

In one embodiment, a user interface with persona creation unit 1706 will specify—easily and preferably visually— exactly what type of commercial obligations and/or identity personas/relationships he/she is entering when he/she consents to assume a particular persona template.

FIG. 19 illustrates alternative embodiments of the example operational flow 1800 of FIG. 18. FIG. 19 illustrates example embodiments where the accepting operation 1810 may include at least one additional operation. Additional operations may include operation 1900, 1902, 1904, and/or operation 1906.

Operation 1900 depicts accepting from at least one member of a network an indication of an interaction involving the at least one member of a network. For example, persona creation unit 1706 and/or personal information request acceptor module 1708 may accept from user 1701 an indication of interaction 1704 such as a request for a persona to give to iTunes for the purchase of an MP3 file. As another example, personal information request acceptor module 1708 may forward from user 1701 a request for personal information from an e-commerce website such as Groupon relating to a potential purchase. In some embodiments, user 1701 may send a message to persona creation unit 1706 telling it that an interaction requiring a persona is happening, the message including a URL or other venue for the interaction, from which persona creation unit 1706 can extract the information necessary to evaluate the interaction and create an appropriate persona. Such a message may be sent by voice, text, touch, or other user interface mechanism.

Operation 1902 depicts accepting from an eBay user an indication of interest in an online auction. For example, persona creation unit 1706 and/or personal information request acceptor module 1708 may accept from user 1701 an indication of interest in an online auction. For example, personal information request acceptor module 1708 may accept a URL for an eBay auction page as the indication of interest in an online auction. Alternatively, eBay user 1701 may provide to persona creation unit 1706 a URL for an eBay auction page, and a URL for an eBay sign in page having fields for a User ID and Password as the indication of interest in an online auction.

Operation 1904 depicts accepting a request for personal information as the at least one indication of an interaction involving at least one member of a network. For example, persona creation unit 1706 and/or personal information request acceptor module 1708 may accept a request for personal information as the at least one indication of an interaction involving at least one member of a network. In one embodiment, personal information request acceptor module 1708 may accept a request for personal information on an e-commerce sign up page, such as name, address, email address, or credit card information. The request for personal information may be in the form of field on a web page, perhaps bearing an asterisk indicating required personal information, or appearing in red type indicating required personal information. In another embodiment, a request for personal information may be in the form of a field(s) asking for a shipping address.

Operation 1906 depicts accepting a request for at least one of name, physical address, email address, phone number, or credit card information as the personal information. For example, persona creation unit 1706 and/or personal information request acceptor module 1708 may accept a request for at least one of name, physical address, email address, phone number, or credit card information as the personal information. In one embodiment, personal information request acceptor module 1708 may accept a request for personal information on an e-commerce check out page, such as name, address, email address, or credit card information. For example, identification request acceptor module 1710 may accept a request for a user name and password from an e-commerce website such as Amazon.com or iTunes.

FIG. 20 illustrates alternative embodiments of the example operational flow 1800 of FIG. 18. FIG. 20 illustrates example embodiments where the accepting operation 1810 may include at least one additional operation. Additional operations may include operation 2000, 2002, 2004, 2006, 2008, and/or operation 2010.

Operation 2000 depicts accepting an indication of an online transaction involving at least one member of a network. For example, persona creation unit 1706, identification request acceptor module 1710, and/or financial information request acceptor module 1712 may accept an indication of an online transaction involving at least one member of a network. For example, identification request acceptor module 1710 may analyze a URL provided by a user 1701 corresponding to a social network sign up page such as the Facebook sign up page (e.g., http://www.facebook.com) having fields for first name, last name, email address, gender, age and password. In another example, web page parser module 1714 may accept a URL for a sign-in page, such as the sign-in page for Google mobile (e.g., m.google.com), and parse the markup language code to identify fields requesting a username and password. Other embodiments may involve transactions that are financial, as discussed below.

Operation 2002 depicts accepting an indication of an online financial transaction involving at least one member of a network. For example, persona creation unit 1706 and/or financial information request acceptor module 1712 may accept an indication of an online financial transaction involving at least one member of a network. In one embodiment, financial information request acceptor module 1712 may accept a request for an eBay user's PayPal account information as the indication of an online transaction involving at least one member of a network. In another embodiment, financial information request acceptor module 1712 may accept a request for an iTunes user's credit card information as the indication of an online transaction involving at least one member of a network. In another embodiment, financial information request acceptor module 1712 may accept a request for an Amazon.com user's credit card information as the indication of an online transaction involving at least one member of a network.

Operation 2004 depicts accepting an indication of at least one of a sign-up page, a login page, or a checkout page involving at least one member of a network. For example, persona creation unit 1706, identification request acceptor module 1710, financial information request acceptor module 1712, and/or web page parser module 1714 may accept an indication of at least one of a sign-up page, a login page, or a checkout page involving at least one member of a network. In one embodiment, financial information request acceptor module 1712 may accept a login page request for information from a member of the Amazon Prime network. In another example as discussed above, web page parser module 1714 may accept a URL for a sign-in page, such as the sign-in page for Google mobile (e.g., m.google.com), and parse the markup language code to identify fields requesting a username and password.

Operation 2006 depicts accepting an indication of an interaction involving at least one member of a social network. For example, persona creation unit 1706, identification request acceptor module 1710, and/or financial information request acceptor module 1712 may accept an indication of an interaction involving at least one member of a social network. For example as discussed above, identification request acceptor module 1710 may analyze a URL provided by a user 1701 corresponding to a social network sign up page such as the Facebook sign up page (e.g., http://www.facebook.com) having fields for first name, last name, email address, gender, age and password. In another example, web page parser module 1714 may accept a URL for a sign-in page, such as the sign-in page for Google+ (e.g., plus.google.com), and parse the markup language code of the sign-in page to identify fields requesting a username and password.

Operation 2008 depicts accepting an indication of an interaction between a registered member of a commercial website and the commercial website. For example, persona creation unit 1706, identification request acceptor module 1710, and/or financial information request acceptor module 1712 may accept an indication of an interaction between a registered member of a commercial website and the commercial website. In one embodiment, financial information request acceptor module 1712 may accept a request for a registered eBay user's PayPal account information in an interaction between the registered eBay user and the eBay website. In another embodiment, financial information request acceptor module 1712 may accept a request for a registered member of iTunes' credit card information in an interaction between the registered iTunes user and the iTunes website. In another embodiment, financial information request acceptor module 1712 may accept a request for information from amazon.com during a transaction between a member of Amazon Prime and the amazon.com website.

Operation 2010 depicts accepting an indication of an interaction between a registered member of amazon.com and the amazon.com website. For example, persona creation unit 1706, identification request acceptor module 1710, and/or financial information request acceptor module 1712 may accept an indication of an interaction between a registered member of amazon.com and the amazon.com website. In one embodiment, financial information request acceptor module 1712 may accept a request for information from Amazon.com during a transaction between a registered member of amazon.com and the amazon.com website, perhaps at the sign-in page on which the web page has fields for, e.g., username and password.

FIG. 21 illustrates alternative embodiments of the example operational flow 1800 of FIG. 18. FIG. 21 illustrates example embodiments where the creating operation 1820 may include at least one additional operation. Additional operations may include operation 2100 and/or operation 2102.

Operation 2100 depicts creating a set of personal information corresponding to the at least one member of a network, wherein the set of personal information is at least partly based on the indication of an interaction. For example, persona creation unit 1706 and/or persona compiler module 1720 may create a set of personal information corresponding to the at least one member of a network, wherein the set of personal information is at least partly based on the indication of an interaction. In one embodiment, persona creation unit 1706, having accepted an indication of interaction 1704 may compile a set of personal information for user 1701 to use in the interaction 1702. The set of personal information may be commensurate with the scale of the interaction. A general rule to protect personal information from possible identity thieves, advertisers, and spammers is to reveal as little personal information as possible within the requirements of the interaction.

As discussed above, individuals commonly have large amounts of personal information online that is publicly available, leaving them open to profiling by advertisers and those with even less honorable intentions such as identity thieves. Accordingly, as a way of mitigating the risk of spam and identity theft, it will be desirable for those interacting with websites to limit the dissemination of personal information, particularly when an interaction or transaction does not absolutely require transfer of certain personal information. For example, low dollar value online transactions ought not require detailed personal information about the buyer. If sufficient trust in payment is available, for example via an anonymous telecommunications carrier account, unique identifier as discussed above, or device identifier as security for the transaction, that ought to suffice. Conversely, high dollar value transactions will still require that detailed personal information be provided as security for the transaction, but a large range of intermediate dollar value transactions may benefit from a smart system of providing as little personal information possible during the transaction.

Operation 2102 depicts creating a set of anonymized personal information corresponding to the at least one member of a network, wherein the set of anonymized personal information is at least partly based on the indication of an interaction. For example, persona creation unit 1706, persona compiler module 1720, and/or personal information anonymizer module 1722 may create a set of anonymized personal information corresponding to the at least one member of a network, wherein the set of anonymized personal information is at least partly based on the indication of an interaction. In one embodiment, personal information anonymizer module 1722 may, for a low dollar value transaction, create an anonymized set of personal information for user 1701 to use in buying a staple object online. This may provide for anonymous private sales online, in which the security of the transaction for the seller is provided by, for example, a Verizon account number associated with a mobile device on which the transaction is taking place. In some embodiments, such an account number may be associated with an alias for the actual account holder to enhance privacy in the transaction.

In some embodiments, user 1701 may want to have multiple aliases, each having a different amount of personal information detail as appropriate for use in various online activities.

FIG. 22 illustrates alternative embodiments of the example operational flow 1800 of FIG. 18. FIG. 22 illustrates example embodiments where the creating operation 1820 may include at least one additional operation. Additional operations may include operation 2200, 2202, 2204, and/or operation 2206.

Operation 2200 depicts creating a persona corresponding to the at least one member of a network, wherein the persona is at least partly based on the indication of an interaction and at least partly based on a persona-creation ruleset. For example, persona creation unit 1706, persona compiler module 1720, and/or persona creation ruleset module may create a persona corresponding to the at least one member of a network, wherein the persona is at least partly based on the indication of an interaction and at least partly based on a persona-creation ruleset. In one embodiment, persona compiler module 1720, having accepted an indication of interaction 1704 may access persona creation ruleset module 1724 to find out whether the indication of interaction 1704 matches a predefined rule. For example, persona creation ruleset module 1724 may contain a rule stating that online purchases for items having a value of 25 dollars or less should automatically trigger the creation and presentation of a persona for user 1701 that includes only a name and necessary payment information, such as an Entropay prepaid virtual Visa card number. In some cases, the name may be an alias, especially in cases where using an alias comports with the terms of service of a vendor's website.

Operation 2202 depicts creating a persona corresponding to the at least one member of a network, wherein the persona is at least partly based on the indication of an interaction and at least one ruleset defining thresholds for assigning personal information to a persona. For example, persona creation unit 1706, persona compiler module 1720, and/or persona creation ruleset module may create a persona corresponding to the at least one member of a network, wherein the persona is at least partly based on the indication of an interaction and at least one ruleset defining thresholds for assigning personal information to a persona. In one embodiment, persona compiler module 1720, having accepted an indication of interaction 1704 may access persona creation ruleset module 1724 to find out whether the indication of interaction 1704 matches a predefined rule establishing a threshold. For example, persona creation ruleset module 1724 may contain a rule stating that online purchases for items under 5 dollars in value using virtual currency or credit may be made using "persona A," whereas online purchases for items that are 5 dollars to 50 dollars in value using virtual currency or credit may be made using "persona B." Personas A and B may differ in, for example, the amount of personal information provided, the virtual account to be accessed for payment.

Operation 2204 depicts creating a persona corresponding to the at least one member of a network, wherein the persona is at least partly based on the indication of an interaction and at least one ruleset defining dollar amount thresholds for assigning personal information to a persona. For example, persona creation unit 1706, persona compiler module 1720, and/or persona creation ruleset module may create a persona corresponding to the at least one member of a network, wherein the persona is at least partly based on the indication of an interaction and at least one ruleset defining dollar amount thresholds for assigning personal information to a persona. In one embodiment, persona compiler module 1720, having accepted an indication of interaction 1704 may access persona creation ruleset module 1724 to find out whether the indication of interaction 1704 matches a predefined rule establishing a dollar amount threshold. As in the previous example, persona creation ruleset module 1724 may contain a rule stating that online purchases for items having a value of 25 dollars or less should automatically trigger the creation and presentation of a persona for user 1701 that includes only a name and necessary payment information, such as an Entropay prepaid virtual Visa card number. A dollar value threshold may also include a range, for example, transactions between 1,000 and 5,000 dollars in value. In this case, persona compiler module 1720 may consult a rule in persona creation ruleset module 1724 that assigns name, telephone number, physical address, and credit card information to the persona to be presented. The ruleset may also specify that the credit card information to be included in the persona should be checked to confirm that the available credit line is higher than the dollar value of the transaction, so as to avoid having the credit card declined.

Operation 2206 depicts creating a persona corresponding to the at least one member of a network, wherein the persona is at least partly based on the indication of an interaction and at least one ruleset defining thresholds for assigning personal information to a persona at least partly based on a context of the interaction. For example, persona creation unit 1706, persona compiler module 1720, and/or persona creation ruleset module may create a persona corresponding to the at least one member of a network, wherein the persona is at least partly based on the indication of an interaction and at least one ruleset defining thresholds for assigning personal information to a persona at least partly based on a context of the interaction. In one embodiment, persona compiler module 1720, having accepted a request for a "check-in" from a social networking app such as foursquare as the indication of interaction 1704 may access persona creation ruleset module 1724 to find out which persona to use in going forward with the check-in. In this example, some users may set as a rule using an alias as their persona for checking in geographically if they do not want everyone in their social graph knowing that they are checking in at a certain location. This would allow the user to check in, but in a way that is context-sensitive. Similarly, the context of a specific website could be a rule to use a certain persona on that website. For example, different personas could be pre-configured for websites such as amazon.com, eBay, and iTunes. When persona creation unit 1706 accepts data indicating an interaction with one of these websites, amazon.com, e.g., persona creation unit 1706 may consult persona creation ruleset module 1724 to call out a pre-programmed persona for use with a transaction on the amazon.com website. The context can be even more detailed by adding other contexts such as dollar value context, time of day context, and/or device context. For example, if a user 1701 shares a device like a smart phone with family members and has a shared e-commerce account on, e.g., eBay, persona creation unit 1706 may detect the smart phone, consult persona creation ruleset module 1724 to find a ruleset for that smart phone, and apply the appropriate persona. In this example, a parent may place an upper limit on all transactions made from the device so as to prevent a child from buying something that is too expensive. This control may be manifested by persona creation unit 1706 creating and presenting a persona for use with eBay on the smart phone which is associated with a payment means such as a credit card or PayPal account having the desired upper limit.

FIG. 23 illustrates alternative embodiments of the example operational flow 1800 of FIG. 18. FIG. 23 illustrates example embodiments where the creating operation 1820 may include at least one additional operation. Additional operations may include operation 2300, 2302, 2304, and/or operation 2306.

Operation 2300 depicts creating a minimal set of personal information corresponding to the at least one member of a network, wherein the minimal set of personal information is at least partly based on the indication of an interaction. For example, persona creation unit 1706 and/or personal information anonymizer module 1722 may create a minimal set of personal information corresponding to the at least one member of a network, wherein the minimal set of personal information is at least partly based on the indication of an interaction. For example, persona creation unit 1706 may accept from user 1701 an indication of interaction 1704 in the form of a web address linking to a page for the purchase of a music cd on the bestbuy.com website. In some embodiments, as a default setting, persona creation module 1706 may monitor the web pages visited by a member of a network, e.g., user 1701, and identify likely web pages or interactions 1702 in which a persona would be useful. For example, if persona creation module 1706 has access to the web pages visited by user 1701, it can examine the code of those pages looking for telltale signs of an e-commerce transaction or other transaction in which a persona could be useful. Such telltale signs may include words associated with a purchase such as payment type, credit card type, dollar amount, "cart," "buy now," tax, shipping, or the like. Alternatively, telltale signs may include personal information categories that typically appear on sign-up or sign-in pages such as name, username, password, and email address. In the above example, for a minor purchase such as a music cd or mp3, personal information anonymizer module 1722 may anonymize certain personal information of user 1701 under the theory that bestbuy.com does not need very much personal information to be assured of payment for the music. Assurance of payment may be obtained from, for example, a telecommunications carrier, credit card account, or virtual payment.

Operation 2302 depicts creating a persona including name, physical address, and device identifier data corresponding to the at least one member of a network, wherein the persona is at least partly based on an indication of a low-dollar-cost transaction. For example, persona creation unit 1706 and/or personal information anonymizer module 1722 may create a persona including name, physical address, and device identifier data corresponding to the at least one member of a network, wherein the persona is at least partly based on an indication of a low-dollar-cost transaction. For example, persona creation unit 1706 may accept from user 1701 an indication of interaction 1704 in the form of a check-out page having fields for payment including credit card information, where the dollar amount is under ten dollars. For example, in a low-dollar-cost transaction, persona creation unit 1706 may provide only name, physical address, and device identifier data in satisfying security concerns of the vendor. In one embodiment, payment may be secured through the telecommunications carrier associated with the device identifier data (e.g., SIM data, MEID, or other device identifier discussed above). In another embodiment, payment may be secured through a credit card account held by the telecommunications carrier associated with the device identifier data. In yet another embodiment, payment may be secured through a service like Portapayments, which creates quick response (QR) codes for PayPal payments. Scanning one of their QR codes with a mobile device takes a user 1701 to PayPal with the recipient and amount of the transaction automatically filled out. The user 1701 need only approve the payment to complete the interaction. PortaPayments allows customers to purchase goods by scanning a 3D bar code with their phone. Two types of codes are available: one is free and requires the use of PortaPayments' application to scan and pay; the other, called a universal code, has a fee associated with it and will work with any QR code scanner that can scan and direct users to website URLs.

Operation 2304 depicts creating a detailed set of personal information corresponding to the at least one member of a network, wherein the detailed set of personal information is at least partly based on the indication of an interaction. In one example, persona creation unit 1706 may create a detailed set of personal information corresponding to the at least one member of a network, wherein the detailed set of personal information is at least partly based on the indication of an interaction. For example, persona creation unit 1706 may accept an indication of interaction 1704 in the form of an e-commerce cart website on which is shown an item to be purchased having a price of 1500 dollars. The interaction partner 1703 in this transaction may require a relatively detailed set of personal information before approving the sale. For example, to circumvent fraud, personal information including a credit card number (perhaps with a card security code), valid email address, name matching that on the card, and physical address matching the billing address of the credit card.

Operation 2306 depicts creating a persona including real name, physical address, credit card information, and device identifier information corresponding to the at least one member of a network, wherein the persona is at least partly based on an indication of a high-dollar-cost transaction. In one example, persona creation unit 1706 may create a persona including real name, physical address, credit card information, and device identifier information corresponding to the at least one member of a network, wherein the persona is at least partly based on an indication of a high-dollar-cost transaction. To continue the above example, persona creation unit 1706 may accept an indication of interaction 1704 in the form of an e-commerce cart website on which is shown an item to be purchased having a price of 1500 dollars. The interaction partner 1703 in this transaction may require a relatively detailed set of personal information before approving the sale. For example, personal information including a credit card number (perhaps with a card security code), valid email address, name matching that on the card, and physical address matching the billing address of the credit card. However, persona creation unit 1706 may also include device identifier information, perhaps in lieu of other elements of personal information. In some embodiments, device identifier information in combination with other personal information such as telecommunications account number may provide security for payment to the vendor, perhaps even to the extent that a credit card number is not necessary where the telecommunications carrier stands in as the guarantor for the value of the transaction.

FIG. 24 illustrates alternative embodiments of the example operational flow 1800 of FIG. 18. FIG. 24 illustrates example embodiments where the presenting operation 1830 may include at least one additional operation. Additional operations may include operation 2400, 2402, 2404, 2406, and/or operation 2408.

Operation 2400 depicts placing elements of the persona into fields of an online form for use in the interaction involving the at least one member of the network. In one example, persona creation unit 1706 and/or vendor-specific persona database 1726 may create a persona for user 1701 based on an interaction 1702 with an amazon.com checkout page. Upon approval by the user 1701, the individual information elements of the created persona may be placed in the appropriate fields/boxes on the amazon.com checkout web page. This may be facilitated by vendor-specific persona database 1726, which may, in addition to having information about what personal information is required, may contain information as to where on the checkout page various personal information should go, perhaps in the form of markup language code, ordinary web page text, or XY coordinates, for example.

Operation 2402 depicts presenting the persona to an online vendor for use in securing credit for an online purchase from the online vendor. In one example, persona creation unit 1706 may present the persona to an online vendor for use in securing credit for an online purchase from the online vendor. To continue the embodiment above, persona creation unit 1706 may create a persona for user 1701 based on an interaction 1702 with an amazon.com checkout page as the interaction partner 1703. In this example user 1701 may be a member of the Amazon Prime network, Facebook, or the hotmail email network. In some embodiments, membership in the network may help secure low-dollar-value transactions. More specifically, verified membership in an exclusive private network such as Sermo for physicians or LinkedIn for professionals may suffice as security for low-dollar-value transactions, perhaps with only name and email address in addition.

Operation 2404 depicts presenting the persona at a vendor's physical establishment for use in securing credit for a purchase from the vendor. In one example, persona creation unit 1706 may present the persona at a vendor's physical establishment for use in securing credit for a purchase from the vendor. In one embodiment, a mobile device having a persona creation unit 1706 (either on the client or on a server perhaps as a cloud service) may be used to broker a transaction for a user 1701 at a device reader at a physical location of an interaction partner 1703. In this example, a vendor equipped with a near field communications reader may use the reader to communicate with the reader's device to exchange details of a purchase and a created persona. For example, for low-dollar-value purchases, a persona associated with a Google wallet account, even if the vendor's terminal is not PayPass enabled. For some transactions, the Google wallet account-associated persona may suffice as security for the transaction, perhaps through a transfer of virtual currency or credit. Another example of this may employ a persona associated with the Entropay prepaid virtual credit technology described above.

Operation 2406 depicts presenting the persona via a computer-implemented personal assistant for use in the interaction involving the at least one member of the network. In one example, persona creation unit 1706 may present the persona via a computer-implemented personal assistant for use in the interaction involving the at least one member of the network. In one embodiment, a mobile device having a persona creation unit 1706 (either on the client or on a server perhaps as a cloud service) through a personal assistant interface may be used to broker a transaction, such as an online purchase, for a user 1701. Natural language processing has advanced to the point where speech recognition and response by a mobile device is able to mediate persona management in the context of a transaction with only minimal input from the user 1702, and that by voice alone. For example, user 1701 may say to his mobile device "create a persona for buying a New York Times subscription on my iPad." The persona creation unit 1706 may accordingly access the web to find the cost of such a subscription so as to provide a persona with the appropriate amount of personal information. If subscriptions for different time periods are found, the personal assistant may ask user 1701 which he is interested in, for example one year. The personal assistant may then present a persona or two to the user 1701, the user may select one, and then the personal assistant may then open the New York Times subscription ordering web page and complete the appropriate fields according to the persona selected. The user may retain final confirmation of the purchase by voice command via the personal assistant.

Operation 2408 depicts presenting the persona via a computer-implemented personal assistant for use in the interaction involving the at least one member of the network, wherein Siri is the computer-implemented personal assistant. In one example, persona creation unit 1706 may present the persona via a computer-implemented personal assistant for use in the interaction involving the at least one member of the network, wherein Siri is the computer-implemented personal assistant. As described above, a personal assistant may be used at each operation of the claimed systems and methods. Siri is Apple's personal assistant included for the first time in the iPhone 4S. Siri may be used as a persona creation unit as described in the example above, for example to rapidly and easily buy apps from the iTunes App Store. Siri's knowledge of the user 1701's device and telecommunications carrier contract details may be used to quickly and easily secure low-dollar-value transaction credit, such as for iPad apps, in terms of minimal personas that are linked to known devices and accounts for a given user 1701.

FIG. 25 illustrates a partial view of an example article of manufacture 2500 that includes a computer program 2504 for executing a computer process on a computing device. An embodiment of the example article of manufacture 2500 is provided including a signal bearing medium 2502, and may include one or more instructions for accepting at least one indication of an interaction involving at least one member of a network; one or more instructions for creating a persona corresponding to the at least one member of a network, wherein the persona is at least partly based on the indication of an interaction; and one or more instructions for presenting the persona for use in the interaction involving the at least one member of the network. The one or more instructions may be, for example, computer executable and/or logic-implemented instructions. In one implementation, the signal-bearing medium 2502 may include a computer-readable medium 2506. In one implementation, the signal bearing medium 2502 may include a recordable medium 2508. In one implementation, the signal bearing medium 2502 may include a communications medium 2510.

FIG. 26 illustrates an example system 2600 in which embodiments may be implemented. The system 2600 includes a computing system environment. The system 2600 also illustrates a user 2612 using a device 2604, which is optionally shown as being in communication with a computing device 2602 by way of an optional coupling 2606. The optional coupling 2606 may represent a local, wide-area, or peer-to-peer network, or may represent a bus that is internal to a computing device (e.g., in example embodiments in which the computing device 2602 is contained in whole or in part within the device 2604). A storage medium 2608 may be any computer storage media. In one embodiment, the computing device 2602 may include a virtual machine operating within another computing device. In an alternative embodiment, the computing device 2602 may include a virtual machine operating within a program running on a remote server.

The computing device 2602 includes computer-executable instructions 2610 that when executed on the computing device 2602 cause the computing device 2602 to (a) accept at least one indication of an interaction involving at least one member of a network; (b) create a persona corresponding to the at least one member of a network, wherein the persona is at least partly based on the indication of an interaction; and (c) present the persona for use in the interaction involving the at least one member of the network. As referenced above and as shown in FIG. 26, in some examples, the computing device 2602 may optionally be contained in whole or in part within the device 2604.

In FIG. 26, then, the system 2600 includes at least one computing device (e.g., 2602 and/or 2604). The computer-executable instructions 2610 may be executed on one or more of the at least one computing device. For example, the computing device 2602 may implement the computer-executable instructions 2610 and output a result to (and/or receive data from) the computing device 2604. Since the computing device 2602 may be wholly or partially contained within the computing device 2604, the device 2604 also may be said to execute some or all of the computer-executable instructions 2610, in order to be caused to perform or implement, for example, various ones of the techniques described herein, or other techniques.

The device 2604 may include, for example, a portable computing device, workstation, or desktop computing device. In another example embodiment, the computing device 2602 is operable to communicate with the device 2604 associated with the user 2612 to receive information about the input from the user 2612 for performing data access and data processing, and present a persona for use in the interaction involving the at least one member of the network, e.g., user 2612.

Negotiation of Personas Between Parties to a Transaction—Vendor Side

FIG. 27 illustrates an example system 2700 in which embodiments may be implemented. The system 2700 includes a persona negotiation agent 2706. The persona negotiation agent 2706 may contain, for example, transaction evaluation module 2708, which may in turn contain transaction value analysis module 2710, persona acceptor module 2712, and/or web page parser module 2714. Web page parser module 2714 may contain X/Y coordinate web page reader 2716, web page image reader 2718, and/or screen scraper module 2719. Persona negotiation agent 2706 also may contain, for example, cost adjustment module

2728, condition-setting module 2730, and/or persona evaluation module 2720, which may in turn contain identity profile module 2722, party history evaluation module 2724, and/or creditworthiness evaluation module 2726. Persona negotiation agent 2706 may communicate over a network or directly with party 2701 to accept at least one persona in the context of transaction 2702, to evaluate transaction 2702, and to negotiate receipt of at least one different persona from the party to the transaction at least partly based on an evaluation of the transaction.

In FIG. 27, persona negotiation agent 2706 may accept persona 2704 directly from party 2701 or indirectly by inspection of transaction 2702, for example by viewing the party's personal information in fields on a web page related to the transaction.

In FIG. 27, the persona negotiation agent 2706 is illustrated as possibly being included within a system 2700. Of course, virtually any kind of computing device may be used to implement the special purpose persona negotiation agent 2706, such as, for example, a workstation, a desktop computer, a networked computer, a server, a collection of servers and/or databases, a virtual machine running inside a computing device, a mobile computing device, or a tablet PC.

Additionally, not all of the persona negotiation agent 2706 need be implemented on a single computing device. For example, the persona negotiation agent 2706 may be implemented and/or operable on a remote computer, while a user interface and/or local instance of the persona negotiation agent 2706 are implemented and/or occur on a local computer. Further, aspects of the persona negotiation agent 2706 may be implemented in different combinations and implementations than that shown in FIG. 27. For example, functionality of a user interface may be incorporated into the persona negotiation agent 2706 for the benefit of personnel supervising transactions for an online vendor. The persona negotiation agent 2706 may perform simple data relay functions and/or complex data analysis, including, for example, fuzzy logic and/or traditional logic steps. Further, many methods of negotiating personas described herein or known in the art may be used, including, for example, algorithms commonly used in web page analysis may be used to determine a transaction scale as a basis for negotiating an appropriate persona containing an appropriate level of personal information for a transaction. In some embodiments, the persona negotiation agent 2706 may negotiate a persona based on information about a transaction available as updates through a network.

Persona negotiation agent 2706 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona negotiation agent 2706 may be used to perform various data querying and/or recall techniques with respect to the persona 2704 and/or the transaction 2702, in order to negotiate an appropriate different persona. For example, where transaction 2702 elements are organized, keyed to, and/or otherwise accessible using one or more web page analysis tools, or the like, persona negotiation agent 2706 may employ various Boolean, statistical, and/or semi-boolean searching techniques to determine the appropriate level of information request and/or demand be present in a persona to be acceptable as an underpinning for a transaction. Similarly, for example, where user personal information is organized, keyed to, and/or otherwise accessible using one or more persona negotiation rulesets, various Boolean, statistical, and/or semi-boolean searching techniques may be performed by persona negotiation agent 2706 to negotiate an appropriate different persona.

Many examples of databases and database structures may be used in connection with the persona negotiation agent 2706. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive negotiation of persona content and/or for gathering and/or compiling data from the relational database(s).

For example, SQL or SQL-like operations over one or more personas 2704 and/or properties of transaction 2702 may be performed, or Boolean operations using personas 2704 and/or properties of transaction 2702 may be performed. For example, weighted Boolean operations may be performed in which different weights or priorities are assigned to one or more of the personas 2704 and/or properties of transaction 2702, including various transaction identifier elements, locations, and/or contexts, perhaps relative to one another. For example, a number-weighted, exclusive-OR operation may be performed to request specific weightings of elements found on a check-out page of an e-commerce web page (e.g., email address, telephone number, mailing address, credit card information, dollar amount in cart, web site name, payment type).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 28 illustrates an operational flow 2800 representing example operations related to regulating information flow during interactions. In FIG. 28 and in following figures that include various examples of operational flows, discussion and explanation may be provided with respect to the above-described system environments of FIG. 27, and/or with respect to other examples and contexts. However, it should be understood that the operational flows may be executed in a number of other environments and contexts including that of FIG. 34, and/or in modified versions of FIG. 27. Also, although the various operational flows are presented in the sequence(s) illustrated, it should be understood that the various operations may be performed in other orders than those which are illustrated, or may be performed concurrently.

After a start operation, operation 2810 depicts accepting at least one persona from a party to a transaction. For example, persona negotiation agent 2706, persona acceptor module 2712, and/or persona evaluation module 2720 may accept persona 2704 from party 2701, for example in the form of a set of personal information about party 2704 or in the form of an incompletely filled-out online transaction form. In another example, persona negotiation agent 2706 or persona acceptor module 2712 may accept markup language code (e.g., HTML or XML) corresponding to a transaction web page as the persona 2704.

Operation 2820 depicts evaluating the transaction. For example, persona negotiation agent 2706, transaction evaluation module 2708, web page parser module, and/or transaction value analysis module 2710 may evaluate the transaction. In one embodiment, transaction value analysis module 2710 may analyze markup language code from a checkout webpage corresponding to transaction 2702. In this example, the code may indicate a dollar value of an item to be purchased or to be bid on in an auction. Based on that dollar value, the persona negotiation agent 1720 may present a specific counteroffer to party 2701 asking for additional personal information as the different persona, perhaps containing additional specific personal information about the party 2701 as security for the transaction. In some embodiments, persona transaction evaluation module 2708 may accept a limited persona or alias of the user where the interaction is of low dollar value. For financial interactions such as purchases or auctions, transaction value analysis module 2710 may detect a dollar value and assign a dollar value category for the interaction, for example low dollar value, intermediate dollar value, or high dollar value. Rulesets for the persona negotiation agent 2706 to follow may be set by the vendor according to any premium that the vendor places on acquiring personal information about her customers.

Alternatively, many intermediate levels of interaction value may be assigned based on a detected value present in the web page code or other attribute of the transaction 2702. In these embodiments, a minimal persona containing only a few elements of personal information may be presented by party 2701 initially as the persona that supports the transaction 2702. After the negotiation is initiated, subsequent presentations of personas by party 2701 containing progressively more personal information may be presented with the goal that an acceptable persona may be presented to persona negotiation agent 2706 which provides only that amount of personal information needed for completion of the interaction/transaction. This approach attempts to avoid gratuitous dissemination of potentially valuable personal information. For example, for low dollar transactions, transaction evaluation module 2708 may be programmed to accept in a negotiation a minimal persona containing, e.g., only a name and a device identifier, such as a telephone number. For some vendors, such a minimal persona will provide enough trust in the credit-worthiness of the party 2701, perhaps via a check with a telecommunications carrier that the name matches the telephone number. In other, higher dollar value transactions, a persona containing more detailed personal information may be necessary. For example, for a car purchase, a persona including credit information, credit history, and personal financial asset data may be required by persona negotiation agent 2706.

In some embodiments, party 2701 will provide persona 2704 to persona negotiation agent 2706. In another embodiment, party 2701 may grant access to transaction 2702, for example by an affirmative step of opting-in or by not opting-out of a request by persona negotiation agent 2706. Personal information may be obtainable as a matter of course by persona negotiation agent 2706. For example, personal information of a party 2701 may be directly provided to persona negotiation agent 2706 for the purpose of facilitating the purchase, or alternatively, persona negotiation agent 2706 may indirectly access personal information of party 2701 through access to various accounts, such as website accounts, bank accounts, social network accounts, or telecommunications accounts. In some embodiments, some of the personal information may be publicly available.

Operation 2830 depicts negotiating receipt of at least one different persona from the party to the transaction at least partly based on an evaluation of the transaction. For example, persona negotiation agent 2706 negotiate receipt of at least one different persona from the party to the transaction at least partly based on an evaluation of the transaction. For example, persona negotiation agent 2706 may accept a persona from an amazon.com customer in the course of an online purchase. Persona negotiation agent 2706 may then evaluate the transaction 2702 based on dollar amount, party 2701, or personal information not provided, and initiate a negotiation to obtain more personal information, e.g., where the transaction has a high dollar value. This may be done according to a persona negotiation ruleset pre-programmed into persona negotiation agent 2706. Persona negotiation agent 2706 may then accept or reject a counteroffer from party 2701, perhaps by examining actions taken by party 2701 on the transaction webpage, such as completion of personal information fields on the webpage. Such fields are equivalent to requests for personal information.

In some embodiments, persona negotiation agent 2706 may include an identity profile function to further characterize party 2701 according to publicly or privately available information that might be available to persona negotiation agent 2706. Persona negotiation agent 2706 may also consider past interactions with party 2701 and any information that might be available about the creditworthiness of party 2701.

In some embodiments, both for detecting the specifics of an interaction or transaction on a web page and for placing data into fields on a web page, it may be useful for persona negotiation agent 2706 to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page. Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

FIG. 29 illustrates alternative embodiments of the example operational flow 2800 of FIG. 28. FIG. 29 illustrates example embodiments where the accepting operation 2810 may include at least one additional operation. Additional operations may include operation 2900, 2902, and/or operation 2904.

Operation 2900 depicts accepting a set of personal information as the at least one persona. For example, persona negotiation agent 2706 and/or persona acceptor module 2712 may accept a set of personal information as the at least one persona. In one embodiment, persona acceptor module 2712 may accept from party 2701 a persona including a name and email address for the purchase of an MP3 file from the iTunes store. As another example, persona negotiation agent 2706 may accept a persona on an e-commerce website such as Groupon relating to a potential purchase. In some embodiments, party 2701 may send a message to persona negotiation agent 2706, in effect telling it that it would like to negotiate a persona for a transaction, the message including a URL or other venue for the transaction, from which persona negotiation agent 2706 can extract the information necessary to evaluate the transaction and negotiate an appropriate persona. Such a message may be sent by voice, text, touch, or other user interface mechanism. In some instances the persona negotiation agent 2706 will be invisible or transparent to party 2701, except for the offer/counteroffer of the negotiation.

Operation 2902 depicts accepting at least one persona from a prospective purchaser in an online transaction. For example, persona negotiation agent 2706 and/or persona acceptor module 2712 may accept at least one persona from a prospective purchaser in an online transaction. For example, persona acceptor module 2712 may accept an eBay username as the persona for an eBay auction page from a party 2701 interested in an online auction. Alternatively, party 2701 may provide to persona negotiation agent 2706 a URL for an eBay auction page, and a URL for an eBay sign in page having fields for a User ID and Password as the persona for the party 2701. Access to the auction may be negotiated, in part, based on the past history of party 2701 with eBay.

Operation 2904 depicts accepting a persona consisting of username, email address, and device identifier from a prospective purchaser in an online transaction. For example, persona negotiation agent 2706 and/or persona acceptor module 2712 may accept a persona consisting of username, email address, and device identifier from a prospective purchaser in an online transaction. In one embodiment, persona negotiation agent 2706 and/or persona acceptor module 2712 may accept a username, email address, and IP address for the party's computer at an e-commerce transaction page. The persona may be in the form of information in fields on a web page as well as information detectable by software agents of the website such as the IP address of the party.

FIG. 30 illustrates alternative embodiments of the example operational flow 2800 of FIG. 28. FIG. 30 illustrates example embodiments where the evaluating operation 2820 may include at least one additional operation. Additional operations may include operation 3000, 3002, and/or operation 3004.

Operation 3000 depicts evaluating a monetary value for the transaction. For example, persona negotiation agent 2706, transaction evaluation module 2708, and/or, transaction value analysis module 2710 may evaluate a monetary value for the transaction. In one embodiment, transaction value analysis module 2710 may analyze a URL provided by a party 2701 corresponding to an app store order page. Transaction value analysis module 2710 may read the code on the web page, image the page, or otherwise determine the object of the transaction and the monetary value of the object (i.e., a good or service). In another example, web page parser module 2714 may accept a URL for an online pizza order form, such as an order page for Domino's pizza, and parse the markup language code or text to identify a dollar value for the pizza order (on the Domino's order page the dollar amount appears next to "Total:" and has a dollar sign with the amount).

Operation 3002 depicts evaluating known information about the party to the transaction. For example, persona negotiation agent 2706, transaction evaluation module 2708, persona evaluation module 2720, identity profile module 2722, party history evaluation module 2724, and/or creditworthiness evaluation module 2726 may evaluate known information about the party to the transaction. In one embodiment, party history evaluation module 2724 may evaluate a party's history of interaction with a website, if there is any. If there is a history of purchases and payments, that may be one factor taken into account by persona negotiation agent 2706 in arriving at a persona to support transaction 2702: a long history of timely and diligent payments by a party may decrease personal information requirements going forward.

Operation 3004 depicts evaluating at least one of demographics, credit history, or transaction history about the party to the transaction. For example, persona negotiation agent 2706, transaction evaluation module 2708, persona evaluation module 2720, identity profile module 2722, party history evaluation module 2724, and/or creditworthiness evaluation module 2726 may evaluate at least one of demographics, credit history, or transaction history about the party to the transaction. In one embodiment, identity profile module 2722 may use available information about a party to search for additional information, perhaps based on bankruptcy filings, credit history reports, or any other indicators of financial activity by the party. Alternatively, identity profile module 2722 may search available information about the party 2701 and determine that they are in an young age bracket such that a parent's credit card information would be required to complete the transaction 2702. Persona negotiation agent 2706 may then conduct the negotiation accordingly.

FIG. 31 illustrates alternative embodiments of the example operational flow 2800 of FIG. 28. FIG. 31 illustrates example embodiments where the negotiating operation 2830 may include at least one additional operation. Additional operations may include operation 3100, 3102, 3104, and/or operation 3106.

Operation 3100 depicts negotiating receipt of a persona including an indication of creditworthiness from the party to the transaction at least partly based on an evaluation of the transaction. For example, persona negotiation agent 2706, transaction evaluation module 2708, persona evaluation module 2720, identity profile module 2722, party history evaluation module 2724, and/or creditworthiness evaluation module 2726 may negotiate receipt of a persona including an indication of creditworthiness from the party to the transaction at least partly based on an evaluation of the transaction. In one embodiment, creditworthiness evaluation module 2726 may notify party 2701 that valid credit card information is required to complete transaction 2702, having first evaluated the transaction and deemed it to be one that required transfer of credit card information to ensure payment by party 2701.

As discussed above, high dollar value transactions will require that detailed personal information be provided as security for the transaction, but a large range of intermediate dollar value transactions may benefit from a smart system of providing as little personal information possible during the transaction. This will benefit both party 2701 in terms of minimizing transfer of personal information, and also the vendor, who will save potentially save time and administrative costs if transactions are streamlined.

In one embodiment of how the persona negotiation agent 2706 may operate, it may begin by generating an offer that consists of the issues that is most important for the agent, e.g., a persona containing additional personal information. It does this because it wants to tell to the party, at the outset, which issues are the most important for the agent. After sending the offer, the agent will subsequently receive a message from the party. The party could accept the offer, refuse the offer, or propose a counteroffer. Both acceptance and refusal will result in ending the negotiations, but if the message is a counteroffer, then the agent will form a new offer to the party.

In one embodiment, the agent doesn't know any information regarding the party's preferences, and so it has to create a model of party utility values in order to make an offer that is acceptable to the party, while still maintaining the agent's acceptance value. An acceptance value is the value of an offer that it can accept. This value will decrease in time, since there is a limited time in negotiation. But the acceptance value will never be less than the agent's reservation value, an absolute requirement. The reservation value is the lowest utility value where the agent may still accept a counteroffer from the party, but it will accept it only if there is an impasse in the negotiation. For more information about automated negotiation agents, see U.S. Patent Application Publication 2011 0238840, Method, System, and Device for Service Negotiation; incorporated herein by reference. See also U.S. Patent Application Publication 2002 0120588, Method and Apparatus for Negotiation; also incorporated herein by reference.

Operation 3102 depicts negotiating receipt of a different persona including additional personal information from the party to the transaction at least partly based on an evaluation of the transaction that includes a transaction value over one hundred dollars. For example, persona negotiation agent 2706 may negotiate receipt of a different persona including additional personal information from the party to the transaction at least partly based on an evaluation of the transaction that includes a transaction value over one hundred dollars. In one embodiment, persona negotiation agent 2706 may, for a high dollar value transaction, e.g., one hundred dollars, negotiate receipt of a persona that includes more information than initially provided by party 2701, perhaps identifying information such as birthdate, device identifier information, and/or credit card information. This may provide a vendor with security with which to complete the transaction.

Operation 3104 depicts negotiating receipt of a different persona including additional personal information from the party to the transaction at least partly based on an evaluation of the transaction, wherein the cost of the transaction is discounted in exchange for the additional personal information. For example, persona negotiation agent 2706 may negotiate receipt of a different persona including additional personal information from the party to the transaction at least partly based on an evaluation of the transaction, wherein the cost of the transaction is discounted in exchange for the additional personal information. In one embodiment, persona negotiation agent 2706 may, on behalf of a vendor that places a high value on knowing the personal information of its customers, offer a discount to party 2701 in exchange for more personal information than was initially provided during the transaction. For example, if a party 2701 fills out an online form for purchase of a book on amazon.com, persona negotiation agent 2706, may offer a discount on the price of the book in exchange for, e.g., information about the location of party 2701, demographics of party 2701, or social network participation information about party 2701.

Operation 3106 depicts negotiating receipt of a different persona including reduced personal information from the party to the transaction at least partly based on an evaluation of the transaction, wherein the cost of the transaction is increased in exchange for the reduced personal information. For example, persona negotiation agent 2706 may negotiate receipt of a different persona including reduced personal information from the party to the transaction at least partly based on an evaluation of the transaction, wherein the cost of the transaction is increased in exchange for the reduced personal information. In one embodiment, persona negotiation agent 2706 may offer to party 2701 to complete a transaction with a lesser amount of personal information if the party 2701 pays a higher price. For example, if a party to an online credit card transaction prefers not to provide telephone number information to the vendor, the party may agree to a slightly higher price for the transaction. In this example, the vendor is compensated for slightly higher risk of non-payment by a higher transaction return.

FIG. 32 illustrates alternative embodiments of the example operational flow 2800 of FIG. 28. FIG. 32 illustrates example embodiments where the negotiating operation 2830 may include at least one additional operation. Additional operations may include operation 3200, 3202, and/or operation 3204.

Operation 3200 depicts negotiating receipt of at least one different persona from the party to the transaction at least partly based on an evaluation of the transaction, wherein the negotiating is concluded on the basis of at least one future condition. For example, persona negotiation agent 2706 may negotiate receipt of at least one different persona from the party to the transaction at least partly based on an evaluation of the transaction, wherein the negotiating is concluded on the basis of at least one future condition. In one embodiment, persona negotiation agent 2706, having evaluated a transaction 2702 as one of relatively low monetary value, may permit a party 2701 to provide a minimal persona in exchange for a promise to pay using a preferred payment method within a certain period of time, for example using an Entropay prepaid virtual Visa card within one week. Such conditional virtual payments may be particularly useful for small online purchases such as apps, MP3's, and movie files.

Operation 3202 depicts negotiating receipt of at least one different persona from the party to the transaction at least partly based on an evaluation of the transaction, wherein the negotiating is concluded on the basis of at least one future condition, and wherein the at least one future condition includes a promise to pay the cost of the transaction within a defined time period after an object of the transaction is delivered to the party to the transaction. For example, persona negotiation agent 2706 may negotiate receipt of at least one different persona from the party to the transaction at least partly based on an evaluation of the transaction, wherein the negotiating is concluded on the basis of at least one future condition, and wherein the at least one future condition includes a promise to pay the cost of the transaction within a defined time period after an object of the transaction is delivered to the party to the transaction. In one embodiment, a persona negotiation agent 2706 employed by amazon.com may negotiate receipt of a specific persona in the context of a transaction to ship an item to a physical address, in exchange for an agreement by party 2701 to pay using an amazon.com credit card within 30 days of delivery of the item to party 2701.

Operation 3202 depicts negotiating receipt of at least one different persona from the party to the transaction at least partly based on an evaluation of the transaction, wherein the negotiation is concluded with an electronic signature from the party to the transaction. For example, persona negotiation agent 2706 may negotiate receipt of at least one different persona from the party to the transaction at least partly based on an evaluation of the transaction, wherein the negotiation is concluded with an electronic or digital signature from the party to the transaction. To continue the example above, persona negotiation agent 2706 employed by amazon.com may conclude its negotiation for a commitment to pay using an amazon.com credit card within 30 days of delivery of the item to party 2701 by requiring a digital signature from party 2701.

FIG. 33 illustrates a partial view of an example article of manufacture 3300 that includes a computer program 3304 for executing a computer process on a computing device. An embodiment of the example article of manufacture 3300 is provided including a signal bearing medium 3302, and may include one or more instructions for accepting at least one persona from a party to a transaction; one or more instructions for evaluating the transaction; and one or more instructions for negotiating receipt of at least one different persona from the party to the transaction at least partly based on an evaluation of the transaction. The one or more instructions may be, for example, computer executable and/or logic-implemented instructions. In one implementation, the signal-bearing medium 3302 may include a computer-readable medium 3306. In one implementation, the signal bearing medium 3302 may include a recordable medium 3308. In one implementation, the signal bearing medium 3302 may include a communications medium 3310.

FIG. 34 illustrates an example system 3400 in which embodiments may be implemented. The system 3400 includes a computing system environment. The system 3400 also illustrates a user 3412 using a device 3414, which is optionally shown as being in communication with a computing device 3402 by way of an optional coupling 3406. The optional coupling 3406 may represent a local, wide-area, or peer-to-peer network, or may represent a bus that is internal to a computing device (e.g., in example embodiments in which the computing device 3402 is contained in whole or in part within the device 3404). A storage medium 3408 may be any computer storage media. In one embodiment, the computing device 3402 may include a virtual machine operating within another computing device. In an alternative embodiment, the computing device 3402 may include a virtual machine operating within a program running on a remote server.

The computing device 3402 includes computer-executable instructions 3410 that when executed on the computing device 3402 cause the computing device 3402 to (a) accept at least one persona from a party to a transaction; (b) evaluate the transaction; and (c) negotiate receipt of at least one different persona from the party to the transaction at least partly based on an evaluation of the transaction. As referenced above and as shown in FIG. 34, in some examples, the computing device 3402 may optionally be contained in whole or in part within the device 3404.

In FIG. 34, then, the system 3400 includes at least one computing device (e.g., 3402 and/or 3404). The computer-executable instructions 3410 may be executed on one or more of the at least one computing device. For example, the computing device 3402 may implement the computer-executable instructions 3410 and output a result to (and/or receive data from) the computing device 3404. Since the computing device 3402 may be wholly or partially contained within the computing device 3404, the device 3404 also may be said to execute some or all of the computer-executable instructions 3410, in order to be caused to perform or implement, for example, various ones of the techniques described herein, or other techniques.

The device 3404 may include, for example, a portable computing device, workstation, or desktop computing device. In another example embodiment, the computing device 3402 is operable to communicate with the device 3404 associated with the user 3412 to receive information about the input from the user 3412 for performing data access and data processing, and negotiate receipt of a different persona from the party to the transaction, e.g., user 3412.

Negotiation of Personas Between Parties to a Transaction—User Side

FIG. 35 illustrates an example system 3500 in which embodiments may be implemented. The system 3500 includes a persona negotiation agent 3506. The persona negotiation agent 3506 may contain, for example, transaction evaluation module 3508, which may in turn contain transaction value analysis module 3510. Persona negotiation agent 3506 may also include, for example, personal information request acceptor module 3512, which in turn may include web page parser module 3514, which in turn may include X/Y coordinate web page reader 3516, web page image reader 3518, and/or screen scraper module 3519. Persona negotiation agent 3506 also may contain, for example, cost adjustment module 3528, condition-setting module 3530, party history evaluation module 3524, and/or persona creation module 3520. Persona negotiation agent 3506 may communicate over a network or directly with party 3501 to accept at least one request for personal information in the context of transaction 3502, to evaluate transaction 3502, and to negotiate presentation of at least one persona to the party to the transaction at least partly based on an evaluation of the transaction.

In FIG. 35, persona negotiation agent 3506 may accept a request for personal information 3503 directly from party 3501 or indirectly by inspection of transaction 3502, for example by viewing the party's personal information fields on a web page related to the transaction.

In FIG. 35, the persona negotiation agent 3506 is illustrated as possibly being included within a system 3500. Of course, virtually any kind of computing device may be used to implement the special purpose persona negotiation agent 3506, such as, for example, a workstation, a desktop computer, a networked computer, a server, a collection of servers and/or databases, a virtual machine running inside a computing device, a mobile computing device, or a tablet PC.

Additionally, not all of the persona negotiation agent 3506 need be implemented on a single computing device. For example, the persona negotiation agent 3506 may be implemented and/or operable on a remote computer, while a user interface and/or local instance of the persona negotiation agent 3506 are implemented and/or occur on a local computer. Further, aspects of the persona negotiation agent 3506 may be implemented in different combinations and implementations than that shown in FIG. 35. For example, functionality of a user interface may be incorporated into the persona negotiation agent 3506 for the benefit of a user/purchaser or for personnel supervising transactions for an online vendor. The persona negotiation agent 3506 may perform simple data relay functions and/or complex data analysis, including, for example, fuzzy logic and/or traditional logic steps. Further, many methods of negotiating personas described herein or known in the art may be used, including, for example, algorithms commonly used in web page analysis may be used to determine a transaction scale as a basis for negotiating an appropriate persona containing an appropriate level of personal information for a transaction. In some embodiments, the persona negotiation agent 3506 may negotiate a persona based on information about a transaction available as updates through a network.

Persona negotiation agent 3506 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

As referenced herein, the persona negotiation agent 3506 may be used to perform various data querying and/or recall techniques with respect to the request 3503, persona 3504, and/or the transaction 3502, in order to negotiate an appropriate persona. For example, where transaction 3502 elements are organized, keyed to, and/or otherwise accessible using one or more web page analysis tools, or the like, persona negotiation agent 3506 may employ various Boolean, statistical, and/or semi-boolean searching techniques to determine the appropriate level of information to include in a persona for it to be acceptable as an underpinning for a transaction. Similarly, for example, where user personal information is organized, keyed to, and/or otherwise accessible using one or more persona negotiation rulesets, various Boolean, statistical, and/or semi-boolean searching techniques may be performed by persona negotiation agent 3506 to negotiate an appropriate persona.

Many examples of databases and database structures may be used in connection with the persona negotiation agent 3506. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive negotiation of persona content and/or for gathering and/or compiling data from the relational database(s).

For example, SQL or SQL-like operations over one or more personas 3504 and/or properties of transaction 3502 may be performed, or Boolean operations using personas 3504 and/or properties of transaction 3502 may be performed. For example, weighted Boolean operations may be performed in which different weights or priorities are assigned to one or more of the request 3503, persona 3504, and/or properties of transaction 3502, including various transaction identifier elements, locations, and/or contexts, perhaps relative to one another. For example, a number-weighted, exclusive-OR operation may be performed to request specific weightings of elements found on a check-out page of an e-commerce web page (e.g., email address, telephone number, mailing address, credit card information, dollar amount in cart, web site name, payment type).

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 36 illustrates an operational flow 3600 representing example operations related to regulating information flow during interactions. In FIG. 36 and in following figures that include various examples of operational flows, discussion and explanation may be provided with respect to the above-described system environments of FIG. 35, and/or with respect to other examples and contexts. However, it should be understood that the operational flows may be executed in a number of other environments and contexts including that of FIG. 42, and/or in modified versions of FIG. 35. Also, although the various operational flows are presented in the sequence(s) illustrated, it should be understood that the various operations may be performed in other orders than those which are illustrated, or may be performed concurrently.

After a start operation, operation 3610 depicts accepting at least one request for personal information from a party to a transaction. For example, persona negotiation agent 3506, personal information request acceptor module 3512, and/or web page parser module 3514 may accept at least one request for personal information from a party to a transaction. In one embodiment, personal information request acceptor module 3512 may accept a request for name, phone number, email address, and credit card information during a transaction to purchase an app in an app store. The request 3503 may be in the form of an online transaction form having empty fields labeled for entry of personal information. In another example, web page parser module 3514 may accept markup language code (e.g., HTML or XML) or text corresponding to a transaction web page as the request for personal information 3503.

Operation 3620 depicts evaluating the transaction. For example, persona negotiation agent 3506, transaction evaluation module 3508, web page parser module 3514, and/or transaction value analysis module 3510 may evaluate the transaction. In one embodiment, transaction value analysis module 3510 may analyze markup language code from a checkout webpage corresponding to transaction 3502. In this example, the code may indicate a dollar value of an item to be purchased or to be bid on in an auction. Based on that dollar value, the persona negotiation agent 3520 may present a specific counteroffer to party 3501, e.g., asking to complete the transaction based on a persona containing less personal information that is requested by party 3501. In some embodiments, persona transaction evaluation module 3508 may accept a identify transactions having an arbitrarily-defined low or high dollar value. For financial interactions such as purchases or auctions, transaction value analysis module 3510 may detect a dollar value and assign a dollar value category for the interaction, for example low dollar value, intermediate dollar value, or high dollar value. Rule-sets for the persona negotiation agent 3506 to follow may be set by a user/purchaser negotiating with party 3501 according to any premium that the user places on completing the transaction and/or retaining personal information.

Alternatively, many intermediate levels of interaction value may be assigned based on a detected value present in the web page code or other attribute of the transaction 3502. In these embodiments, a minimal persona containing only a few elements of personal information may be presented to party 3501 initially as the persona 3504 that supports the transaction 3502. After the negotiation is initiated, subsequent presentations of personas to party 3501 containing progressively more personal information may be presented with the goal that an acceptable persona may be presented by persona negotiation agent 3506 to party 3501 which provides only that amount of personal information needed for completion of the interaction/transaction. This approach attempts to avoid gratuitous dissemination of potentially valuable personal information. For example, for low dollar value transactions, transaction evaluation module 3508 may be programmed to initially present in a negotiation a minimal persona containing, e.g., only a name and a device identifier, such as a telephone number. For some parties/vendors 3501, such a minimal persona will provide enough trust in the credit-worthiness of the user, perhaps via a check with a telecommunications carrier that the name matches the telephone number. In other, higher dollar value transactions, presentation of a persona containing more detailed personal information may be necessary. For example, for a car purchase, a persona including credit information, credit history, and personal financial asset data may be required by party 3501.

In some embodiments, party 3501 will provide request 3503 to persona negotiation agent 3506. Personal information may be obtainable as a matter of course by persona negotiation agent 3506. For example, personal information of a user/purchaser may be directly provided to persona negotiation agent 3506 for the purpose of facilitating completion of transaction 3502, or alternatively, persona negotiation agent 3506 may indirectly access personal information of a user through access to various accounts, such as website accounts, bank accounts, social network accounts, or telecommunications accounts. In some embodiments, some of the personal information may be publicly available.

Operation 3630 depicts negotiating presentation of at least one persona to the party to the transaction at least partly based on an evaluation of the transaction. For example, persona negotiation agent 3506 may negotiate presentation of at least one persona to the party to the transaction at least partly based on an evaluation of the transaction. For example, persona negotiation agent 3506 may accept a request for personal information from amazon.com in the course of an online purchase. Persona negotiation agent 3506 may then evaluate the transaction 3502 based on dollar amount, party 2701, or personal information requested, and initiate a negotiation to present a persona containing an alternate set of personal information, e.g., where the transaction has a low dollar value only a few of the requested items of personal information may actually be necessary for party/vendor 3501 to go through with the transaction 3502. This may be done according to a persona negotiation ruleset pre-programmed into persona negotiation agent 3506. Persona negotiation agent 3506 may then accept or reject a counteroffer from party 3501, perhaps by examining actions taken/messages left by party 3501 on the transaction webpage, or by direct message from party 3501 to a user/purchaser 4212.

In some embodiments, persona negotiation agent 3506 may include a party history evaluation module 3524 to further characterize party 3501 according to, for example historical acceptance or rejection of personas in similar circumstances as those in 3502.

In some embodiments, both for detecting the specifics of a transaction and for placing data into fields on a web page, it may be useful for persona negotiation agent 3506 to perform web scraping or web page image analysis on the web page.

Web scraping is a computer software technique of extracting information from websites. Usually, such software programs simulate human exploration of the World Wide Web by either implementing low-level Hypertext Transfer Protocol (HTTP), or embedding certain full-fledged Web browsers, such as Internet Explorer or Mozilla Firefox. Web scraping may involve the transformation of unstructured data on the Web, typically in HTML format, into structured data that can be stored and analyzed in a central local database or spreadsheet. Specific techniques for web scraping include text grepping and regular expression matching, which extracts information from Web pages based on the UNIX grep command or regular expression matching facilities of programming languages (for instance Perl or Python).

Another web scraping tool is HTTP programming wherein static and dynamic web pages can be retrieved by posting HTTP requests to a remote web server using socket programming.

Another web scraping tool is DOM (document object model) parsing: By embedding a full-fledged web browser, such as Internet Explorer or Mozilla web browser, programs can retrieve dynamic content generated by client-side scripts. These web browser controls may also parse web pages into a DOM tree, based on which programs can retrieve parts of the web pages.

Another web scraping tool is HTML parsing, wherein semi-structured data query languages, such as XQuery and HTQL can be used to parse HTML pages and to retrieve and transform web content.

There are many web-scraping software tools available that can be used to customize web-scraping solutions. These programs may attempt to automatically recognize the data structure of a page or provide a web recording interface that removes the necessity to manually write web-scraping code, or some scripting functions that can be used to extract and transform web content, and database interfaces that can store the scraped data in local databases.

Another web scraping tool is a vertical aggregation platform. These platforms create and monitor a multitude of "bots" for specific verticals with no man-in-the-loop, and no work related to a specific target site. The preparation involves establishing a knowledge base for the entire vertical, and then the platform creates the bots automatically. The platform's robustness is measured by the quality of the information it retrieves (usually number of fields) and its scalability (how quick it can scale up to hundreds or thousands of sites). This scalability is mostly used to target sites that common aggregators find complicated or too labor intensive to harvest content from.

Another web scraping tool is semantic annotation recognizing, wherein web pages may contain metadata or semantic markups/annotations which can be made use of to locate specific data. If the annotations are embedded in the pages, as Microformat does, this technique can be viewed as a special case of DOM parsing. In another case, the annotations, organized into a semantic layer, may be stored and managed separately from the web pages, so the web scrapers can retrieve data schema and instructions from this layer before scraping the pages.

Another tool for web page analysis is iMacros, a program that harvests web data automatically, which can do automatic form-filling. For example, iMacros works with every website; even the most complicated websites that use dialog boxes, frames, Javascript and AJAX can be automated. It has high data extraction speed: on a typical computer, 20-50 instances of iMacros can be run at once ("multi-threading"). It has full web-crawling support. iMacros can be scheduled to run in the background of other programs or in lean traffic hours. iMacros permits change of IP addresses programmatically with full PROXY support. After harvesting the web data, actions may be performed on it, it can be transferred to any application, or it can be used in another process. iMacros integrates with every Windows scripting or programming language. iMacros can connect to any database or software application. iMacros provides visual recording of all web activities and the extraction macros. iMacros has full unicode support, and iMacros can extract text in all languages, including Asian languages such as Chinese, Japanese and Korean.

In addition to working with the website source code like a "normal" software program, iMacros can also look at the website like a human does: iMacros' image recognition support allows a user to automate and test websites using images instead of X/Y coordinates: a user can tell iMacros what a button looks like and iMacros can find it on the page.

Even when the button has moved or if it has changed color or screen resolution. The iMacros Image Recognition Wizard functions with web sites that use non-HTML technologies such as Flash applets, Java applets, Movie Player Applets, ActiveX controls or any other technology. Since the software relies only on the images that are rendered in the browser, it works independently of the underlying technology.

FIG. 37 illustrates alternative embodiments of the example operational flow 3600 of FIG. 36. FIG. 37 illustrates example embodiments where the accepting operation 3610 may include at least one additional operation. Additional operations may include operation 3700, 3702, and/or operation 3704.

Operation 3700 depicts accepting a plurality of fields on a web page as the at least one request for personal information. For example, persona negotiation agent 3506 and/or personal information request acceptor module 3512 may accept a plurality of fields on a web page as the at least one request for personal information. In one embodiment, personal information request acceptor module 3512 may accept from party 3501 a checkout web page having fields for name, telephone number, email address, and credit card information for the purchase of an MP3 file from the iTunes store. As another example, persona negotiation agent 3506 may accept a request for personal information on an a Groupon web page relating to a potential purchase.

Operation 3702 depicts accepting at least one request for personal information from a vendor in an online transaction. For example, persona negotiation agent 3506 and/or personal information request acceptor module 3512 may accept at least one request for personal information from a vendor in an online transaction. For example, personal information request acceptor module 3512 may accept a request from eBay to provide more information where a user left a required field blank on an eBay auction page. Access to the auction may be then be negotiated, in part, based on any past history of the user with party 3501/eBay. In some embodiments, party 3501 may send a message to persona negotiation agent 3506, in effect telling it that it would like to negotiate a persona for a transaction, the message including a URL or other venue for the transaction, from which persona negotiation agent 3506 can extract the information necessary to evaluate the transaction and negotiate an appropriate persona. Such a message may be sent by voice, text, touch, or other user interface mechanism. In some instances the persona negotiation agent 3506 will be invisible or transparent to party 2701, except for the offer/counteroffer of the negotiation.

Operation 3704 depicts accepting a request for personal information consisting of name, email address, birthdate, and credit card information from a vendor in an online transaction. For example, persona negotiation agent 3506 and/or personal information request acceptor module 3512 may accept a request for personal information consisting of name, email address, birthdate, and credit card information from a vendor in an online transaction. In one embodiment, persona negotiation agent 3506 and/or personal information request acceptor module 3512 may accept a request for a name, email address, birthdate, and credit card information at an e-commerce transaction page. The request 3503 may be in the form of information in fields on a web page as well as direct communication such as messaging on a transaction web page, email, and/or text messaging.

FIG. 38 illustrates alternative embodiments of the example operational flow 3600 of FIG. 36. FIG. 38 illustrates example embodiments where the evaluating operation 3620 may include at least one additional operation. Additional operations may include operation 3800, 3802, and/or operation 3804.

Operation 3800 depicts evaluating a monetary value for the transaction. For example, persona negotiation agent 3506, transaction evaluation module 3508, and/or, transaction value analysis module 3510 may evaluate a monetary value for the transaction. In one embodiment, transaction value analysis module 3510 may analyze a URL provided by a party 3501 corresponding to an app store order page. Transaction value analysis module 3510 may read the text or code on the web page, image the page, or otherwise determine the object of the transaction and the monetary value of the object (i.e., a good or service). In another example, web page parser module 3514 may accept a URL for an online pizza order form, such as an order page for Domino's pizza, and parse the markup language code or text to identify a dollar value for the pizza order (on the Domino's order page the dollar amount appears next to "Total:" and has a dollar sign with the amount).

Operation 3802 depicts evaluating the party to the transaction. For example, persona negotiation agent 3506, transaction evaluation module 3508, and/or party history evaluation module 3524 may evaluate the party to the transaction. In one embodiment, transaction evaluation module 3508 may evaluate any available data regarding the name of the party 3501 and any information about whether party 3501 is amenable to negotiating the terms of the personal information that it requests in connection with transactions, including past practices of party 3501.

Operation 3804 depicts evaluating transaction history about the party to the transaction. For example, persona negotiation agent 3506, transaction evaluation module 3508, and/or party history evaluation module 3524 may evaluate transaction history about the party to the transaction. In one embodiment, party history evaluation module 2724 may evaluate a party's history of interaction with user/purchasers, if there is any. If there is a history of purchases and payments, particularly with user 4212, that may be one factor taken into account by persona negotiation agent 3506 in arriving at a persona to support transaction 3502: a history of negotiating personas by a party may increase the chances that a negotiation will occur and that it will be successful to both parties to the transaction.

FIG. 39 illustrates alternative embodiments of the example operational flow 3600 of FIG. 36. FIG. 39 illustrates example embodiments where the negotiating operation 3630 may include at least one additional operation. Additional operations may include operation 3900, 3902, 3904, and/or operation 3906.

Operation 3900 depicts negotiating presentation of at least one persona including an indication of creditworthiness to the party to the transaction at least partly based on an evaluation of the transaction. For example, persona negotiation agent 3506, transaction evaluation module 3508, persona creation module 3520, and/or party history evaluation module 3524 may negotiate presentation of a persona including an indication of creditworthiness to the party to the transaction at least partly based on an evaluation of the transaction. In one embodiment, persona creation module 3520 may present to party 3501 valid credit card information transaction 3502, having first evaluated the transaction and deemed it to be one that legitimately required presentation of a persona that includes credit card information.

As discussed above, high dollar value transactions will require that detailed personal information be provided as security for the transaction, but a large range of intermediate dollar value transactions may benefit from a smart system of providing as little personal information possible during the transaction. This will benefit both a user/purchaser in terms of minimizing transfer of personal information, and also the party 3501/vendor, who will save potentially save time and administrative costs if transactions are streamlined according to the instant disclosure.

In one embodiment of how the persona negotiation agent 3506 may operate, it may begin by generating an offer that consists of the issues that is most important for the agent, e.g., a persona containing a minimum of personal information. It does this because it wants to tell to the party, at the outset, which issues are the most important for the agent. After sending the offer, the agent will subsequently receive a message from the party 3510. The party 3510 could accept the offer, refuse the offer, or propose a counteroffer. Both acceptance and refusal will result in ending the negotiations, but if the message is a counteroffer, then the agent will form a new offer to the party.

In one embodiment, the agent doesn't know any information regarding the party's preferences, and so it has to create a model of party 3510 utility values in order to make an offer that is acceptable to the party 3510, while still maintaining the agent's acceptance value. An acceptance value is the value of an offer that it can accept. This value will decrease in time, since there is a limited time in negotiation. But the acceptance value will never be less than the agent's reservation value, an absolute requirement. The reservation value is the lowest utility value where the agent may still accept a counteroffer from the party 3510, but it will accept it only if there is an impasse in the negotiation. For more information about automated negotiation agents, see U.S. Patent Application Publication 2011 0238840, Method, System, and Device for Service Negotiation; incorporated herein by reference. See also U.S. Patent Application Publication 2002 0120588, Method and Apparatus for Negotiation; also incorporated herein by reference.

Operation 3902 depicts negotiating presentation of at least one persona including less personal information than initially requested to the party to the transaction at least partly based on an evaluation of the transaction that includes a transaction value under one hundred dollars. For example, persona negotiation agent 3506 may negotiate presentation of at least one persona including less personal information than initially requested to the party to the transaction at least partly based on an evaluation of the transaction that includes a transaction value under one hundred dollars. In one embodiment, persona negotiation agent 3506 may, for a low dollar value transaction, e.g., one hundred dollars or less, negotiate presentation of a persona that includes less personal information than initially requested by party 3501, perhaps only providing a persona having a name, address, and credit card information. This may provide a party 3501/vendor with enough security with which to complete the transaction.

Operation 3904 depicts negotiating presentation of at least one persona including more personal information than initially requested to the party to the transaction at least partly based on an evaluation of the transaction, wherein the cost of the transaction is discounted in exchange for the more personal information than initially requested. For example, persona negotiation agent 3506 may negotiate presentation of at least one persona including more personal information than initially requested to the party to the transaction at least partly based on an evaluation of the transaction, wherein the cost of the transaction is discounted in exchange for the more personal information than initially requested. In one embodiment, persona negotiation agent 3506 may, on behalf of a user that places a low value on restricting the flow of his personal information online, offer more personal information than was initially requested during the transaction in exchange for a discount. For example, if a party 3501 requests personal information on an online form for purchase of a book on amazon.com, persona negotiation agent 3506 may offer, e.g., information about the location of the user 4212, the demographics of user 4212, or social network participation information about party 4212 in exchange for a discount on the price of the book.

Operation 3906 depicts negotiating presentation of at least one persona including reduced personal information than initially requested to the party to the transaction at least partly based on an evaluation of the transaction, wherein the cost of the transaction is increased in exchange for the reduced personal information. For example, persona negotiation agent 3506 may negotiate presentation of at least one persona including reduced personal information than initially requested to the party to the transaction at least partly based on an evaluation of the transaction, wherein the cost of the transaction is increased in exchange for the reduced personal information. In one embodiment, persona negotiation agent 3506 may offer to party 3501 to complete a transaction with a lesser amount of personal information if the user 4212 pays a higher price for the object of the transaction. For example, if a user/purchaser in an online credit card transaction prefers not to provide telephone number information to the party 3501/vendor, the party may agree to a slightly higher price for the transaction in exchange. In this example, the party/vendor is compensated for slightly higher risk of non-payment by a higher transaction return.

FIG. 40 illustrates alternative embodiments of the example operational flow 3600 of FIG. 36. FIG. 40 illustrates example embodiments where the negotiating operation 3630 may include at least one additional operation. Additional operations may include operation 4000 and/or operation 4002.

Operation 4000 depicts negotiating presentation of at least one persona to the party to the transaction at least partly based on an evaluation of the transaction, wherein the negotiating is concluded on the basis of at least one future condition. For example, persona negotiation agent 3506 may negotiate presentation of at least one persona to the party to the transaction at least partly based on an evaluation of the transaction, wherein the negotiating is concluded on the basis of at least one future condition. In one embodiment, persona negotiation agent 3506, having evaluated a transaction 3502 as one of relatively low monetary value, may present to party 3501 a minimal persona and a promise to pay for the transaction using a preferred payment method within a certain period of time, for example using an Entropay prepaid virtual Visa card within one week. Such conditional virtual payments may be particularly useful for small online purchases such as apps, MP3's, and movie files.

Operation 4002 depicts negotiating presentation of at least one persona to the party to the transaction at least partly based on an evaluation of the transaction, wherein the negotiating is concluded on the basis of at least one future condition, and wherein the at least one future condition includes a promise to pay the cost of the transaction to the party to the transaction within a defined time period after an object of the transaction is delivered by the party to the transaction. For example, persona negotiation agent 3506 may negotiate presentation of at least one persona to the party to the transaction at least partly based on an evaluation of the transaction, wherein the negotiating is concluded on the basis of at least one future condition, and wherein the at least one future condition includes a promise to pay the cost of the transaction to the party to the transaction within a defined time period after an object of the transaction is delivered by the party to the transaction. In one embodiment, a persona negotiation agent 3506 may negotiate with amazon.com for presentation of a specific persona in the context of a transaction to ship an item to a physical address, in exchange for an agreement by the user/purchaser to pay using an amazon.com credit card within 30 days of delivery of the item to the user/purchaser.

FIG. 41 illustrates a partial view of an example article of manufacture 4100 that includes a computer program 4104 for executing a computer process on a computing device. An embodiment of the example article of manufacture 4100 is provided including a signal bearing medium 4102, and may include one or more instructions for accepting at least one request for personal information from a party to a transaction; one or more instructions for evaluating the transaction; and one or more instructions for negotiating presentation of at least one persona to the party to the transaction at least partly based on an evaluation of the transaction. The one or more instructions may be, for example, computer executable and/or logic-implemented instructions. In one implementation, the signal-bearing medium 4102 may include a computer-readable medium 4106. In one implementation, the signal bearing medium 4102 may include a recordable medium 4108. In one implementation, the signal bearing medium 4102 may include a communications medium 4110.

FIG. 42 illustrates an example system 4200 in which embodiments may be implemented. The system 4200 includes a computing system environment. The system 4200 also illustrates a user 4212 using a device 4214, which is optionally shown as being in communication with a computing device 4202 by way of an optional coupling 4206. The optional coupling 4206 may represent a local, wide-area, or peer-to-peer network, or may represent a bus that is internal to a computing device (e.g., in example embodiments in which the computing device 4202 is contained in whole or in part within the device 4204). A storage medium 4208 may be any computer storage media. In one embodiment, the computing device 4202 may include a virtual machine operating within another computing device. In an alternative embodiment, the computing device 4202 may include a virtual machine operating within a program running on a remote server.

The computing device 4202 includes computer-executable instructions 4210 that when executed on the computing device 4202 cause the computing device 4202 to (a) accept at least one request for personal information from a party to a transaction; (b) evaluate the transaction; and (c) negotiate presentation of at least one persona to the party to the transaction at least partly based on an evaluation of the transaction. As referenced above and as shown in FIG. 42, in some examples, the computing device 4202 may optionally be contained in whole or in part within the device 4204.

In FIG. 42, then, the system 4200 includes at least one computing device (e.g., 4202 and/or 4204). The computer-executable instructions 4210 may be executed on one or more of the at least one computing device. For example, the computing device 4202 may implement the computer-executable instructions 4210 and output a result to (and/or receive data from) the computing device 4204. Since the computing device 4202 may be wholly or partially contained within the computing device 4204, the device 4204 also may be said to execute some or all of the computer-executable instructions 4210, in order to be caused to perform or implement, for example, various ones of the techniques described herein, or other techniques.

The device 4204 may include, for example, a portable computing device, workstation, or desktop computing device. In another example embodiment, the computing device 4202 is operable to communicate with the device 4204 associated with the user 4212 to receive information about the input from the user 4212 for performing data access and data processing, and negotiate presentation of a persona to the party/vendor to the transaction.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Century Link, Southwestern Bell, etc.), or (g) a wired/wireless services entity (e.g., Sprint, Verizon, AT&T, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
    circuitry configured for accepting at least one request for personal information from a party to a transaction involving a sale of one or more goods;
    circuitry configured for evaluating the transaction to identify a monetary cost corresponding to the sale of the one or more goods;
    circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information; and
    circuitry configured for presenting the at least one persona including the reduced personal information negotiated by the circuitry configured for negotiating for use in the transaction.

2. The system of claim 1, wherein circuitry configured for evaluating the transaction to identify a monetary cost corresponding to the sale of the one or more goods comprises:
    circuitry configured for parsing at least one web page associated with the transaction to identify a token commanding a web browser to control a display of a dollar value; and
    circuitry configured for analyzing the identified token to detect the monetary cost corresponding to the sale of the one or more goods.

3. The system of claim 1, wherein circuitry configured for accepting at least one request for personal information from a party to a transaction involving a sale of one or more goods comprises:
    circuitry configured for accepting at least one request for personal information from a vendor in an online transaction involving the sale by the vendor of the one or more goods, including at least accepting at least one request for at least one of name, physical address, email address, phone number, or credit card information as the personal information.

4. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:
    circuitry configured for negotiating presentation of the at least one persona including the reduced personal information than was initially requested by the party to the transaction at least partly based on the monetary cost corresponding to the sale of the one or more goods identified by the circuitry configured for evaluating the transaction, wherein the monetary surcharge is determined via reference to a persona negotiation ruleset during the negotiating, the persona negotiation ruleset including at least one rule specifying at least one monetary threshold above which either an entirety of the personal information requested by the party to the transaction is provided or that the monetary cost of the transaction is increased in exchange for the reduced personal information, the persona negotiation ruleset further including at least one rule specifying that below the at least one monetary threshold the transaction may proceed with the reduced personal information without the monetary surcharge.

5. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:
    circuitry configured for negotiating presentation of the at least one persona including the reduced personal information than was initially requested by the party to the transaction at least partly based on correlating the monetary cost corresponding to the sale of the one or more goods identified by the circuitry configured for evaluating the transaction with a persona negotiation ruleset, the persona negotiation ruleset including at least three monetary cost thresholds mapping one or more monetary cost bounds to one or more amounts of personal information for inclusion in the persona.

6. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:

circuitry configured for negotiating presentation of at least one persona including at least one indication of creditworthiness to the party to the transaction at least partly based on the monetary cost corresponding to the sale of the one or more goods identified by the circuitry configured for evaluating the transaction, the at least one indication of creditworthiness including at least one history of one or more payments by the initiator of the transaction to the party to the transaction, wherein a length of the at least one history is mapped to further decreases in an amount of personal information required.

7. The system of claim 1, wherein circuitry configured for evaluating the transaction to identify a monetary cost corresponding to the sale of the one or more goods comprises:

circuitry configured parsing at least one web page associated with the transaction to identify a token commanding a web browser to control a display of a currency symbol;

circuitry configured for analyzing the identified token to detect a monetary value in proximity to the currency symbol; and circuitry configured for inferring that the monetary value in proximity to the currency symbol is the monetary cost corresponding to the sale of the one or more goods.

8. The system of claim 1, wherein circuitry configured for presenting the at least one persona including the reduced personal information negotiated by the circuitry configured for negotiating for use in the transaction comprises:

circuitry configured for determining at least one identity of at least one vendor acting as the party to the transaction at least partly based on analyzing at least some markup language code representing the at least one web page associated with the transaction to identify the at least one vendor;

circuitry configured for querying at least one vendor-specific persona database using the at least one identity of at least one vendor as a search term to obtain at least some information as to where on a checkout page received from the party to the transaction one or more elements of the at least one persona including the reduced personal information should go; and circuitry configured for placing one or more elements of the at least one persona including the reduced personal information into one or more fields of the at least one web page associated with the transaction at least partly based on the circuitry configured for querying at least one vendor-specific persona database using the at least one identity of at least one vendor as a search term.

9. The system of claim 8, wherein circuitry configured for querying at least one vendor-specific persona database using the at least one identity of at least one vendor as a search term to obtain at least some information as to where on a checkout page received from the party to the transaction one or more elements of the at least one persona including the reduced personal information should go comprises:

circuitry configured for obtaining at least some checkout page markup language code known to be used by the at least one vendor from the at least one vendor-specific persona database; and circuitry configured for correlating one or more fields indicated by the at least some checkout page markup language code known to be used by the at least one vendor with the one or more elements of the at least one persona including the reduced personal information for subsequent placement of the one or more elements of the at least one persona including the reduced personal information into one or more corresponding fields of the at least one web page associated with the transaction.

10. The system of claim 9, wherein circuitry configured for correlating one or more fields indicated by the at least some checkout page markup language code known to be used by the at least one vendor with the one or more elements of the at least one persona including the reduced personal information for subsequent placement of the one or more elements of the at least one persona including the reduced personal information into one or more corresponding fields of the at least one web page associated with the transaction comprises:

circuitry configured for determining one or more XY coordinates corresponding to one or more locations on the at least one web page associated with the transaction for the one or more fields indicated by the at least some checkout page markup language code known to be used by the at least one vendor, including at least retrieving the one or more XY coordinates pertaining to the at least one vendor via searching the at least one vendor-specific persona database using the at least one identity of at least one vendor as a search term; and circuitry configured for assigning the one or more elements of the at least one persona including the reduced personal information to the one or more XY coordinates that have been retrieved from the at least one vendor-specific persona database and corresponding to one or more locations on the at least one web page associated with the transaction for subsequent placement of the one or more elements of the at least one persona including the reduced personal information into the at least one web page associated with the transaction at the one or more XY coordinates.

11. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:

circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge payable to the party to the transaction is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information.

12. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:
   circuitry configured for negotiating presentation of at least one persona including reduced personal information than was initially requested by a seller that is the party to the transaction at least partly based on the monetary cost corresponding to the sale of the one or more goods identified by the circuitry configured for evaluating the transaction, wherein a monetary surcharge payable to the seller is added to the monetary cost corresponding to the sale of the one or more goods in exchange for a buyer who is the initiator of the transaction not providing at least one element of the buyer's personal information to the party to the transaction while the seller agrees to let the sale of the one or more goods proceed without the at least one element of the buyer's personal information.

13. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:
   circuitry configured for negotiating presentation of at least one persona including no personal information relating to an initiator of the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for the initiator not providing any personal information while the party to the transaction agrees to let the transaction proceed without any personal information relating to the initiator.

14. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:
   circuitry configured for negotiating the presentation of the at least one persona including the reduced personal information, wherein the negotiation is concluded on the basis of at least one future condition.

15. The system of claim 14, wherein circuitry configured for negotiating the presentation of the at least one persona including the reduced personal information, wherein the negotiation is concluded on the basis of at least one future condition comprises:
   circuitry configured for negotiating the presentation of the at least one persona including the reduced personal information, wherein the negotiation is concluded on the basis of at least one future condition including at least a promise to pay the monetary surcharge within a defined time period after the one or more goods are delivered to the initiator of the transaction.

16. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:
   circuitry configured for negotiating the presentation of the at least one persona including the reduced personal information, wherein the negotiation is concluded with an electronic signature from the party to the transaction.

17. The system of claim 1, wherein circuitry configured for negotiating the presentation of the at least one persona including the reduced personal information, wherein the negotiation is concluded with an electronic signature from the party to the transaction comprises:
   circuitry configured for negotiating the presentation of the at least one persona including the reduced personal information, wherein the negotiation is concluded with a digital signature from the party to the transaction.

18. The system of claim 1, wherein circuitry configured for negotiating presentation of at least one persona including reduced personal information than was initially requested by the party to the transaction at least partly based on the monetary cost corresponding to the sale of the one or more goods identified by the circuitry configured for evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information comprises:

circuitry configured for negotiating the presentation of the at least one persona including the reduced personal information, wherein the negotiation is concluded with an electronic signature from the initiator of the transaction.

19. The system of claim 18, wherein circuitry configured for negotiating the presentation of the at least one persona including the reduced personal information, wherein the negotiation is concluded with an electronic signature from the initiator of the transaction comprises:

circuitry configured for negotiating the presentation of the at least one persona including the reduced personal information, wherein the negotiation is concluded with a digital signature from the initiator of the transaction.

20. A method, comprising:

accepting at least one request for personal information from a party to a transaction involving a sale of one or more goods;

evaluating the transaction to identify a monetary cost corresponding to the sale of the one or more goods;

negotiating presentation of at least one persona including reduced personal information than was initially requested by the party to the transaction at least partly based on the monetary cost corresponding to the sale of the one or more goods identified by the evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information; and presenting the at least one persona including the reduced personal information negotiated by the negotiating for use in the transaction, wherein at least one of the accepting, evaluating, negotiating, or presenting is at least partly implemented using at least one processing device.

21. A system, comprising:

at least one computing device; and one or more instructions which, when executed on the at least one computing device, configure the at least one computing device to perform one or more operations including at least:

accepting at least one request for personal information from a party to a transaction involving a sale of one or more goods;

evaluating the transaction to identify a monetary cost corresponding to the sale of the one or more goods;

negotiating presentation of at least one persona including reduced personal information than was initially requested by the party to the transaction at least partly based on the monetary cost corresponding to the sale of the one or more goods identified by the evaluating the transaction, wherein a monetary surcharge is added to the monetary cost corresponding to the sale of the one or more goods in exchange for an initiator of the transaction not providing at least one element of the initiator's personal information to the party to the transaction while the party to the transaction agrees to let the sale of the one or more goods proceed without the at least one element of the initiator's personal information;

presenting the at least one persona including the reduced personal information negotiated by the negotiating for use in the transaction.

* * * * *